United States Patent
Ahn et al.

(10) Patent No.: US 12,041,545 B2
(45) Date of Patent: *Jul. 16, 2024

(54) WIRELESS COMMUNICATION METHOD AND WIRELESS COMMUNICATION TERMINAL USING WAKE-UP RADIO

(71) Applicant: WILUS INSTITUTE OF STANDARDS AND TECHNOLOGY INC., Gyeonggi-do (KR)

(72) Inventors: Woojin Ahn, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,016

(22) Filed: Feb. 10, 2023

(65) Prior Publication Data
US 2023/0189151 A1   Jun. 15, 2023

Related U.S. Application Data

(63) Continuation of application No. 16/956,542, filed as application No. PCT/KR2018/016544 on Dec. 21, 2018, now Pat. No. 11,606,750.

(30) Foreign Application Priority Data

Dec. 21, 2017   (KR) .......................... 10-2017-0177223
Jan. 5, 2018     (KR) .......................... 10-2018-0001920
(Continued)

(51) Int. Cl.
*H04W 52/02*   (2009.01)
*H04W 84/12*   (2009.01)

(52) U.S. Cl.
CPC ... *H04W 52/0229* (2013.01); *H04W 52/0216* (2013.01); *H04W 52/0222* (2013.01); *H04W 52/0235* (2013.01); *H04W 84/12* (2013.01)

(58) Field of Classification Search
CPC ......... H04W 52/0229; H04W 52/0216; H04W 52/0222; H04W 52/0235; H04W 84/12;
(Continued)

(56) References Cited

U.S. PATENT DOCUMENTS 9,191,891 B2   11/2015   Jafarian et al.
9,313,741 B2   4/2016    Park et al.
(Continued)

OTHER PUBLICATIONS

International Search Report for PCT/KR2018/016544 mailed on Apr. 2, 2019 and its English translation from WIPO (now published as WO 2019/125086).

(Continued)

*Primary Examiner* — Omer S Mian
(74) *Attorney, Agent, or Firm* — Womble Bond Dickinson (US) LLP

(57) ABSTRACT

Disclosed is a wireless communication terminal communicating wirelessly including a first wireless transceiver configured to transmit and receive signals through a first waveform, a second wireless receiver configured to receive a signal through a second waveform different from the first waveform, and a processor. The processor receives an acceptance frame for accepting a request for wake-up radio (WUR) mode entry in which the wireless communication terminal operates based on a signal transmitted through the second waveform from a base wireless communication terminal, through the first wireless transceiver, stops an operation of the wireless communication terminal related to a service period based on the acceptance frame.

16 Claims, 31 Drawing Sheets

(30) Foreign Application Priority Data

Jan. 16, 2018 (KR) .......................... 10-2018-0005785
Jul. 6, 2018 (KR) .......................... 10-2018-0078976

(58) Field of Classification Search
CPC ........... H04W 52/0258; H04W 52/028; H04W 52/0212; H04W 52/0209; Y02D 30/70
See application file for complete search history.

(56) References Cited

U.S. PATENT DOCUMENTS

| | | | |
|---|---|---|---|
| 9,585,091 B2 | 2/2017 | Jafarian et al. | |
| 9,736,779 B2 | 8/2017 | Min et al. | |
| 9,826,483 B2 | 11/2017 | Park et al. | |
| 11,606,750 B2* | 3/2023 | Ahn | H04W 52/0229 |
| 2016/0374019 A1 | 12/2016 | Park et al. | |
| 2019/0281551 A1* | 9/2019 | Kim | H04W 52/0229 |
| 2020/0178178 A1* | 6/2020 | Huang | H04W 52/028 |
| 2021/0337558 A1 | 10/2021 | Chitraka et al. | |
| 2021/0352587 A1* | 11/2021 | Huang | H04W 52/0235 |
| 2022/0141770 A1 | 5/2022 | Ahn et al. | |

OTHER PUBLICATIONS

Written Opinion of the International Searching Authority for PCT/KR2018/016544 mailed on Apr. 2, 2019 and its English translation by Google Translate (now published as WO 2019/125086).
Office Action dated Dec. 14, 2022 for European Patent Application No. 18 890 542.6.
Extended European Search Report dated Aug. 23, 2021 for European Patent Application No. 18890542.6.
Office Action dated Aug. 10, 2021 for Indian Patent Application No. 202027030191.
Suhwook Kim et al.: "MAC operation of WUR", IEEE 802.11-17/1657r2, IEEE Draft; 11-17-1657-02-00BA-MAC-OPERATION-OF-WUR, IEEE-SA Mentor, Piscataway, NJ USA, vol. 802.11ba, No. 2, XP068122373, Retrieved from the Internet: URL:https://mentor.IEEE.org/802.11/dcn/17/11-17-1657-02-00ba-mac-operation-of-wur.pptx [retrieved on Nov. 8, 2017], Nov. 8, 2017. Slides 1-14.
Suhwook Kim et al.: "SFD MAC proposal", IEEE 802.11-17/0379r3, IEEE Draft; 11-17-0379-03-00BA-SFD-MAC-PROPOSAL, IEEE-SA Mentor, Piscataway, NJ USA, vol. 802.11ba, No. 3, XP068158894, Retrieved from the Internet: URL:https://mentor.ieee.org/802.11/dcn/17/11-17-0379-03-00ba-sfd-mac-proposal.pptxretrieved, May 10, 2017. Slides 1-17.
Po-Kai Huang et al.: "High Level MAC Concept for WUR", IEEE 802.11-17/0071r0, 11-17-0071-00-00ba-high-level-mac-concept-for-wur, IEEE Draft; 11-17-0071-00-00BA-HIGH-LEVEL-MAC-CONCEPT-FOR-WUR, IEEE-SA Mentor, Piscataway, NJ USA, vol. 802.11ba XP068112493, Retrieved from the Internet: URL:https://mentor.ieee.org/802.11/dcn/17/11-17-0071-00-00ba-high-level-mac-concept-for-wur.pptx [retrieved on Jan. 18, 2017], Jan. 18, 2017. Slides 1-9.
Igor Kim et al.: "AP Discovery using WUR", IEEE 802.11-16/1501r0, retrieved from: https://mentor.ieee.org/802.11/dcn/16/11~16~1501~00~0wur~ap~discovery~usingwur.pttx, Nov. 8, 2016. Slides 1-11.
International Preliminary Report on Patentability (Chapter I) for PCT/KR2018/016544 issued on Jun. 23, 2020 and its English translation from WIPO.
Notice of Allowance dated Nov. 7, 2022 for U.S. Appl. No. 16/956,542 (now published as 2022/0141770).
Final Office Action dated Jul. 20, 2022 for U.S. Appl. No. 16/956,542 (now published as 2022/0141770).
Office Action dated Mar. 29, 2022 for U.S. Appl. No. 16/956,542 (now published as 2022/0141770).
Danielle Griffith: "Wake-Up Radio for Low-Power Internet of Things Applications", IEEE, Nov. 18, 2019, pp. 16-22.
Office Action dated Oct. 26, 2023 for European Patent Application No. 18 890 542.6.
Notice of Hearing dated Dec. 28, 2023 for Indian Patent Application No. 202027030191.

* cited by examiner

WIRELESS COMMUNICATION METHOD AND WIRELESS COMMUNICATION TERMINAL USING WAKE-UP RADIO

CROSS-REFERENCE TO RELATED APPLICATIONS

This application is a continuation of U.S. patent application Ser. No. 16/956,542 filed on Aug. 4, 2020, which is the U.S. National Stage of International Patent Application No. PCT/KR2018/016544 filed on Dec. 21, 2018, which claims the priority to Korean Patent Application No. 10-2017-0177223 filed in the Korean Intellectual Property Office on Dec. 21, 2017, Korean Patent Application No. 10-2018-0001920 filed in the Korean Intellectual Property Office on Jan. 5, 2018, Korean Patent Application No. 10-2018-0005785 filed in the Korean Intellectual Property Office on Jan. 16, 2018, and Korean Patent Application No. 10-2018-0078976 filed in the Korean Intellectual Property Office on Jul. 6, 2018, the entire contents of which are incorporated herein by reference.

TECHNICAL FIELD

The present invention relates to a method for improving transmission efficiency, and more particularly, to a wireless communication method and a wireless communication terminal using a wake-up radio in a wireless LAN.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

In addition, while developing technology that increases the speed and efficiency of a wireless LAN simultaneously, in order to extend the battery life of mobile devices equipped with a wireless LAN and to equip devices operating based on a very limited power source such as a battery with a wireless LAN, it is necessary to develop an efficient wireless LAN power saving technique. The existing WLAN power saving techniques are methods of periodically entering devices into a sleep mode to reduce power, but in this case, as the power saving efficiency of the device increases, the device wakes up in a longer period, so that communication with the device is further suspended. To solve this problem, it is necessary to study a power saving technique using a separate low-power wake-up receiver.

DISCLOSURE

Technical Problem

The embodiment of the present invention has an object to perform a power saving operation by utilizing a low-power wake-up receiver in a wireless LAN environment as described above.

Technical Solution

According to an embodiment of the present invention, a wireless communication terminal communicating wirelessly includes a first wireless transceiver configured to transmit and receive signals through a first waveform, a second wireless receiver configured to receive a signal through a second waveform different from the first waveform, and a processor. The processor is configured to receive an acceptance frame for accepting a request for wake-up radio (WUR) mode entry in which the wireless communication terminal operates based on a signal transmitted through the second waveform from a base wireless communication terminal, through the first wireless transceiver, stops an operation of the wireless communication terminal related to a service period based on the acceptance frame, wherein the service period is a time period that arrives in a period negotiated between the base wireless communication terminal and the wireless communication terminal before the wireless communication terminal enter the WUR mode, and is configured to transmit and receive data through the base wireless communication terminal and the first wireless transceiver, after stopping the operation of the wireless communication terminal related to the service period, when receiving a wake-up frame that triggers a wake-up of the first wireless transceiver from the base wireless communication terminal through the second wireless receiver, wake-up the first wireless transceiver based on the wake-up frame, and maintain a state in which transmission and reception are possible through the first wireless transceiver during at least a first service period that arrives after receiving the wake-up frame.

The first service period may be a service period that arrives fastest after the first wireless transceiver wakes up.

The first service period may be a service period that arrives fastest after a PCR transition delay elapses from the time point at which the wake-up frame is received, and the PCR transition delay may represent a time taken from a state in which a frame cannot be transmitted and received through the first wireless transceiver to a state in which transmission and reception are possible.

The first service period may be a service period that arrives according to a first period, and the processor may be configured to maintain a state in which transmission and reception are possible through the first wireless transceiver during the first service period and a second service period, the second service period may be a service period that arrives according to a second period different from the first period, the second service period may overlap at least a portion of the first service period in a time domain, and an end time point of the second service period may be later than an end time point of the first service period.

The first service period may be a service period including any one of a plurality of service flows configured between the wireless communication terminal and the base wireless communication terminal, the plurality of service flows may be identified through different flow identification information, each of the plurality of service flows may be composed of service periods corresponding to the same flow identification information, and a service flow including the first service period may be a service flow preconfigured to be available when the wireless communication terminal wakes up in the WUR mode among the plurality of service flows.

When exchanging additional data information indicating the existence of data to be additionally transmitted with the base wireless communication terminal during the first service period, the processor may be configured to maintain a state in which transmission and reception are possible through the first wireless transceiver during a third service period that arrives after an end time point of the first service period based on the additional data information.

The third service period may be a service period that arrives fastest after the end time point of the first service period.

The processor may be configured to transmit indication information specifying the third service period among service periods arriving after the first service period through the first wireless transceiver, and maintain a state in which transmission and reception are possible through the first wireless transceiver during the third service period based on the indication information.

The processor, through the first wireless transceiver, may be configured to transmit an awake frame between a time point at which the first wireless transceiver wakes up to a time point at which the first service period ends, to the base wireless communication terminal, and transmit and receive data to and from the base wireless communication terminal during at least the first service period based on the awake frame, an awake frame may represent a frame that is first transmitted through the first wireless transceiver after the first wireless transceiver wakes up.

The processor may be configured to receive a trigger frame triggering transmission of the awake frame within the first service period from the base wireless communication terminal through the first wireless transceiver, and transmit the awake frame based on the trigger frame.

The awake frame may include flow identification information of the first service period, the flow identification information of the first service period may indicate a service flow preconfigured to be available when the wireless communication terminal wakes up in the WUR mode, and the service flow may be composed of a plurality of service periods corresponding to the same flow identification information.

When waking up the first wireless transceiver regardless of whether the wake-up frame is received after entering the WUR mode, the processor, through the first wireless transceiver, may be configured to transmit an awake frame between a time point at which the first wireless transceiver wakes up to an end time point of the first service period to the base wireless communication terminal, and maintain a state in which transmission and reception are possible through the first wireless transceiver during at least the first service period. The awake frame may represent a frame that is first transmitted through the first wireless transceiver after the first wireless transceiver wakes up.

According to an embodiment of the present invention, an operation method of a wireless communication terminal for transmitting and receiving a signal through a first waveform, and receiving a signal through a second waveform different from the first waveform may include: receiving an acceptance frame for accepting a request for wake-up radio (WUR) mode entry in which the wireless communication terminal operates based on a signal transmitted through the second waveform from a base wireless communication terminal; stopping an operation of the wireless communication terminal related to a service period based on the acceptance frame, wherein the service period is a time period that arrives in a period negotiated between the base wireless communication terminal and the wireless communication terminal before the wireless communication terminal enters the WUR mode, and being configured to transmit and receive data through the base wireless communication terminal and the first wireless transceiver; after stopping the operation of the wireless communication terminal related to the service period, when receiving a wake-up frame that triggers a wake-up of a wireless transceiver of the wireless communication terminal from the base wireless communication terminal, waking-up the wireless transceiver based on the wake-up frame; and maintaining a state in which transmission and reception are possible through the wireless transceiver during at least a first service period that arrives after receiving the wake-up frame. The wireless transceiver is a transceiver that receives a signal through the first waveform, the acceptance frame is received through the first waveform, and the wake-up frame is received through the second waveform.

Advantageous Effects

An embodiment of the present invention provides a wireless communication method using a wake-up radio and a wireless communication terminal using the same.

MODE FOR CARRYING OUT THE INVENTION

Figure 1:
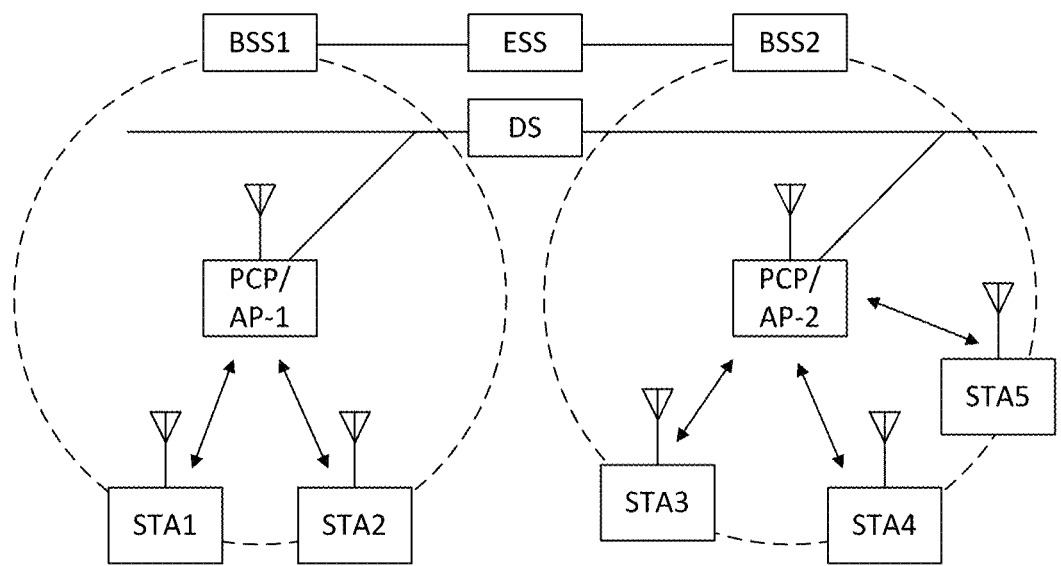
FIG. 1 is a diagram illustrating a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Also, when a part "includes" a component, this means that, unless specifically stated otherwise, it may further include other components rather than excluding other components.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
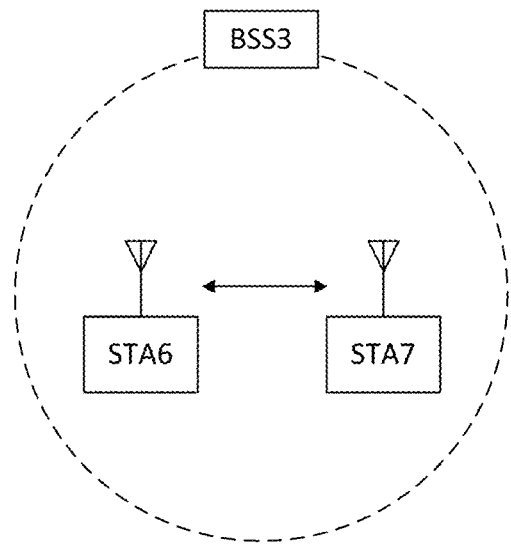
FIG. 2 illustrates an independent BSS that is a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
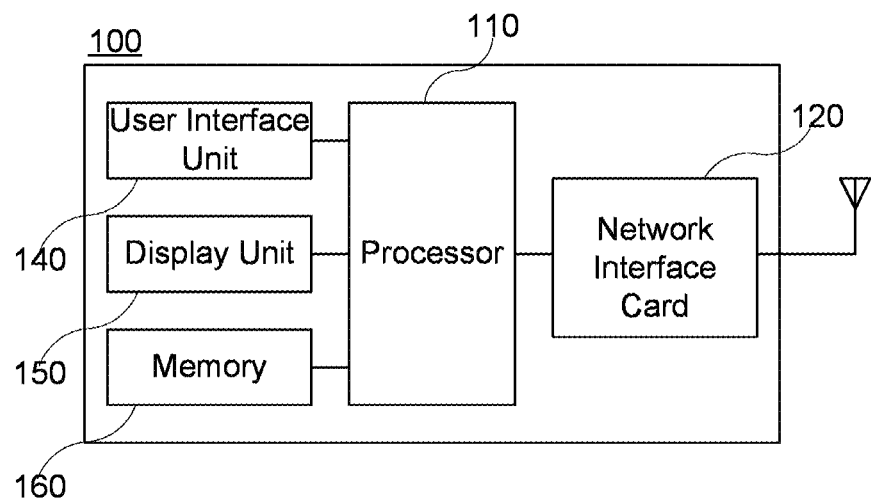
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
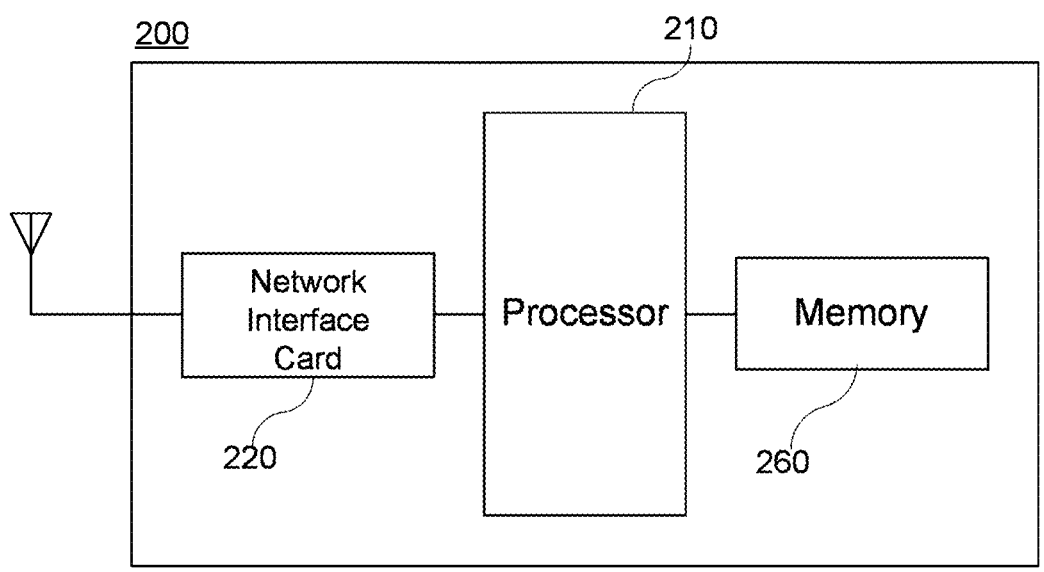
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
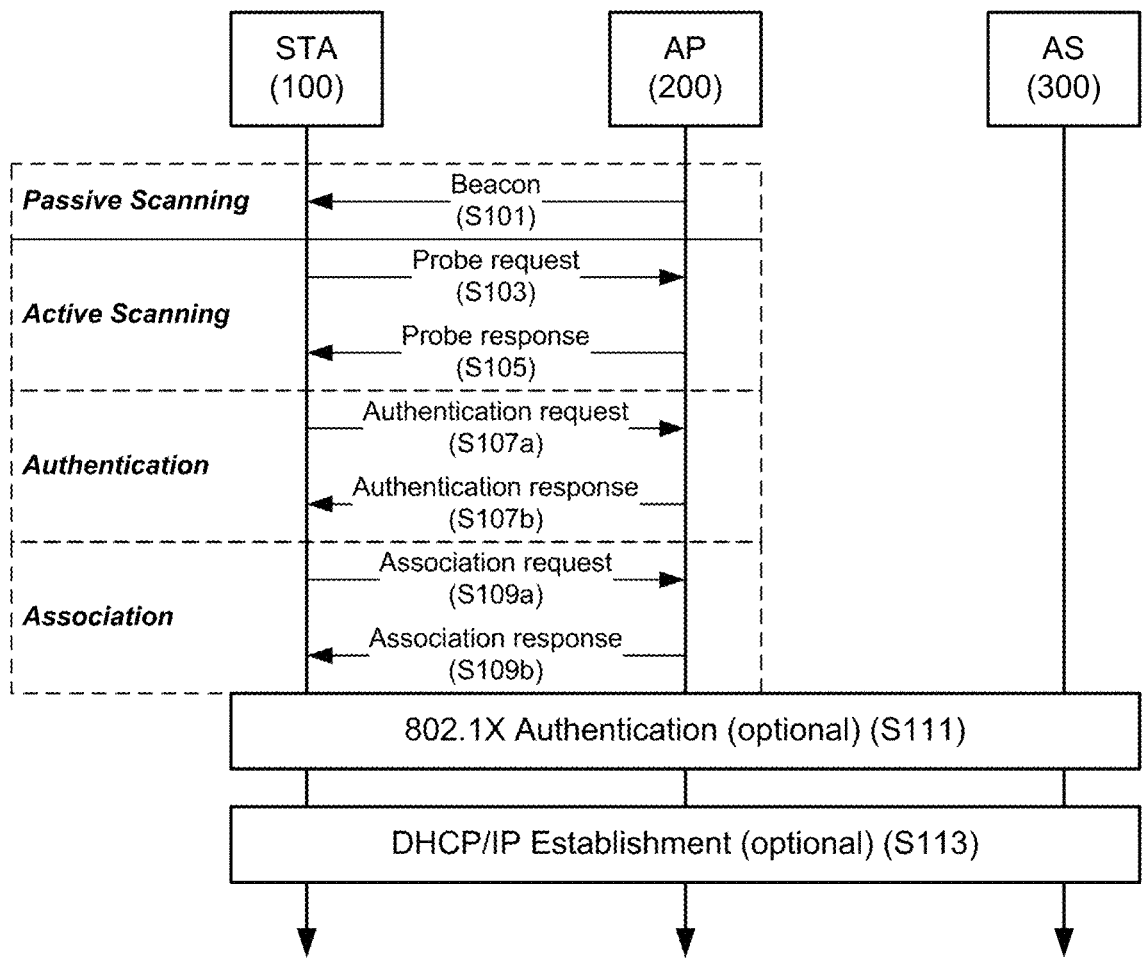
FIG. 5 is a diagram illustrating a process that a station configures an AP and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

In a specific embodiment, the AP 200 may be a wireless communication terminal that allocates a communication medium resource and performs scheduling in an independent network, such as an ad-hoc network, which is not connected to an external distribution service. In addition, the AP 200 may be at least one of a base station, an eNB, and a transmission point TP. The AP 200 may also be referred to as a base wireless communication terminal.

The wireless communication terminal may stop transmitting and receiving a wireless LAN radio and receive a wake-up radio (WUR) to increase energy efficiency. In this case, the magnitude of the power used for the wake-up radio transmission and reception may be smaller than the magnitude of the power used for the wireless LAN signal transmission. A general wireless LAN radio distinguished from the WUR may be referred to as a primary connectivity radio (PCR). A typical wireless LAN may indicate a radio capable of transmitting and receiving a 20 MHz non-high throughput (HT) physical layer protocol data unit (PPDU) defined in IEEE 802.11.

In the existing power save mode (hereinafter referred to as 'PS mode'), the wireless communication terminal may enter a PCR doze state that blocks power supply for some functions including a PCR transmission and reception function. In addition, in the PS mode, the wireless communication terminal may stop the PCR dose state to receive a radio signal from an external device and enter a PCR awake state, which is a state in which PCR transmission and reception can be performed. In the PCR doze state, supplying the power blocked by the wireless communication terminal again is referred to as PCR wake-up. In the existing PS mode, the wireless communication terminal may periodically wake up to receive a wireless signal from an external device. This operation may lower the operation efficiency of the wireless communication terminal.

When the wireless communication terminal wakes up according to the WUR signal triggering the wake-up of the PCR transceiver, it is possible to increase the operation efficiency of the wireless communication terminal. This power save operation is referred to as a WUR-based power save operation. Through the WUR-based power save operation, the wireless communication terminal can reduce unnecessary wake-up operation. In addition, when WUR is used, the time during which the wireless communication terminal stays in the PCR dose state may be increased. Thus, the power efficiency of the wireless communication terminal may be increased. For WUR-based power save operation, the wireless communication terminal may include a wake-up receiver (hereinafter referred to as 'WURx') that operates at a lower power than a PCR transceiver. In addition, when the wireless communication terminal needs to transmit a WUR signal, the wireless communication terminal may include a wake-up transmitter.

A part of the WUR signal may be transmitted in a waveform different from the waveform of the PCR signal. For example, a part of the WUR signal may be transmitted through On-Off Keying (OOK). Specifically, the PCR transceiver may transmit and receive modulated signals through a wave-form modulation method using WURx and other wave forms. Hereinafter, an operation of a wireless communication terminal including a WURx and a wireless communication method using WUR will be described according to an embodiment of the present invention.

Figure 6:
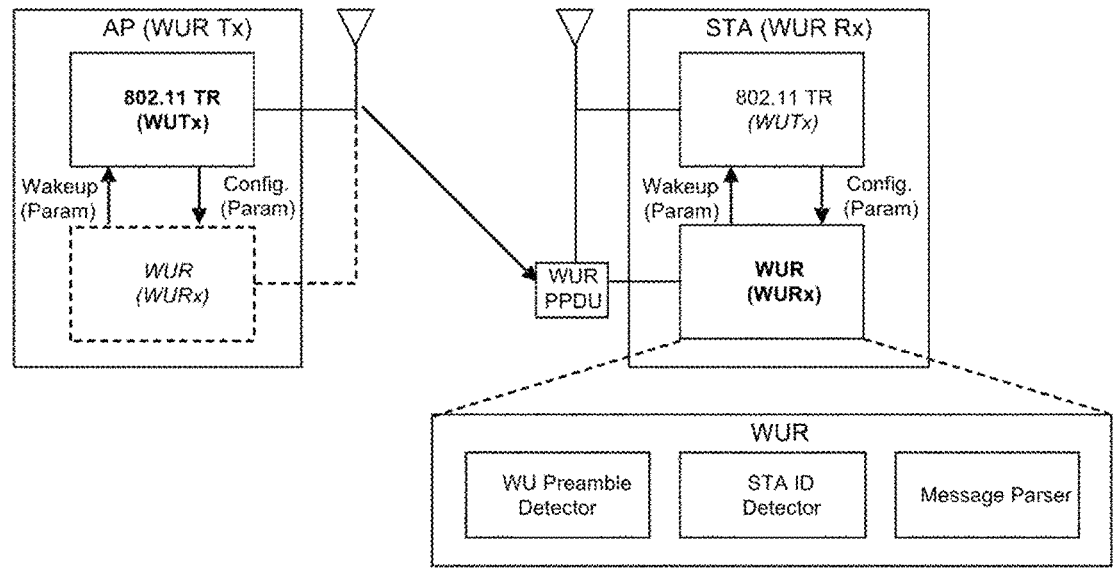
FIGS. 6 and 7 are diagrams illustrating a network including wireless communication terminals supporting WUR based power save according to an embodiment of the present invention.
Figure 7:
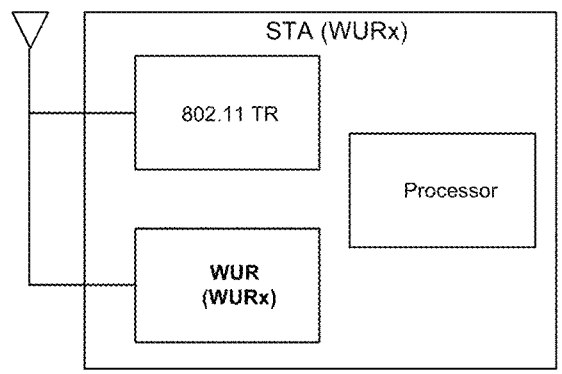

FIGS. 6 and 7 are diagrams illustrating a network including wireless communication terminals supporting WUR based power save according to an embodiment of the present disclosure.

Referring to FIG. 6, the network may include an AP and a station supporting WUR based power save. The AP may transmit a WUR frame to the WUR terminal. Specifically, the AP may wake-up the terminal by transmitting a wake-up frame to the WUR terminal. In the present specification, unless otherwise specified, a frame indicates a MAC frame. Meanwhile, the AP and the station of FIG. 6 may include a PCR transmission/reception function supporting at least one of 802.11a/b/g/n/ac/ax, which is a general wireless LAN standard. In addition, the AP and the station in FIG. 6 may coexist in one network and a general station that supports only PCR transmission/reception without supporting WUR transmission/reception. For example, the network of FIG. 6 may include a general station that does not have a WUR function.

According to an embodiment, the AP may include a first wireless transceiver (TR) supporting a communication method using PCR. The first wireless transceiver may transmit and receive PPDU through PCR. The AP may include a second wireless transmitter that performs WUR PPDU transmission. The second wireless transmitter may be referred to as a wake-up transmitter (WUTx). Here, a part of the WUR signal may be a signal transmitted in a second modulation method different from the first modulation method used in the PCR signal. Specifically, a part of the WUR signal may be transmitted through OOK. For example, the second wireless transmitter may transmit the WUR PPDU to the station through WUR. Also, if the AP additionally includes WURx, the AP may receive the WUR PPDU from the outside through the WURx.

Meanwhile, according to another embodiment, the first wireless transceiver and the second wireless transmitter may be implemented as one transceiver. For example, an AP may perform transmission and reception of a PCR signal and transmission of a WUR signal through one transceiver.

As shown in FIG. 6, the AP may transmit the WUR PPDU including a wake-up frame that triggers a wake-up of the PCR transceiver of the station to a station that supports WUR-based power save. According to an embodiment, the AP may wake up only a station entering a WUR based power save mode among a plurality of stations belonging to the AP's BSS. In addition, when the station receives a wake-up frame including an identifier indicating the station, the station may wake-up in the PCR doze state. For example, the WUR frame may include identification information identifying at least one station. The wake-up frame may include identification information identifying at least one station to wake-up. When the first station receives a wake-up frame including identification information indicating the first station, the first station may wake-up. Also, a station other than the first station belonging to the AP's BSS or another BSS may not wake-up.

According to an embodiment, a station supporting the WUR-based power save may include a WURx for receiving a wake-up frame. The station may include a first wireless transceiver that supports PCR transmission and reception and a WURx, that is, a second wireless receiver that exists separately. Here, the first wireless transceiver may be referred to as a PCR transceiver. The wireless communication terminal may transmit and receive PCR signals using a PCR transceiver. Also, the second wireless receiver may receive a signal transmitted in a second wave-form different from the first wave-form of the signal transmitted/received through the first wireless transceiver. The WURx may receive a wake-up frame from the AP and wake-up the PCR transceiver. If the WURx receives a wake-up frame while the PCR transceiver of the station operates in the PCR doze state, the WURx may wake-up the PCR transceiver by using an internal wake-up signal.

For example, the station may have an interface between the PCR transceiver and the WURx. At this point, the WURx may wake-up the PCR transceiver of the station by using the internal interface. Specifically, the WURx may wake-up a PCR transceiver by transmitting an internal signal to the PCR transceiver, but it is not limited thereto. For example, the station may have a processor that controls the overall operation of the station. At this point, the WURx may wake-up the PCR transceiver over the processor. Specifically, the station may cut off the power supply of the PCR and the processor in the PCR doze state. In this case, the WURx may operate in a manner that stops cutting off the power supply of the processor and wakes-up the PCR transceiver over the processor by receiving a wake-up frame.

According to an embodiment, the WURx may deliver information received through the wake-up frame to the PCR transceiver. The WURx may transmit information on subsequent operations following the wake-up to the PCR transceiver by using the internal interface. Specifically, the information on the subsequent operations may be a Sequence ID (SID) that identifies each of the subsequent operations. In addition, PCR may set WURx parameters required for the WUR based power save operation by using the internal interface.

For example, the WURx may include a wake-up preamble detector (WU Preamble Detector), a wireless communication terminal identifier detector (STA ID Detector), and a message parser. The WU preamble detector detects a wake-up frame by identifying a sequence of signal patterns included in the wake-up frame. In addition, the WU preamble detector may perform automatic gain control (AGC) and synchronization on WUR based on the detected signal pattern sequence.

The wireless communication terminal identifier detector detects the recipient of the WUR frame. In this case, the recipient indicates a recipient intended by the wireless communication terminal that has transmitted the WUR frame. In addition, the wireless communication terminal identifier detector may obtain information identifying the recipient of the WUR frame based on the WU signaling field of the WUR PPDU. In addition, the wireless communication terminal identifier detector may obtain information identifying the recipient of the WUR frame based on the WU preamble and WU signaling field of the WUR PPDU. The WU preamble and WU signaling field of the WUR PPDU will be described later with reference to FIG. 8. The message parser parses the message included in the WUR frame. Specifically, the message parser may obtain a message indicated by the WUR frame by parsing the message included in the WUR frame.

According to an embodiment, the wireless communication terminal may determine a condition for maintaining the wireless communication terminal in a state where WUR PPDU reception is possible through the WURx of the communication terminal. In a specific embodiment, the wireless communication terminal may maintain WURx to be available for reception until a certain condition is satisfied. For example, until the wireless communication terminal recognizes that the PCR transceiver of the wireless communication terminal succeeds in wake-up, the wireless communication terminal may maintain the WURx in a state capable of transmitting and receiving.

Figure 8:
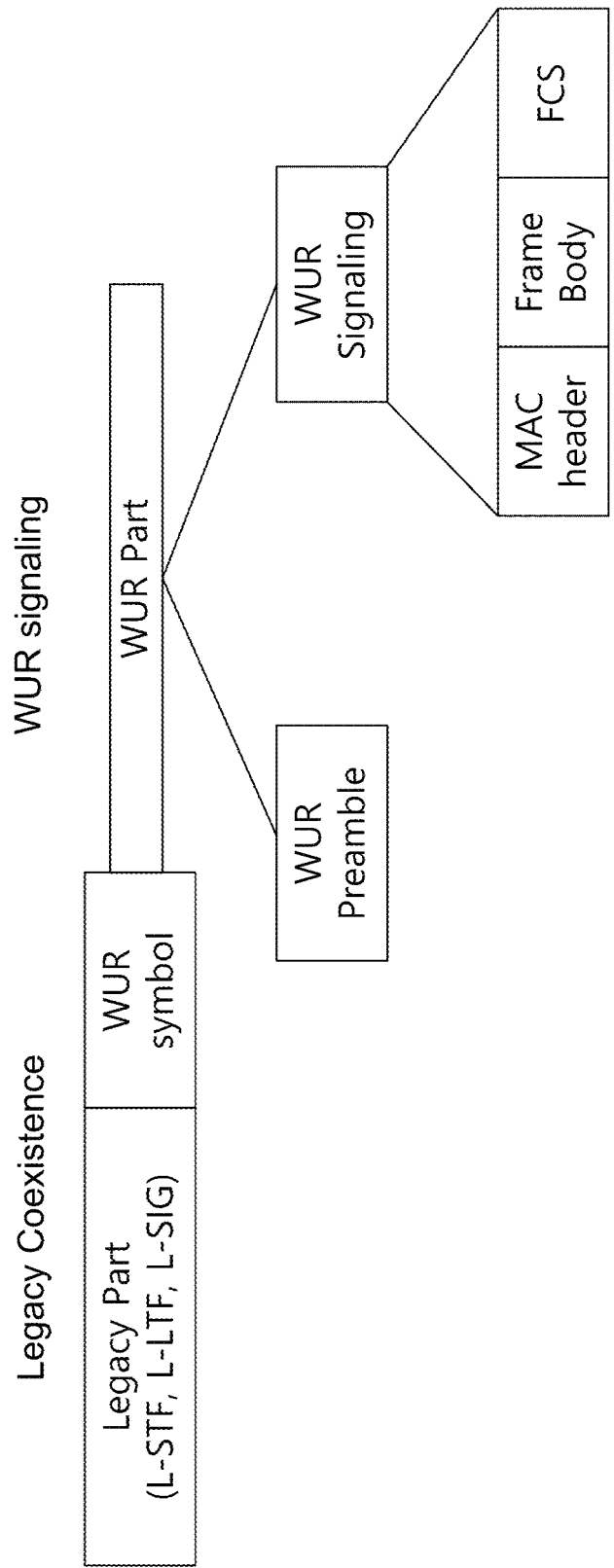
FIG. 8 is a diagram illustrating a format of a WUR PPDU (PLCP protocol data unit) according to an embodiment of the present invention.

FIG. 8 is a diagram illustrating a format of a WUR PPDU (PLCP protocol data unit) according to an embodiment of the present invention.

The WUR PPDU may include a legacy part that the PCR transceiver is capable of demodulating. Specifically, the WUR PPDU may be divided into a legacy part that the PCR transceiver is capable of demodulating and a wake-up part that the PCR transceiver is not capable of demodulating. As described above, the BSS may simultaneously include a wireless communication terminal that supports WUR-based power save and a legacy wireless communication terminal that does not support WUR-based power save. In this case, it is necessary that the operation of the wireless communication terminal supporting the WUR-based power save does not prevent the operation of the legacy wireless communication terminal existing in the BSS.

Specifically, the legacy part may include a legacy preamble (L-Preamble) used in the existing 802.11 standard. Specifically, the legacy preamble may include an L-STF including a short training signal, an L-LTF including a long training signal, and an L-SIG including signaling information for a legacy wireless communication terminal. The legacy wireless communication terminal may determine the length of the WUR PPDU using the legacy preamble. Accordingly, the legacy wireless communication terminal may not access the frequency band in which the WUR PPDU is transmitted while the WUR PPDU is transmitted. Though the legacy wireless communication terminal prevents interference with signals including the WUR part following the legacy part.

In addition, the WUR PPDU may include a WUR symbol. For example, the WUR symbol may be one OFDM symbol following L-SIG. The WUR symbol may be an OFDM symbol modulated by a Binary Phase Shift Keying (BPSK) scheme. The WUR symbol may include information indicating a BSSID. In addition, the WUR symbol may include information indicating the transmission type of the WUR part. For example, the transmission type may be unicast, multicast, or broadcast. When the transmission type is unicast, a WUR part to be described later may include identification information indicating a wireless communication terminal to be waked up. In this case, the identification information may be an association identifier (AID) used in the PCR. Alternatively, the identification information may be a WUR unique identifier (WUR ID) used in the WUR.

A wireless communication terminal supporting WUR-based power save can demodulate the WUR part through WURx. In this case, the WUR part may be divided into a WUR SYNC and a WUR frame. The WUR SYNC may include a signal pattern sequence indicating WUR PPDU. Specifically, the base wireless communication terminal may insert a pseudo noise sequence based on WURx modulation into the WUR preamble. The base wireless communication terminal can insert a pseudo noise sequence using OOK in the WUR preamble. The signal pattern sequence may be a pattern applied equally regardless of the wireless communication terminal receiving the WUR PPDU. A wireless communication terminal supporting WUR-based power save can check whether a signal received through a signal pattern sequence is a WUR PPDU. In addition, the wireless communication terminal may determine whether the WUR PPDU is High Data-Rate (HDR) or Low Data-Rate (LDR) through a signal pattern sequence.

The WUR frame may be divided into a MAC header, a frame body, and a frame check sequence (FCS) field. The wireless communication terminal supporting WUR-based power save can parse the WUR frame of the WUR PPDU to determine the receiver of the received WUR PPDU. For example, the MAC header may include an ID field indicating the recipient of the WUR PPDU.

Specifically, the MAC header may include a WUR identifier (WUR ID) that identifies a wireless communication terminal receiving a WUR frame. When the wireless communication terminal receives a wake-up frame including a WUR ID indicating the wireless communication terminal, the wireless communication terminal can wake-up the PCR transceiver. In order to wake-up a PCR transceiver of a specific wireless communication terminal among a plurality of wireless communication terminals included in the BSS using a wake-up frame, the base wireless communication terminal may allocate different WUR IDs to the plurality of wireless communication terminals, respectively.

According to one embodiment, when the wake-up frame triggers the wake-up of the PCR transceiver of a plurality of wireless communication terminals, the MAC header of the WUR signaling part may include a group identifier (Group ID) that identifies a group including a plurality of wireless communication terminals. Further, the base wireless communication terminal may insert subsequent operation information indicating a subsequent operation of the wireless communication terminal to be the target of wake-up in the MAC header of the WUR signaling part. For example, the WUR signaling part may additionally include a subsequent operation identifier (SID) that identifies subsequent operations after wake-up.

For convenience of explanation, in the following, unless otherwise stated, it is assumed that the wireless communication terminal and the base wireless communication terminal are a wireless communication terminal and a base wireless communication terminal supporting WUR-based power save.

Figure 9:
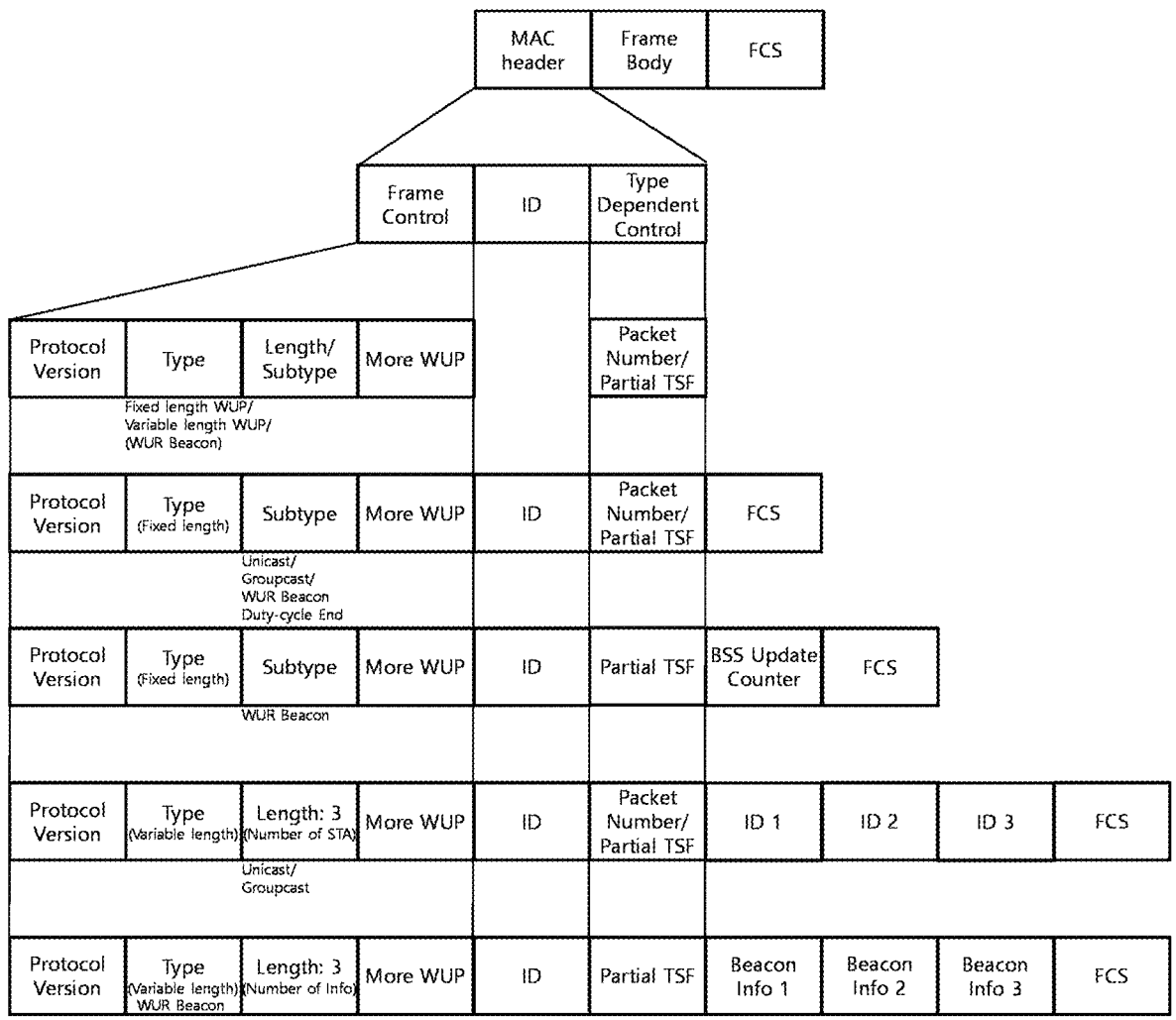
FIG. 9 shows a specific format of a MAC header of a WUR frame according to a specific embodiment of the present invention.
Figure 10:
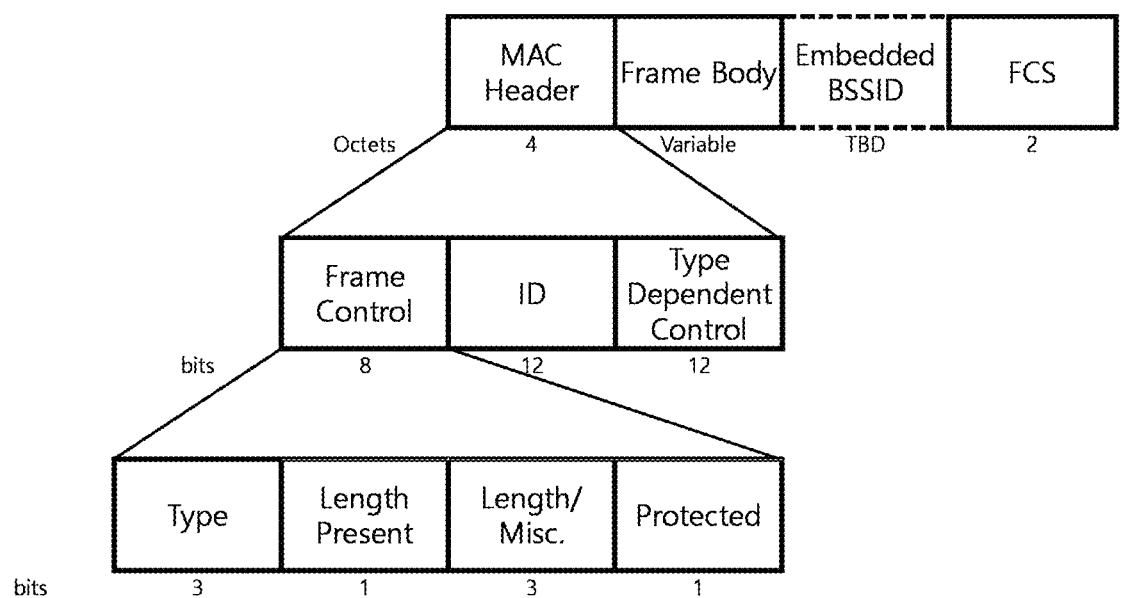
FIG. 10 shows a specific format of a MAC header of a WUR frame according to another specific embodiment of the present invention.

FIGS. 9 to 10 show a specific format of a WUR frame according to an embodiment of the present invention.

The MAC header of the WUR signaling field described through FIG. 8 may be divided into a frame control field, an ID field, and a type dependent control field. In this case, the Frame Control field indicates basic control information on the WUR frame. In addition, the ID field may indicate information on the address of the transmitter of the WUR frame or the address of the recipient. Specifically, the ID field may include at least one of information indicating the address of the transmitter of the WUR frame and information indicating the address of the recipient. In addition, the Type Dependent Control field indicates variable control information changed according to the type of the WUR frame.

The Frame Control field may include information on the protocol version followed by the WUR frame. In this case, a field indicating information on a protocol version followed by the WUR frame may be referred to as a Protocol Version field. In addition, the Frame Control field may include information indicating the type of WUR frame. In this case, the information indicating the type of the WUR frame may indicate whether the length of the WUR frame is a predetermined fixed length or variable. Or, information indicating the type of the WUR frame may indicate the role of the WUR frame. For example, information indicating the type of the WUR frame may indicate that the WUR frame is a WUR beacon. Further, information indicating the type of the WUR frame may indicate that the WUR frame is a wake-up frame. A field indicating information indicating the type of the WUR frame may be referred to as a Type field.

In addition, the Frame Control field may include a field indicating the length of the WUR frame or a subtype of the WUR frame. When the length of the WUR frame is fixed, a field indicating the length of the WUR frame or a subtype of the WUR frame may indicate a subtype of the WUR frame. This is because when the length of the WUR frame is fixed, the WUR frame has a predetermined length. The field indicating the subtype of the WUR frame may indicate whether the WUR frame is a WUR frame for unicast, a WUR frame is a WUR frame for broadcast, or a WUR frame is a WUR frame for groupcast. When the WUR frame is a WUR frame for unicast, the ID field of the WUR frame may indicate a unique WUR ID. When the WUR frame is a WUR frame for groupcast, the ID field of the WUR frame may indicate a group WUR ID that identifies a plurality of WUR wireless communication terminals. When the WUR frame is a WUR frame for broadcast, the ID field of the WUR frame may indicate a broadcast WUR ID. A field indicating a subtype of the WUR frame may indicate that the WUR frame is a WUR beacon frame. In this case, the ID field of the WUR frame may include an identifier of the base wireless communication terminal. Specifically, the ID field of the WUR frame may include the WUR ID of the base wireless communication terminal. A field indicating a subtype of the WUR frame may indicate that the frame indicates a duty-cycle end. When the wireless communication terminal receives a frame indicating the duty-cycle end, the wireless communication terminal may determine that there is no WUR frame to be transmitted to the wireless communication terminal until On Duration corresponding to the next transmission period. In this case, the wireless communication terminal may enter a WUR doze state that turns off the WURx when the WUR frame is received.

In addition, the Frame Control field may include information indicating that there is no additional WUR frame transmission to a terminal operating according to a duty-cycle among terminals associated with the base wireless communication terminal within a corresponding period after a corresponding WUR frame. In this case, the absence of additional WUR frame transmission may indicate that there is no additional wake-up frame transmission. Further, the absence of additional WUR frame transmission may indicate that there is no additional WUR beacon frame transmission. A field indicating information indicating that there is no additional WUR frame transmission may be referred to as a More WUR field.

As described above, the ID field may indicate a unique WUR ID. Also, the ID field may indicate the group WUR ID. In addition, when the WUR frame is transmitted in a broadcast, the ID field may indicate the identifier of the base wireless communication terminal.

The Type Dependent Control field (TD field) may include information on a partial timing synchronization function for time synchronization between terminals receiving a WUR frame according to the type of the WUR frame. In addition, the Type Dependent Control field may include information indicating whether to change the BSS management parameter according to the type of the WUR frame. In this case, information indicating whether the BSS management parameter is changed may be referred to as a BSS update counter. Also, when the WUR frame is a unicast wake-up frame, the Type Dependent Control field may include information indicating how many WUR frames the base wireless communication terminal has transmit to the recipients of the WUR frame. Information indicating how many WUR frames the base wireless communication terminal has transmit to the corresponding terminal may be referred to as packet number information. The packet number information may indicate how many WUR frames the base wireless communication terminal has transmitted to the recipients of the WUR frame in a circular counter format. When the base wireless communication terminal successfully receives the response of the wireless communication terminal for the WUR frame, the base wireless communication terminal may increase the counter value indicated by the packet number information. When the WURx operation starts after receiving the wake-up frame and performing the PCR operation, the wireless communication terminal may store the counter value obtained by incrementing the counter obtained from the WUR frame. Also, the wireless communication terminal may store the counter value obtained from the WUR frame. In addition, when the packet number information of the WUR frame does not indicate the counter value expected by the wireless communication terminal, the wireless communication terminal may request the base wireless communication terminal to change the WUR ID of the wireless communication terminal. In this case, the wireless communication terminal may transmit a frame requesting the WUR ID change of the wireless communication terminal to the base wireless communication terminal using PCR. When the packet number information of the WUR frame does not indicate the counter value expected by the wireless communication terminal, this is because the wireless communication terminal may determine that the base wireless communication terminal associated with the wireless communication terminal has not transmitted the corresponding WUR frame. For example, the wireless communication terminal may determine that there is an external attack.

In another specific embodiment, the Type Dependent Control field may include a TID or Access Category (AC) of data that the base wireless communication terminal intends to transmit to the wireless communication terminal together with a sequence number. In this case, the sequence number is the lowest number among the sequence numbers of the MAC service data unit (MSDU) corresponding to the TID corresponding to the highest user priority among the TIDs of data that the base wireless communication terminal intends to transmit to the wireless communication terminal. In another specific embodiment, the sequence number may correspond to the TID corresponding to the highest user priority among the TIDs of data that the base wireless communication terminal intends to transmit to the wireless communication terminal, and may be a sequence number of an MSDU that successfully transmitted among the MSDUs corresponding to the TID. In a WURx doze state, the wireless communication terminal may determine whether a WUR frame received according to the sequence number of the MSDU successfully received from the base wireless communication terminal for each TID is a WUR frame transmitted by a base wireless communication terminal associated with the corresponding wireless communication terminal. In the Type Dependent Control field, the number of bits in the field indicating the sequence number may be 12 bits.

In addition, the AC of the data may be the AC of the TID having the highest user priority among the TIDs of data that the base wireless communication terminal intends to transmit to the wireless communication terminal. In the Type Dependent Control field, the number of bits of the field indicating AC may be 2 bits. The TID of data may be a TID having the highest user priority among TIDs of data that the base wireless communication terminal intends to transmit to the wireless communication terminal. In the Type Dependent Control field, the number of bits indicating the TID may be 3 bits. The value of the field indicating the sequence number of the Type Dependent Control field may be a partial bit of the sequence number. In this case, the value of the field indicating the sequence number may be a value corresponding to the number of bits of the field indicating the sequence number from the least significant bit (LSB). The wireless communication terminal receiving the WUR frame can access the channel based on the AC indicated by the WUR frame. In addition, the wireless communication terminal receiving the WUR frame may determine a method of transmitting a response frame for data depending on whether data corresponding to the TID indicated by the WUR frame is transmitted in unscheduled-automatic power save delivery (U-APSD) mode or normal PS mode.

When the sequence number indicated by the WUR frame does not indicate the sequence number expected by the wireless communication terminal, the wireless communication terminal may request the base wireless communication terminal to change the WUR ID of the wireless communication terminal. In this case, the wireless communication terminal may transmit a frame requesting the WUR ID change of the wireless communication terminal to the base wireless communication terminal using PCR. When the sequence number indicated by the WUR frame does not indicate the sequence number expected by the wireless communication terminal, this is because the wireless communication terminal may determine that the base wireless communication terminal associated with the wireless communication terminal has not transmitted the corresponding WUR frame. For example, the wireless communication terminal may determine that there is an external attack.

When the WUR frame is a WUR frame for groupcast transmission or a WUR frame for broadcast transmission, the Type Dependent Control field may not include packet number related information. In this case, the Type Dependent Control field may include Predictive Timer Synchronization Function (PTSF) related information instead of packet number information. In addition, even if the WUR frame is a WUR frame for unicast transmission, when the More WUR field indicates that there is no additional WUR frame transmission within a corresponding period, the Type Dependent Control field may include PTSF-related information instead of packet number information. This is because the operation of the wireless communication terminal receiving the WUR frame may affect the operation of other wireless communication terminals in duty cycle operation.

When the WUR frame corresponds to a WUR frame format of variable length, the length of the Frame Body field may be variable. In this case, the Type field may indicate that the length of the WUR frame is variable. In addition, the subtype field indicating the subtype of the WUR frame may indicate the length of the Frame Body field. Specifically, the subtype field may indicate the length of the WUR frame based on a predetermined information unit, not a bit unit. For example, the Frame Body field may include a plurality of subfields indicating information on each of the plurality of WUR wireless communication terminals. Specifically, the Frame Body field may include a first subfield indicating information on the first WUR wireless communication terminal and a second subfield indicating information on the second WUR wireless communication terminal. In addition, one subfield may indicate information on a plurality of WUR IDs corresponding to the group WUR ID. When the Frame Body field includes a plurality of subfields indicating information on each of the plurality of WUR wireless communication terminals, the subtype field may indicate information on the length of the Frame Body field using the number of subfields. For example, when the Frame Body field includes subfields for each of the two WUR IDs, the subtype field may indicate that the number of subfields included in the Frame Body field is 2. When the WUR frame is a WUR Beacon frame and corresponds to a variable length WUR frame format, the Frame Body field may include information related to management. In this case, the length of the Frame Body field may be indicated based on a predetermined information unit as described above.

FIG. 9 shows a specific format of a MAC header of a WUR frame according to a specific embodiment of the present invention. FIG. 10 shows a specific format of a MAC header of a WUR frame according to another specific embodiment of the present invention.

The Frame Control field may include a Type field. The Type field may indicate whether the WUR frame is a WUR beacon frame, a wake-up frame, a WUR discovery frame for discovering a BSS using WUR, or a vendor specific frame. Also, the Frame Control field may include a Length Present field. The Length Present field may indicate whether the corresponding WUR frame corresponds to a fixed-length WUR frame format not including the Frame Body field, or whether the corresponding WUR frame corresponds to a variable-length WUR frame format including the Frame Body field.

In addition, the Frame Control field may include a Length/Misc field. The Length/Misc field may indicate the length of the WUR frame or additional information other than the length of the WUR frame depending on whether the WUR frame corresponds to the variable length WUR frame format. Specifically, when the WUR frame corresponds to a variable-length WUR frame format, the Length/Misc field may indicate information on the length of the WUR frame. The information on the length of the WUR frame may indicate the length of the WUR frame. When the WUR frame corresponds to a variable-length WUR frame format, the Length/Misc field may indicate a length of 2 to 16 octets in units of 2 octets. When the WUR frame corresponds to the variable length WUR frame format, the Length/Misc field may indicate the length of the WUR frame based on a predetermined information unit. For example, the frame body may include a subfield indicating information on a wireless communication terminal corresponding to the WUR ID for each WUR ID. In this case, the Length/Misc field may indicate the number of subfields included for each WUR ID in the Frame Body.

In addition, the Frame Control field may include a Protected field indicating whether the frame requires verification by a message integrity check (MIC). In this case, the Protected field may be a 1-bit field. When the Protected field indicates that MIC is required, the wireless communication terminal receiving the WUR frame may check whether the WUR frame is valid using the MIC. When the wireless communication terminal determines that the WUR frame is not valid through the MIC, the wireless communication terminal may process the WUR frame. The wireless communication terminal may discard the WUR frame. Specifically, when frame validation is required through the MIC, the FCS field of the WUR frame may indicate a message integrity value. The wireless communication terminal receiving the WUR frame may perform MIC using the encryption key previously received.

The ID field may indicate information on the address of the transmitter of the WUR frame or the address of the recipient. The identifier included in the ID field may vary depending on the role of the WUR frame. When the WUR frame is a WUR beacon frame, the ID field may indicate a transmission ID (TXID) that is an identifier of the base wireless communication terminal. In addition, when the WUR frame is a wake-up frame for broadcast transmission, the ID field may indicate TXID. In addition, when the WUR frame is a wake-up frame to wake-up a plurality of wireless communication terminals corresponding to a specific group, the ID field may indicate the group WUR ID. In another specific embodiment, when the WUR frame is a wake-up frame for waking up a specific plurality of wireless communication terminals, the Frame Body field of the corresponding WUR frame may indicate at least one WUR ID among the plurality of wireless communication terminals. When the WUR frame is a wake-up frame to wake-up a specific wireless communication terminal, the ID field may indicate the WUR ID of the corresponding wireless communication terminal.

The WUR frame may include an FCS field indicating a value used to validate the WUR frame. The wireless communication terminal receiving the WUR frame may determine whether an error is included in the process of transmitting and receiving the WUR frame based on the values of the fields included in the WUR frame and the values of the FCS field. Specifically, the wireless communication terminal receiving the WUR frame performs a CRC operation based on the values of the fields included in the WUR frame to generate the FCS value, and compares the generated FCS value with the value of the FCS field. When the generated FCS value and the value of the FCS field are the same, the wireless communication terminal may determine that no error is included in the process of transmitting and receiving the WUR frame. When the generated FCS value and the value of the FCS field are different, the wireless communication terminal may determine that an error is included in the process of transmitting and receiving the WUR frame. The WUR frame may not include the identifier of the base wireless communication terminal. Also, the WUR frame may be transmitted without being encrypted. Therefore, an external wireless communication device can copy the field value of the WUR frame and retransmit it. Through this, an external wireless communication device can induce a power consumption by allowing the wireless communication terminal to wake-up unnecessarily. In order to prevent this, the following embodiments can be applied to a wireless communication terminal and a base wireless communication terminal.

In a specific embodiment, the wireless communication terminal receiving the WUR frame may perform the CRC operation to generate the FCS value considering not only the values of the fields included in the WUR frame, but also the values of virtual fields not included in the WUR frame. The wireless communication terminal may compare the generated FCS value with the FCS field value. Therefore, the base wireless communication terminal may also perform the CRC operation to configure the value of the FCS field considering not only the values of the fields included in the WUR frame, but also the values of virtual fields not included in the WUR frame. In this case, the value of the virtual field may be a value previously negotiated between the base wireless communication terminal and the wireless communication terminal. In addition, when there is no Frame Body field of the WUR frame, when generating the FCS value, the wireless communication terminal and the base wireless communication terminal may consider that the virtual field is located after the MAC header. In addition, if there is a Frame Body field of the WUR frame, when generating the FCS value, the wireless communication terminal and the base wireless communication terminal may consider that the virtual field is located after the MAC header. The virtual field may be referred to as an embedded BSSID field. Through this operation, the wireless communication terminal may determine whether the WUR frame includes an error and also determine whether a WUR frame is transmitted from a base wireless communication terminal associated with the wireless communication terminal. The specific format of the WUR frame may be the same as that shown in FIG. 10.

For WUR-related operations, it is necessary to exchange information on whether the base wireless communication terminal and the wireless communication terminal support the WUR operations and to negotiate the WUR operations. The base wireless communication terminal and the wireless communication terminal may use PCR to exchange information on whether to support the WUR operation and negotiate the WUR operation. This will be described with reference to FIG. 11.

Figure 11:
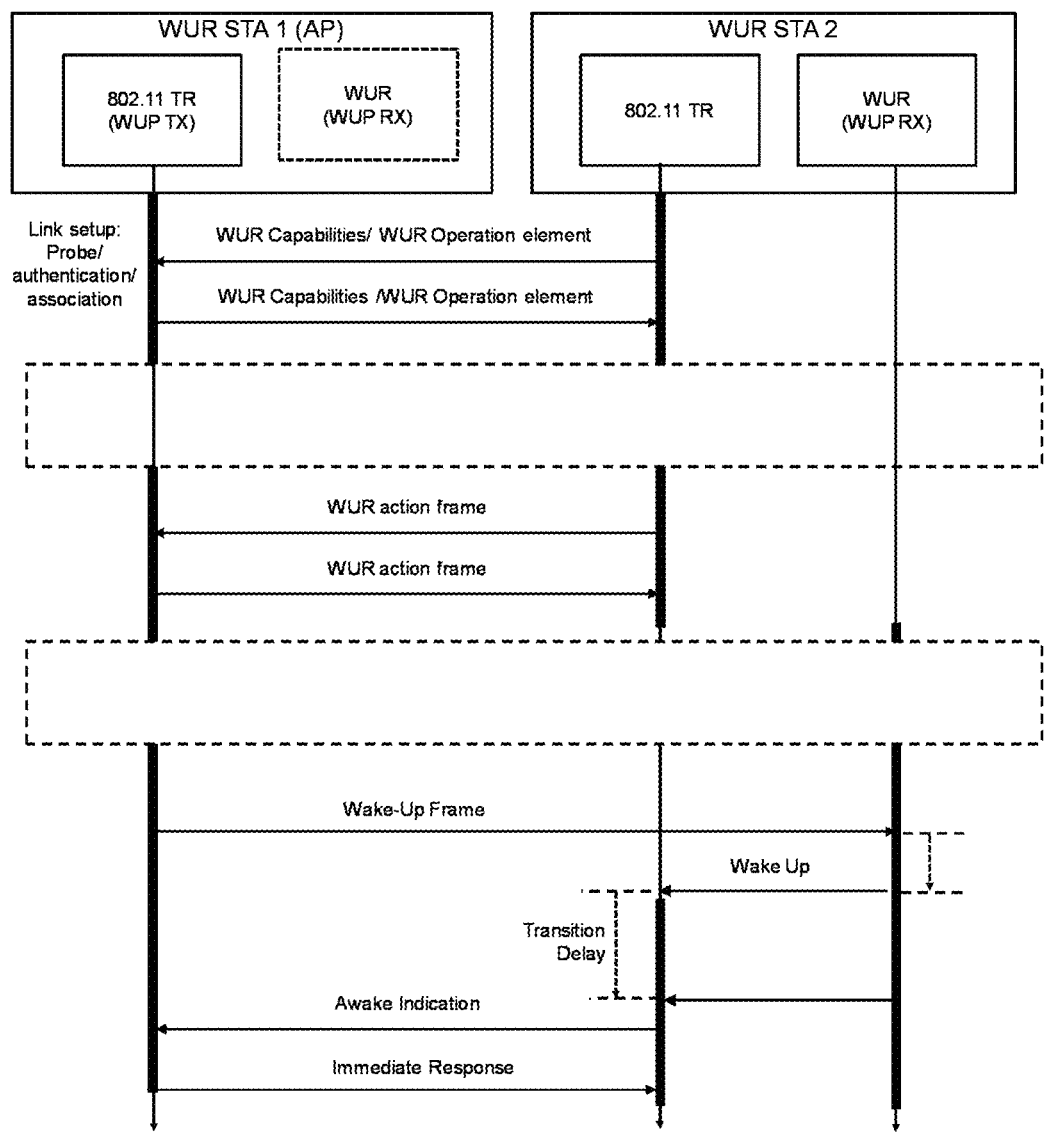
FIG. 11 shows that a wireless communication terminal and a base wireless communication terminal according to an embodiment of the present invention perform negotiations for WUR-related operations and perform WUR-related operations.

FIG. 11 shows that a wireless communication terminal and a base wireless communication terminal according to an embodiment of the present invention perform negotiations for WUR-related operations and perform WUR-related operations.

The base wireless communication terminal and the wireless communication terminal may exchange information on whether to support WUR operation in a link setup procedure. Specifically, the wireless communication terminal may transmit a WUR capability element to the base wireless communication terminal through a probe request frame, an authentication request frame, and an association request frame. The WUR capability element is an element indicating the capabilities supported by the wireless communication terminal in relation to WUR operation. In addition, the wireless communication terminal may transmit a WUR capability element to the base wireless communication terminal using a separate action frame. In addition, the base wireless communication terminal and the wireless communication terminal may transmit a WUR mode element including information on WUR operation-related parameters in a link setup procedure. In addition, the base wireless communication terminal and the wireless communication terminal may transmit WUR mode elements through an action frame. The WUR mode element will be described in detail with reference to FIG. 14.

The wireless communication terminal may perform WUR-related operations after connection with the base wireless communication terminal. When the wireless communication terminal intends to enter the PCR doze state, the wireless communication terminal may transmit a WUR action frame to the base wireless communication terminal. WUR action frames are exchanged to configure parameters related to WUR operation. WUR action frames can be exchanged through PCR. Further, the WUR action frame may request an ACK from the recipient of the WUR action frame. When it is determined that the base wireless communication terminal receiving the WUR action frame needs to change or check the parameters related to the WUR operation, the base wireless communication terminal may transmit an additional WUR action frame to the base wireless communication terminal. The parameter related to the WUR operation may include at least one of a duty-cycle period and a length of on duration. The exchange process of the WUR action frame may be repeated until the configuration of parameters related to the WUR operation is completed. When the parameter agreement related to the WUR operation is completed, the wireless communication terminal may change the power management mode to the power save mode and enter the PCR doze state.

When the wireless communication terminal of the PCR doze state receives a wake-up frame indicating a WUR ID that identifies the wireless communication terminal or a WUR ID that identifies a plurality of wireless communication terminals including the wireless communication terminal, the wireless communication terminal stores the information indicated by the wake-up and turns on the PCR transceiver. Specifically, the wireless communication terminal stores the information indicated by the wake-up and transmits a signal for turning on the PCR transceiver. When the PCR transceiver is turned on, the wireless communication terminal may transmit information obtained from the wake-up frame to the PCR transceiver. In this case, the information obtained from the wake-up frame may include at least one of the packet number and Timer Synchronization Function (TSF) described above.

After the PCR transceiver is turned on, the wireless communication terminal may transmit an awake indication to the base wireless communication terminal. In this case, the awake frame may indicate the first transmission frame to the AP through the PCR transceiver after the PCR transceiver wakes up. The awake frame may be a frame indicating that the PCR transceiver of the station transmitting the awake frame is in the awake state. This is because the base wireless communication terminal needs to check whether the wireless communication terminal wakes up successfully.

Specifically, when a WUR frame is transmitted through WUR, 1 bit is transmitted through one OFDM symbol. Therefore, the transmission time of the WUR frame through WUR is very long. In addition, PCR transition delay, which is the time required to turn on the PCR transceiver in the PCR doze state, may also be a relatively long time. Therefore, even if the wireless communication terminal fails to wake up, when the base wireless communication terminal attempts transmission through PCR, the wake-up process needs to be performed again and it takes a relatively long time again until the wireless communication terminal wakes up. The wireless communication terminal can reduce the time required to transmit the awake frame by transmitting the awake frame using PCR rather than WUR. The wireless communication terminal may transmit an awake frame according to a channel access method for PCR.

The awake frame may be a separate control frame defined for the WUR operation. In addition, the awake frame may be a frame used in an existing wireless LAN standard, such as a PS-poll frame. When the base wireless communication terminal wants to receive an awake frame after designating a specific wireless time, the wireless communication terminal may attempt channel access for awake frame transmission after a corresponding time elapses after wake-up. In this case, the wireless communication terminal may obtain information on a specific time through the WUR capability element. As described above, the WUR capability element may be transmitted through a probe request frame, an authentication request frame, and an association request frame. Also, the wireless communication terminal may obtain information on a specific time through a WUR action frame.

The base wireless communication terminal receiving the awake frame may transmit an awake response frame (hereinafter referred to as an 'AW response frame') to the wireless communication terminal. The AW response frame may be an immediate response frame. Specifically, the AW response frame may be an ACK frame. Further, the AW response frame may be a separately defined control frame for WUR operation. Further, the AW response frame may be QoS data. The wireless communication terminal receiving the AW response frame can perform a general PCR operation.

When the base wireless communication terminal does not receive an awake frame from a time point of transmitting a wake-up frame to a predetermined time, the base wireless communication terminal may determine that the wake-up of the wireless communication terminal fails. In this case, the base wireless communication terminal may transmit a wake-up frame to the wireless communication terminal again. In order to determine whether a predetermined time elapses, the base wireless communication terminal may configure a timer after transmitting a wake-up frame. The predetermined time may be a time longer than the sum of the PCR transition delay and the NAVSyncDelay value of the wireless communication terminal. NAVSyncDelay indicates a time during which the transmission of the wireless communication terminal is prohibited so that the wireless communication terminal can configure the NAV based on a frame or PPDU transmitted through PCR after wake-up.

In the embodiment of FIG. 11, the first WUR station WUR STA1 and the second WUR station WUR STA2, which are APs, perform a link setup procedure. In this case, the first WUR station WUR STA1 and the second WUR station WUR STA2 exchange WUR capability elements and WUR mode elements. In addition, the second WUR station WUR STA2 transmits a WUR action frame to the base wireless communication terminal to enter the WURX doze state. The first WUR station WUR STA1 and the second WUR station WUR STA2 exchange action frames to configure WUR operation-related parameters. When the first WUR station WUR STA1 has data to be transmitted to the second WUR station WUR STA2, the first WUR station WUR STA1 transmits a wake-up frame to the second WUR station WUR STA2. The second WUR station WUR STA2 receives the wake-up frame and turns on the PCR transceiver. In this case, it takes as long as the PCR switching delay until the PCR transceiver is turned on. After the PCR transceiver is turned on, the second WUR station WUR STA2 transmits an awake frame to the base wireless communication terminal. The first WUR station WUR STA1 transmits an AW response frame to the second WUR station WUR STA2. Through these operations, the wireless communication terminal can enter the PCR doze state and wake-up again.

Figure 12:
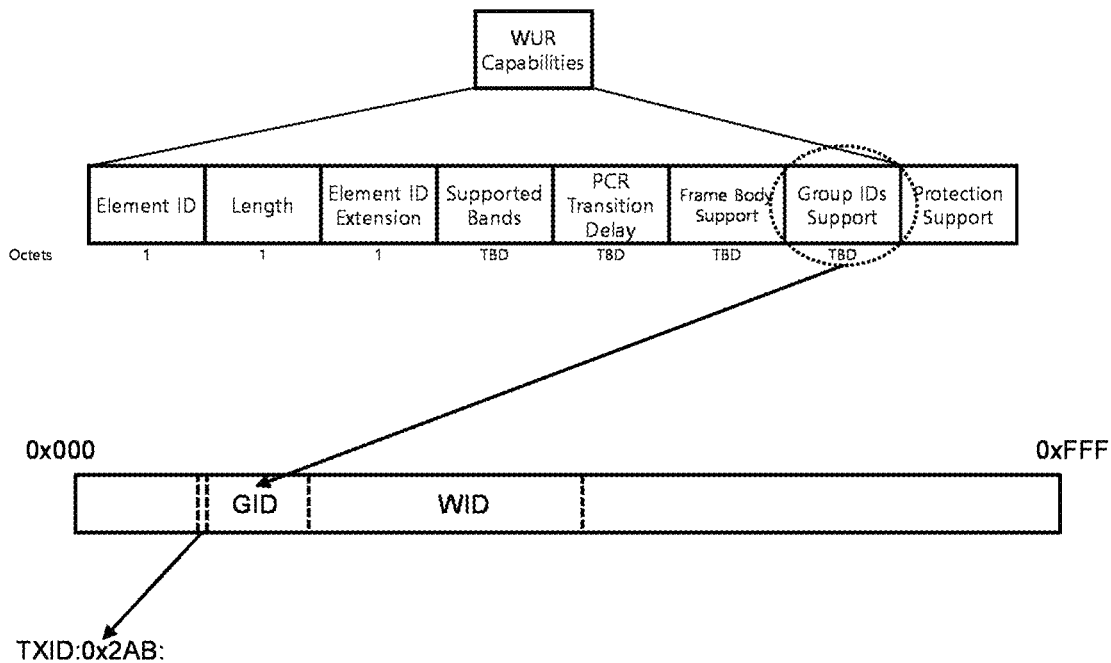
FIG. 12 illustrates a format of a WUR capability element according to an embodiment of the present invention.

Hereinafter, the format of the WUR capability element described with reference to FIG. 11 will be described in detail with reference to FIG. 12. FIG. 12 illustrates a format of a WUR capability element according to an embodiment of the present invention. The WUR capability element may follow the format of the general extension element of the 802.11 standard. Specifically, the WUR capability element may include an Element ID field, a Length field, and an Element ID extension field. Further, the WUR capability element may include information indicating a frequency band through which the wireless communication terminal transmitting the WUR capability element can transmit and receive WUR frames. Specifically, the WUR capability element may include a Supported Bands field. The Supported Bands field may include bits allocated for each of a plurality of frequency bands. For example, the Supported Bands field may include at least one bit indicating whether WUR frame transmission/reception is possible through the first frequency band. Furthermore, the Supported Bands field may include at least one bit indicating whether WUR frame transmission/reception is possible through the second frequency band. In this case, the first frequency band and the second frequency band may be different from each other. Also, the plurality of frequency bands may include frequency bands of 2.4 GHz and 5 GHz. In addition, when the terminal transmitting the Supported Bands field is a base wireless communication terminal, the Supported Bands field may be used as a reserved field.

In addition, the WUR capability element may further include WUR capability information. For example, the WUR capability element may include information on the PCR transition delay, which is the time required for the wireless communication terminal that transmits the WUR capability element to turn on the PCR transceiver in the PCR doze state. This information may be referred to as PCR transition delay information. The base wireless communication terminal transmitting the wake-up frame may determine whether the wake-up failure is based on a time longer than the sum of the PCR transition delay and the time required to transmit the awake frame. After transmitting the wake-up frame, the base wireless communication terminal may configure a timer having a period longer than the sum of the PCR transition delay and the time required to transmit the awake frame. When the timer expires, the base wireless communication terminal may determine that the wake-up fails.

The WUR capability element may include information indicating whether the wireless communication terminal that transmits the WUR capability element can receive a WUR frame of variable length. Specifically, the WUR capability element may include a Frame Body Support field. When the Frame Body Support field is activated, the wireless communication terminal may receive a WUR frame of variable length. Conversely, when the Frame Body Support field is deactivated, the wireless communication terminal can receive only the minimum length WUR frame transmitted in a predefined length without a Frame Body.

The WUR capability element may include a Group IDs Support field. The Group IDs Support field may include information indicating whether the wireless communication terminal transmitting the WUR capability element can receive the WUR frame identified by the group ID. The base wireless communication terminal may transmit a WUR frame identifying the recipient with a unique WUR ID to the wireless communication terminal signaling that the WUR frame identifying the recipient by the group ID cannot be received through the Group IDs Support field. The base wireless communication terminal cannot transmit the WUR frame identifying the recipient by the group WUR ID to the wireless communication terminal signaling that the recipient cannot receive the WUR frame identifying the recipient by the group ID through the Group IDs Support field.

In addition, the Group IDs Support field may indicate the maximum number of group IDs that can be processed by the wireless communication terminal that has transmitted the WUR capability element. The base wireless communication terminal may allocate a group ID of a maximum number or less that the corresponding wireless communication terminal signals through the group-address WUR frame information to the wireless communication terminal that transmits the WUR capability element. In addition, the base wireless communication terminal cannot allocate a group WUR ID of more than the maximum number that the corresponding wireless communication terminal signals through the group-address WUR frame information to the wireless communication terminal that transmits the WUR capability element.

According to a further embodiment, the process of signaling the WUR ID of the wireless communication terminal in the process of configuring the WUR mode by the wireless communication terminal and the base wireless communication terminal may be omitted. The base wireless communication terminal may implicitly allocate a WUR ID to each terminal. For example, consecutive group IDs and WUR IDs may be allocated to the wireless communication terminals belonging to one BSS based on TXID. For example, the range of identifiers that can be allocated to wireless communication terminals belonging to one BSS may be from TXID to a preconfigured number. As in FIG. 12, when the TXID is 0x2AB, wireless communication terminals belonging to the corresponding BSS can allocate consecutive values from 0x2AC to a preconfigured number. In this case, the group ID can be allocated preferentially compared to the individual WUR ID. In this case, the wireless communication terminal may determine the WUR ID of the wireless communication terminal based on the bitmap size information of the TXID and group ID of the BSS to which the wireless communication terminal belongs. In this case, the bitmap size information of the group ID may be transmitted from the base wireless communication terminal. Bitmap size information of the group ID may be signaled through a WUR mode element, which will be described later.

The WUR capability element may include information indicating whether the wireless communication terminal transmitting the WUR capability element supports Message Integrity Check (MIC) operation. This information may be referred to as a Protection Supported field. The base wireless communication terminal may transmit a WUR frame using the MIC instead of the FCS to the wireless communication terminal signaled to support MIC operation through the Protection Supported field. The base wireless communication terminal may not be allowed to transmit the WUR frame using the MIC instead of the FCS to the wireless communication terminal signaling not to support the MIC operation through the Protection Supported field. A wireless communication terminal supporting MIC can detect an external attack or the like through MIC operation. In this case, the wireless communication terminal may transmit an action frame requesting a new WUR ID to the base wireless communication terminal.

Figure 13:
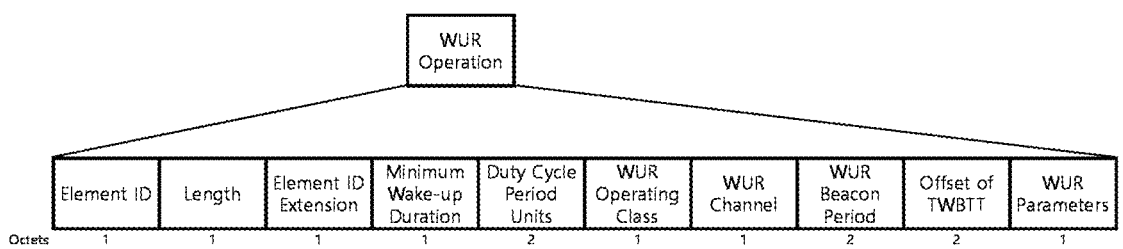
FIG. 13 illustrates a configuration of a WUR operation element according to an embodiment of the present invention. The WUR operation element may include parameters related to the WUR operation that the base wireless communication terminal is operating in the BSS.

Hereinafter, a WUR operation element including parameters related to WUR operation of the wireless communication terminal will be described with reference to FIG. 13. FIG. 13 illustrates a configuration of a WUR operation element according to an embodiment of the present invention. The WUR operation element may include parameters related to the WUR operation that the base wireless communication terminal is operating in the BSS. Parameters signaled through the WUR operation element may be commonly applied to wireless communication terminals operating in the WUR mode. In addition, parameters individually applied to each wireless communication terminal may be configured through a WUR mode element to be described later.

The WUR operation element may follow the general extension element format of the 802.11 standard. Specifically, the WUR capability element may include an Element ID field, a Length field, and an Element ID extension field. In addition, the WUR operation element may include a WUR operation parameter composed of WUR duty-cycle operation and related parameters.

The WUR operation element may include information indicating the minimum awake duration of the wireless communication terminal in on-duration when the WUR duty cycle is operated. This information may be referred to as minimum wake-up duration information. In this case, the minimum awake holding time may be indicated in units of 256 microseconds (us). The WUR operation element may include information indicating a unit for indicating the period of the duty cycle. This information may be referred to as duty-cycle period units.

The WUR operation element may include information indicating at least one channel that the base wireless communication terminal can use to transmit the WUR frame. This information may be referred to as WUR operating class information. The WUR operation element may include information indicating a channel being used for WUR frame transmission among at least one available channel. This information may be referred to as WUR channel information.

The WUR operation element may include information related to a WUR beacon frame reception period. Specifically, the WUR operation element may include information indicating the number of time units between successive target WUR beacon transmission times (TWBTTs). In addition, the WUR operation element may include information indicating a target WUR beacon transmission time that arrives most quickly based on the current time point. In addition, the WUR operation element may include additional WUR parameter fields. For example, the WUR parameter field may include a PCR BSS parameter update counter value that the base wireless communication terminal inserts and transmits in a WUR beacon frame.

Figure 14:
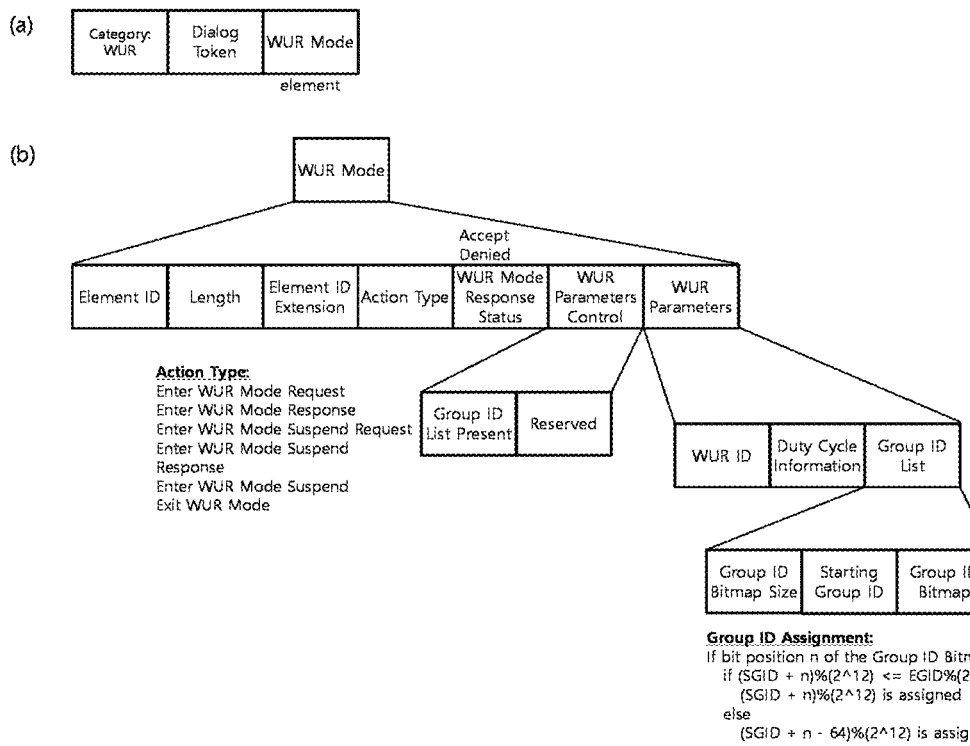
FIG. 14 illustrates an exemplary format of a WUR action frame and an exemplary format of a WUR mode element in a wireless communication terminal according to an embodiment of the present invention.

Hereinafter, a WUR action frame through which the wireless communication terminal transmits parameters related to WUR operation for configuration will be described with reference to FIG. 14. In addition, the WUR mode element used for configuring parameters related to the WUR operation will also be described. FIG. 14 illustrates an exemplary format of a WUR action frame and an exemplary format of a WUR mode element in a wireless communication terminal according to an embodiment of the present invention.

According to an embodiment of the present invention, the wireless communication terminal may configure a parameter related to the WUR operation by transmitting a WUR mode element to the base wireless communication terminal. As described above, the wireless communication terminal may transmit the WUR mode element in the link setup process. Also, the wireless communication terminal may transmit a WUR mode element through an action frame.

FIG. 13(a) illustrates a format of a WUR action frame according to an embodiment of the present invention. The format of the WUR action frame may follow the general action frame format of the 802.11 standard. In this case, the Category field of the WUR action frame may be configured as WUR. In addition, the WUR action frame may include a Dialog Token field and a WUR mode element field. The Dialog Token value may indicate a transmission order of sequentially transmitted WUR action frames. The WUR mode element may include parameters related to the operation of the wireless communication terminal in the WUR mode. For example, the wireless communication terminal may transmit a WUR mode element through a WUR action frame.

FIG. 13(b) illustrates an exemplary format of a WUR mode element according to an embodiment of the present invention. In the WUR mode element, the WUR action frame may include information indicating the role of the WUR action frame. Information indicating the role of the WUR action frame may be signaled through the Action Type field. The wireless communication terminal and the base wireless communication terminal exchanging the WUR action frame may perform an operation according to the Action Type field of the exchanged WUR action frame. The Action Type field may indicate one of Enter WUR Mode Request/Response, Enter WUR Mode Suspend Request/Response, Enter WUR Mode Suspend, and Enter WUR Mode for each operation.

The WUR mode element may include information indicating a response to values included in the received WUR mode element. This information can be signaled through the WUR Mode Response Status field. In this case, the wireless communication terminal transmitting the WUR mode element may be referred to as a request terminal. Also, a wireless communication terminal that receives a WUR mode element from a request terminal and transmits a new WUR mode element in response thereto may be referred to as a response terminal. In this case, the request terminal may be any of AP and non-AP stations. Similarly, the response terminal may be any of AP and non-AP station. The WUR Mode Response Status field may be configured as Accept or Denied.

The WUR mode element may include information indicating the configuration of subsequent WUR parameters. This information may be referred to as WUR parameters control. For example, the WUR parameters Control field may include a Group ID List Present field indicating that there is a group ID allocation to the wireless communication terminal that transmits the WUR mode element. According to an embodiment, when the Group ID List Present is activated, the subsequent WUR parameter field may include a Group ID List field indicating a group ID allocated to the wireless communication terminal.

The WUR mode element may include WUR mode related parameters indicated in the WUR parameters Control field.

For example, the WUR mode element may include information indicating the WUR ID allocated to the wireless communication terminal. Further, the WUR mode element may include information indicating parameters related to duty cycle operation of the wireless communication terminal. For example, the parameter related to the duty cycle operation may include a TSF value indicating the start time point of the WUR duty cycle of the wireless communication terminal.

As described above, when the Group ID List Present is activated in the WUR Parameters Control field, the WUR mode element may include information indicating the group ID allocated to the wireless communication terminal. Information indicating the group ID allocated to the wireless communication terminal may be signaled in the form of a bitmap. The WUR mode element may include a group ID bitmap field. For example, the WUR mode element may include a Group ID Bitmap Size field indicating the size of the group ID bitmap. In this case, the size of the group ID bitmap including the group ID information may be a value smaller than the maximum number of group IDs that the wireless communication terminal can process. The maximum group ID can be signaled through the WUR capability element described above.

Further, the WUR mode element may include a Starting Group ID (SGID) field indicating a range of positions corresponding to the group ID in the bitmap. The wireless communication terminal may obtain the group ID allocated to the group including the wireless communication terminal based on the Group ID Bitmap Size field value and the Starting Group ID value. The wireless communication terminal may obtain group ID allocation information by combining the SGID value and the Ending Group ID (EGID) value. Here, the EGID may be calculated based on the signaled group ID bitmap size value and the SGID value. According to an embodiment, when the value of the n-th bit in the group ID bitmap is 1 and SGID+n is less than or equal to EGID, it may indicate that the group ID corresponding to SGID+n is allocated to a user equipment. Conversely, when the value of SGID+n is greater than EGID, it may indicate that the group ID corresponding to SGID+n−64 is allocated to the terminal. In WUR BSS, the group ID may be any one of 64 consecutive values among 12-bit values. In this case, one or more wireless communication terminals included in the WUR BSS may be user equipments operating in the WUR mode. Therefore, through the above-described method, the group ID bitmap size included in the WUR mode element may be minimized.

According to a further embodiment, the base wireless communication terminal may allocate the group ID and the WUR ID with a continuous value based on the TXID to minimize WUR ID storage space and WUR ID allocation complexity. When the TXID value determined based on the PCR BSSID approaches the 0xFFF value, it may be difficult to obtain 64 consecutive values based on the TXID. In this case, a separate rule for allocating group ID and WUR ID may be required according to the location of the TXID value. According to an embodiment, the base wireless communication terminal may utilize a modulo operation of $2^{12}$ units for group ID allocation. For example, if the n-th value of the group ID bitmap is 1 and (SGID+n) %($2^{12}$) is less than or equal to EGID %($2^{12}$), it may indicate that the group ID corresponding to (SGID+n) %($2^{12}$) is allocated to the user equipment. Conversely, if the value of (SGID+n) %($2^{12}$) is greater than EGID %($2^{12}$), it can indicate that the group ID corresponding to (SGID+n−64) %($2^{12}$) is allocated to the user equipment. Through this, the base wireless communication terminal can allocate the group ID and the WUR ID to the wireless communication terminals with the same rule regardless of the TXID value of the BSS.

Moreover, when the wireless communication terminal communicating with the base wireless communication terminal through PCR is out of the transmission coverage of the base wireless communication terminal, the wireless communication terminal may determine that the connection with the base wireless communication terminal is lost (connection lost). In this case, the wireless communication terminal may perform a scan procedure for association with a new BSS. Specifically, the wireless communication terminal may attempt to connect to the corresponding base wireless communication terminal based on the beacon frame transmitted by the new base wireless communication terminal.

In the PCR doze state, the wireless communication terminal cannot receive the beacon frame transmitted by PCR. In addition, the wireless communication terminal cannot transmit any MAC frame through PCR unless turning on the PCR transceiver by receiving a wake-up frame or turning on the PCR transceiver for PCR transmission. Therefore, it may be difficult to determine whether the wireless communication terminal in the PCR doze state is outside the transmission coverage of the base wireless communication terminal. In addition, the wireless communication terminal can maintain the PCR doze state even though it is outside the transmission coverage of the base wireless communication terminal. For efficient operation of the wireless communication terminal, the base wireless communication terminal may transmit a WUR beacon frame periodically through WUR. This will be described in detail with reference to FIG. 15.

Figure 15:
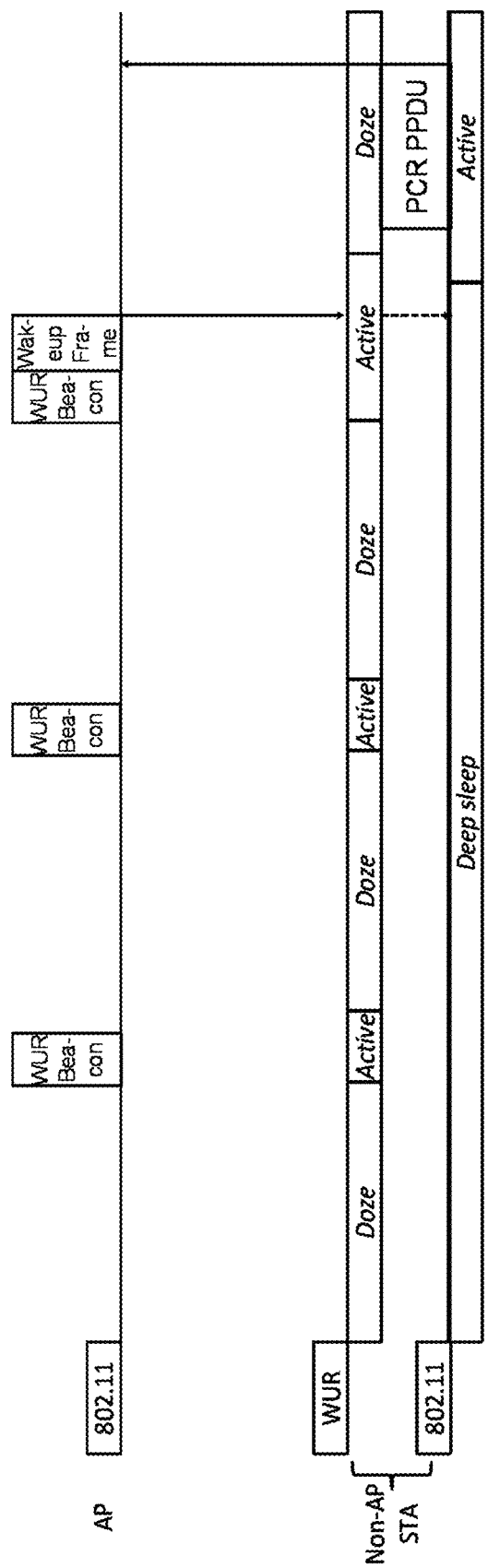
FIG. 15 is a diagram illustrating a method for a wireless communication terminal to receive a WUR beacon frame according to an embodiment of the present invention.

FIG. 15 is a diagram illustrating a method for a wireless communication terminal to receive a WUR beacon frame according to an embodiment of the present invention.

As described above, the WUR beacon frame is a type of WUR frame and may be transmitted through a WUR PPDU. The WUR beacon frame may include information on the time synchronization function (TSF) so that a wireless communication terminal in PCR doze state can perform accurate time synchronization. In addition, the WUR beacon frame may be transmitted periodically. In this case, the transmission period of the WUR beacon frame may be longer than the transmission period of the PCR beacon frame.

The WUR beacon frame may include information on the above-described BSS. For example, the WUR beacon frame may signal the same information as the signaling information of the PCR beacon frame transmitted through the PCR. The WUR beacon frame, like the wake-up frame, may include legacy parts and WUR parts. The legacy part of the WUR beacon frame may have the same role and structure as the legacy part of the wake-up frame. The WUR part of the WUR beacon frame may include identifier information of the base wireless communication terminal.

In addition, the WUR beacon frame may not include the identifier of the intended recipient of the WUR beacon frame, and may include a TXID that identifies the base wireless communication terminal transmitting the WUR beacon frame. Specifically, the ID field of the WUR beacon frame may indicate the TXID of the base wireless communication terminal transmitting the WUR beacon frame. Further, when the wireless communication terminal receives the WUR beacon frame, the wireless communication terminal may not wake-up the PCR transceiver. This is because when the wireless communication terminal receives the WUR beacon frame, it may not be necessary to perform active scanning of the PCR transceiver.

When the wireless communication terminal in PCR doze state has no data to transmit to the base wireless communication terminal, the wireless communication terminal may turn off WURx based on the WUR beacon frame transmission period. Specifically, when the PCR doze state wireless communication terminal has no data to be transmitted to the base wireless communication terminal, the wireless communication terminal may maintain the WURx to be turned on in the time period during which the WUR beacon frame is transmitted and turn off the WURx in the remaining time period. The operation of the wireless communication terminal is a WUR duty-cycle operation, and the operation mode of the wireless communication terminal may be referred to as a WUR duty-cycle mode.

Also, a state in which the wireless communication terminal turns off WURx may be referred to as a WUR doze state or a deep sleep state. When the base wireless communication terminal has data to be transmitted through PCR to the wireless communication terminal in the WUR duty-cycle mode, the base wireless communication terminal may transmit a wake-up frame to the corresponding wireless communication terminal immediately after transmitting the WUR beacon frame. In addition, when the base wireless communication terminal has data to be transmitted through PCR to the wireless communication terminal of the WUR duty-cycle mode, the base wireless communication terminal may transmit a traffic indication map (TIM) indicating that there is data to be downlink-transmitted through the WUR beacon frame.

When the wireless communication terminal does not receive the WUR beacon frame for a predetermined time, the wireless communication terminal may wake-up the PCR transceiver. In this case, when the wireless communication terminal does not receive the PCR beacon frame from the base wireless communication terminal associated with the wireless communication terminal through PCR, the wireless communication terminal may perform a scanning operation. Specifically, the wireless communication terminal may transmit a probe request frame through PCR. When the TXID of the received WUR beacon frame is different from the TXID of the base wireless communication terminal combined with the wireless communication terminal, the wireless communication terminal may wake-up the PCR transceiver.

In the embodiment of FIG. 15, the AP periodically transmits a WUR beacon frame. In the WUR duty-cycle mode station, the WUR beacon frame maintains the WURx to be turned on according to the transmission period, and maintains the WURs doze state at other times. When the AP has data to transmit to the station through PCR, the AP transmits a wake-up frame to the station immediately after transmitting the WUR beacon frame. The station receives the wake-up frame and wakes-up the PCR transceiver.

The WUR beacon frame does not include individual information on the WUR service, but may include information on the TSF. When the base wireless communication terminal operates multiple BSS, it may be inefficient for the base wireless communication terminal to allocate a different TXID for each BSS and transmit a WUR beacon frame for each BSS. Therefore, the base wireless communication terminal can configure a representative TXID of multiple BSSIDs. The base wireless communication terminal can insert the configured representative TXID into the ID field of the WUR beacon frame of all BSSs operated by the base wireless communication terminal. In this case, the representative TXID may be the TXID of the transmitted BSS. Therefore, when the base wireless communication terminal transmits a WUR beacon frame to a non-transmitted BSS, the ID field of the corresponding WUR beacon frame can be configured with the TXID of the transmitted BSS.

The base wireless communication terminal may not allocate a TXID to the non-transmitted BSS. If the TXID is not allocated to the non-transmitted BSS, a method of transmitting a broadcast WUR frame to a wireless communication terminal belonging to a non-transmitted BSS may be needed. The base wireless communication terminal may configure a wireless communication terminal belonging to an individual non-transmission BSS as a group identified by one group WUR ID. For this, a wireless communication terminal supporting multiple BSSIDs may be required to support one or more group WUR IDs.

In another specific embodiment, the base wireless communication terminal may allocate a TXID to the non-transmitted BSS. In addition, the base wireless communication terminal may signal the TXID of the transmitted BSS to the non-transmitted BSS through the WUR mode element. In this embodiment, when the base wireless communication terminal transmits a broadcast WUR frame to the wireless communication terminal belonging to the non-transmitted BSS, the base wireless communication terminal configures the ID field of the corresponding WUR frame as the TXID of the corresponding non-transmitted BSS. In addition, when the wireless communication terminal belonging to the non-transmitted BSS receives a WUR beacon frame in which the ID field indicates the TXID of the transmitted BSSID, the wireless communication terminal can perform time synchronization based on the WUR beacon frame.

In another specific embodiment, the base wireless communication terminal may allocate a TXID to the non-transmitted BSS according to a predetermined rule. Specifically, the base wireless communication terminal may allocate the TXID to the non-transmitted BSS based on the TXID of the transmit BSS. In a specific embodiment, the base wireless communication terminal may configure the TXID of the non-transmitted BSS as a value obtained by adding a specific value to the TXID of the transmitted BSS. In this case, when the base wireless communication terminal signals the TXID, the base wireless communication terminal may signal the TXID of the transmitted BSS instead of the TXID of the non-transmitted BSS to the wireless communication terminal belonging to the non-transmitted BSS. In addition, the base wireless communication terminal may signal a specific value to be added to the TXID of the transmitted BSS using the bitmap of the traffic indication map (TIM) element transmitted through PCR. Specifically, a specific bit of the bitmap of the TIM element transmitted through PCR may indicate a predetermined value. In this embodiment, the wireless communication terminal belonging to the non-transmitted BSS may obtain a TXID of the non-transmitted BSS by adding a specific value to the TXID of the transmitted BSS.

Figure 16:
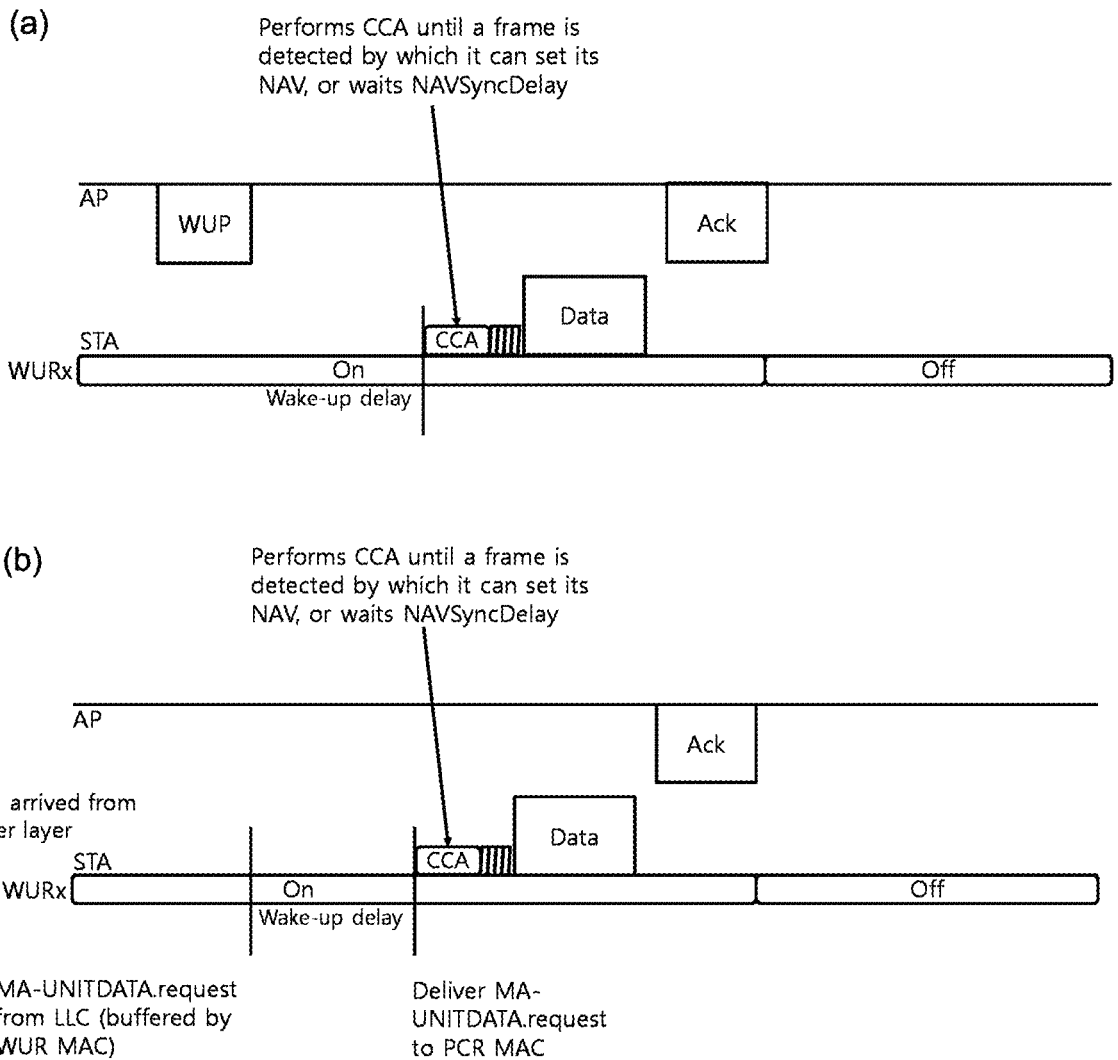
FIG. 16 is a diagram illustrating a wake-up operation of a wireless communication terminal according to an embodiment of the present invention.

FIG. 16 is a diagram illustrating a wake-up operation of a wireless communication terminal according to an embodiment of the present invention.

The wireless communication terminal in PCR doze state cannot detect the frame transmitted through PCR. Therefore, when the wireless communication terminal in the PCR doze state wakes up in the PCR doze state, the corresponding wireless communication terminal can access the channel without considering the hidden-node. Therefore, the wireless communication terminal may attempt to transmit after detecting a frame or PPDU capable of configuring NAV after wake-up in the PCR doze state. In a specific embodiment, after wake-up in the PCR doze state, the wireless communication terminal may hold a transmission attempt until a frame capable of configuring NAV is detected or a predetermined time elapses. In this case, the predetermined time may be referred to as NAVSyncDelay. For example, the wireless communication terminal may wake up in the PCR doze state, and then perform a clear channel assembly (CCA) until a predetermined time point, and then attempt transmission when NAV configurable frames are not detected up to a predetermined time point. The transmission attempt may indicate allocating the channel according to the channel access procedure.

In the embodiment of FIG. 16(a), the station receives a wake-up frame from the AP in the PCR doze state. Upon receiving the wake-up frame, the station turns on the PCR transceiver. The station may attempt to perform transmission after performing CCA when a frame capable of configuring the NAV is received, or until the NAVSyncDelay elapses from the wake-up time.

A wireless communication terminal attempting to perform transmission after wake-up in the PCR doze state may need to perform a backoff operation according to an Enhanced Distributed Channel Access (EDCA) rule. In the case of the existing wireless LAN operation, the wireless communication terminal receives primitive, which is MA-UNITDATA.request, from the higher layer and starts the backoff operation according to the EDCA rules. A wireless communication terminal attempting to perform transmission after waking-up in the PCR doze state may receive a MA-UNITDATA.request from a higher layer by a WUR MAC layer operating separately from the PCR MAC layer. Therefore, the PCR MAC layer may not receive the MA-UNITDATA.request primitive. The WUR MAC layer can store the MA-UNITDATA.request primitive up to the time point at which the PCR transceiver is turned on, and deliver the MA-UNITDATA.request primitive to the PCR MAC layer. In another specific embodiment, there may be a MAC Service Access Point (SAP) connecting the PCR MAC layer and the WUR MAC layer. In this case, when the PCR MAC layer wakes up, MAC SAP may deliver MA-UNITDATA.request to the PCR MAC layer.

In the embodiment of FIG. 16(b), the station receives a wake-up frame from the AP in the PCR doze state. Upon receiving the wake-up frame, the station turns on the PCR transceiver. The WUR MAC layer of the station stores the MA-UNITDATA.request primitive until the time point at which the PCR transceiver is turned on, and transmits the MA-UNITDATA.request primitive to the PCR MAC layer of the station.

Figure 17:
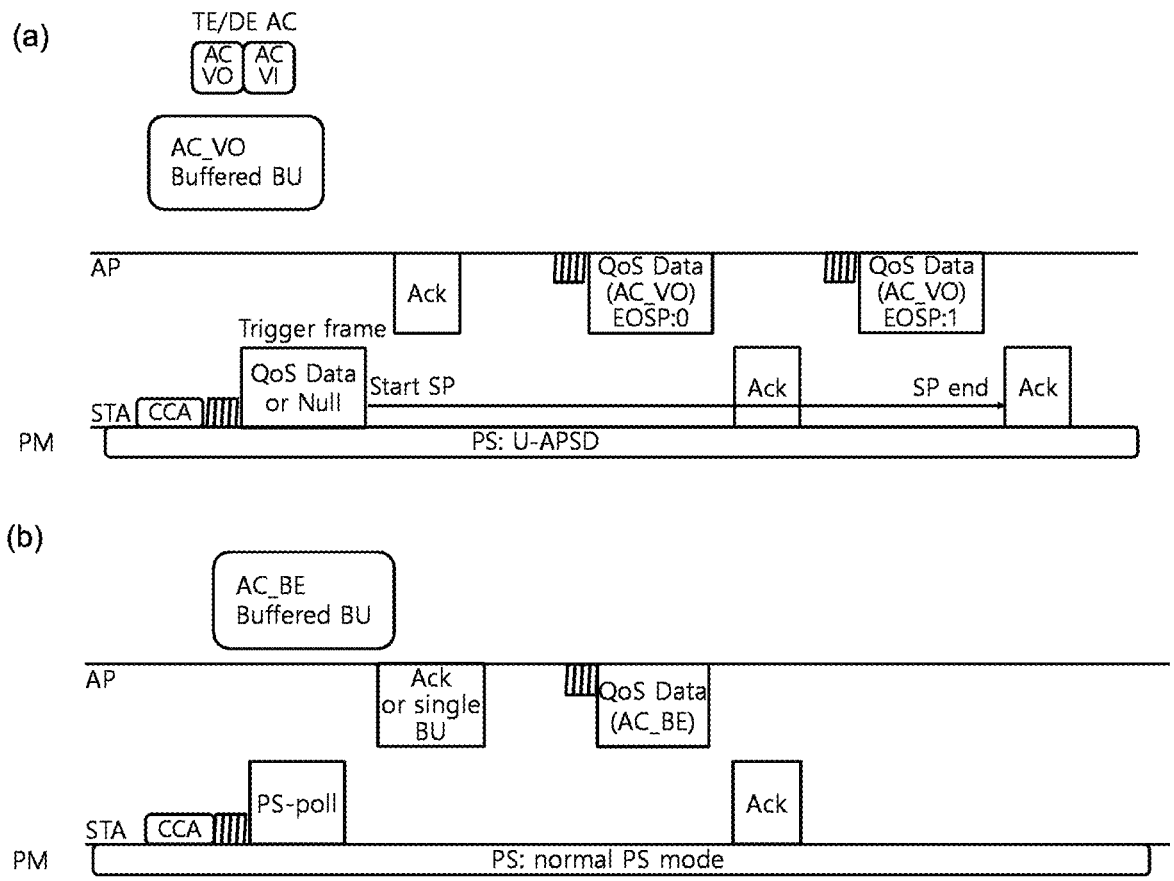
FIG. 17 is a diagram illustrating a wake-up operation of a wireless communication terminal according to an embodiment of the present disclosure.

FIG. 17 is a diagram illustrating a wake-up operation of a wireless communication terminal according to an embodiment of the present disclosure.

When a wireless communication terminal uses a power management function in a conventional wireless LAN, the terminal can operate in two modes, that is, an active mode and a power save (PS) mode. In the active mode, the wireless communication terminal always maintains an awake state. When the wireless communication terminal is in the PCR doze state, since the wireless communication terminal cannot receive the frame transmitted by the base wireless communication terminal, the base wireless communication terminal must be able to determine whether the wireless communication terminal is in the PCR doze state. Therefore, the base wireless communication terminal can record in which mode among the active mode or the PS mode the wireless communication terminal connected to the base wireless communication terminal operates. For this, when the wireless communication terminal switches the mode of power management, the wireless communication terminal may signal a mode switch of power management by configuring a value of a Power Management (PM) subfield of a Frame Control field of data transmitted by the wireless communication terminal.

After completion of the transmission sequence initiated by the wireless communication terminal, the wireless communication terminal may switch the power management mode. In addition, the wireless communication terminal may be limited to switching a power management mode using a transmission sequence requesting an immediate response. When the wireless communication terminal transmits data in which the PM subfield is set to 1 and receives an immediate response (ex: ACK frame, BA frame) to the corresponding data, the wireless communication terminal may start a power save mode operation. In addition, when the wireless communication terminal transmits data in which the PM subfield is set to 0 and receives an immediate response (ex: ACK frame, BA frame) to the corresponding data, the wireless communication terminal may start an active mode operation.

The existing wireless LAN standard defines a number of detailed protocols for power save mode operation. Among many detailed protocols, normal power save mode and unscheduled automatic power save delivery (U-APSD) are protocols that do not require a separate scheduling process.

In the power save mode, there may be no restrictions on the uplink transmission of the wireless communication terminal. In the power save mode, the wireless communication terminal may switch from the PCR doze state to the PCR awake state at any time and attempt uplink transmission. However, when the base wireless communication terminal performs downlink transmission, in the case where the wireless communication terminal is in a PCR doze state, downlink transmission cannot be received. Therefore, both the normal power save mode and the U-APSD define the operation of the wireless communication terminal and the base wireless communication terminal based on the downlink transmission situation.

When the wireless communication terminal switches from the active mode to the PS mode in the normal power save mode, the base wireless communication terminal cannot directly transmit data to the wireless communication terminal. The base wireless communication terminal stores data to be transmitted to the wireless communication terminal in a buffer. Then, the base wireless communication terminal signals that there is data to be transmitted to the corresponding terminal using the TIM element of the beacon frame. The wireless communication terminal in PS mode receives a beacon frame in an awake state, and when the bit corresponding to the AID of the wireless communication terminal of the TIM element indicates that there is data to be transmitted, the wireless communication terminal can transmit the PS-poll frame to the base wireless communication terminal. In this case, the wireless communication terminal may perform EDCA backoff in the AC_BE class to transmit the PS-poll frame. The base wireless communication terminal receiving the PS-poll frame may transmit either an ACK frame or a DL Bufferable Unit (BU) to the corresponding wireless communication terminal. The wireless communication terminal receiving the ACK frame must maintain the awake state until the base wireless communication terminal transmits BU in the new Transmit Opportunity (TXOP). If the BU More Data field transmitted by the base wireless communication terminal is activated, the wireless communication terminal should transmit the PS-poll frame again.

The wireless communication terminal needs to check the beacon frame every specified period designated as a delivery traffic indication map (DTIM) period.

Whether the U-APSD is used by the wireless communication terminal can be configured for each AC in the link setup step such as the (re)connection step. The AC of the wireless communication terminal using U-APSD is configured as a trigger-enabled AC. The corresponding AC of the base wireless communication terminal is regarded as a delivery-enabled AC. The wireless communication terminal may not check the TIM element for AC corresponding to the trigger-enabled AC. The wireless communication terminal may transmit a trigger frame at any time point to open a service period and trigger DL buffered BU transmission. In this case, the trigger frame is one of QoS data or null frames transmitted from the trigger-enabled AC. A service period for a corresponding wireless communication terminal starts from a time point at which an immediate response to a trigger frame transmitted by the wireless communication terminal is received. In the corresponding service period, the base wireless communication terminal may transmit the buffered BU. Therefore, the wireless communication terminal must maintain an awake state from the BU transmitted by the base wireless communication terminal to a time point at which an End Of Service Period (EOSP) is activated or an end time point of a corresponding service period. When the wireless communication terminal uses U-APSD for some AC, whether there is a buffered BU of the AC is not indicated by the TIM. Only the presence of a buffered BU of AC without U-APSD is displayed in the TIM. Therefore, the wireless communication terminal should check the TIM to receive the buffered BU of AC that does not use the U-APSD, and must follow the operation of the normal power save mode.

In the embodiment of FIG. 17(*a*), the station receives data corresponding to AC_VO and AC_VI using U-APSD. The station starts a service period by transmitting a trigger frame to the AP. The station receives an ACK frame for the trigger frame from the AP. The AP transmits QoS data corresponding to AC_VO and QoS data corresponding to AC_VI to the station. The station remains awake until the service period ends.

In the embodiment of FIG. 17(*b*), the station receives data corresponding to AC_BE through the normal PS mode. The station receives the beacon frame from the AP and checks that the bit of the TIM corresponding to the AID of the station is activated. The station transmits a PS-poll frame to the AP, and receives a BU or ACK frame from the AP. When the station receives the ACK frame for the PS-poll frame, the awake state is maintained until QoS data is received from the AP. Upon receiving the QoS data, the station may transmit an ACK frame and enter the PCR doze state again.

Figure 18:
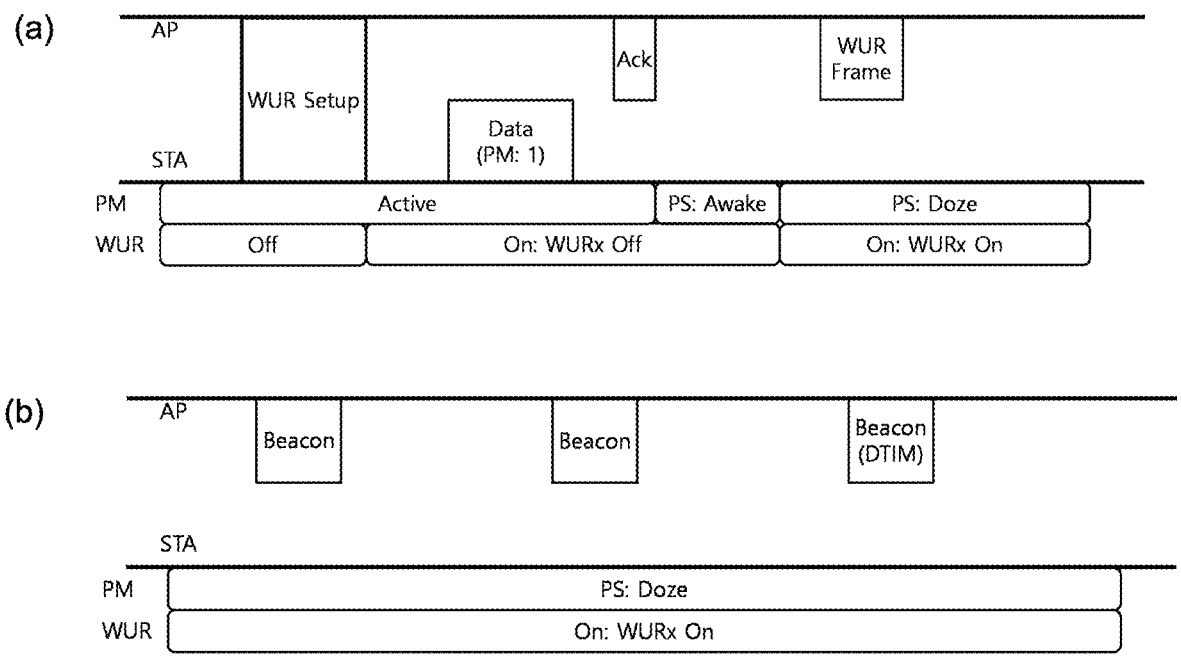
FIG. 18 is a diagram illustrating an operation in which a wireless communication terminal interworking a WUR-based power save mode and a general power save mode according to an embodiment of the present invention.

FIG. 18 is a diagram illustrating an operation in which a wireless communication terminal interworking a WUR-based power save mode and a general power save mode according to an embodiment of the present invention.

It is necessary to operate the mode conversion so that the power management mode of the wireless LAN does not collide with the WUR-based power save mode. For this, when the WUR mode is activated, the wireless communication terminal and the base wireless communication terminal may be defined as indicating that the WURx is in an operational state. In addition, WURx may be defined to be on/off according to power save mode conversion. Specifically, even if the WUR mode is activated, when the wireless communication terminal is in the active mode, the wireless communication terminal cannot use WURx. In addition, when the wireless communication terminal is in the PS mode and the wireless communication terminal enters the PCR doze state, the wireless communication terminal may use WURx.

The wireless communication terminal in the power save mode may receive a wake-up frame through WUR even when entering the PCR doze state. Therefore, the base wireless communication terminal can induce data reception of the wireless communication terminal using a wake-up frame. Therefore, the wireless communication terminal operating in the power save mode and the WUR mode activated may not maintain the awake state in the beacon frame reception period. Specifically, the wireless communication terminal operating in the normal PS mode and the U-APSD may not enter the awake state periodically to receive the beacon frame. This is because the base wireless communication terminal configures the service period when protocols such as WNM Sleep mode and Target Wake Time (TWT) are used. In addition, a DMG wireless communication terminal operating in the 60 GHz band or a wireless communication terminal of the 802.11ay standard may also use a beacon frame of a different form from the existing beacon frame. Accordingly, the wireless communication terminal may enter the awake state periodically to receive the beacon frame.

In the embodiment of FIG. 18, the station operates in a power save mode. As shown in FIG. 18(*a*), the station configures AP and WUR operation-related parameters. Then, the station turns off the PCR transceiver and turns on the WURx. In the embodiment of FIG. 18(*b*), since the WURx is turned on, the station does not enter the awake state periodically in order to receive the beacon frame.

Figure 19:
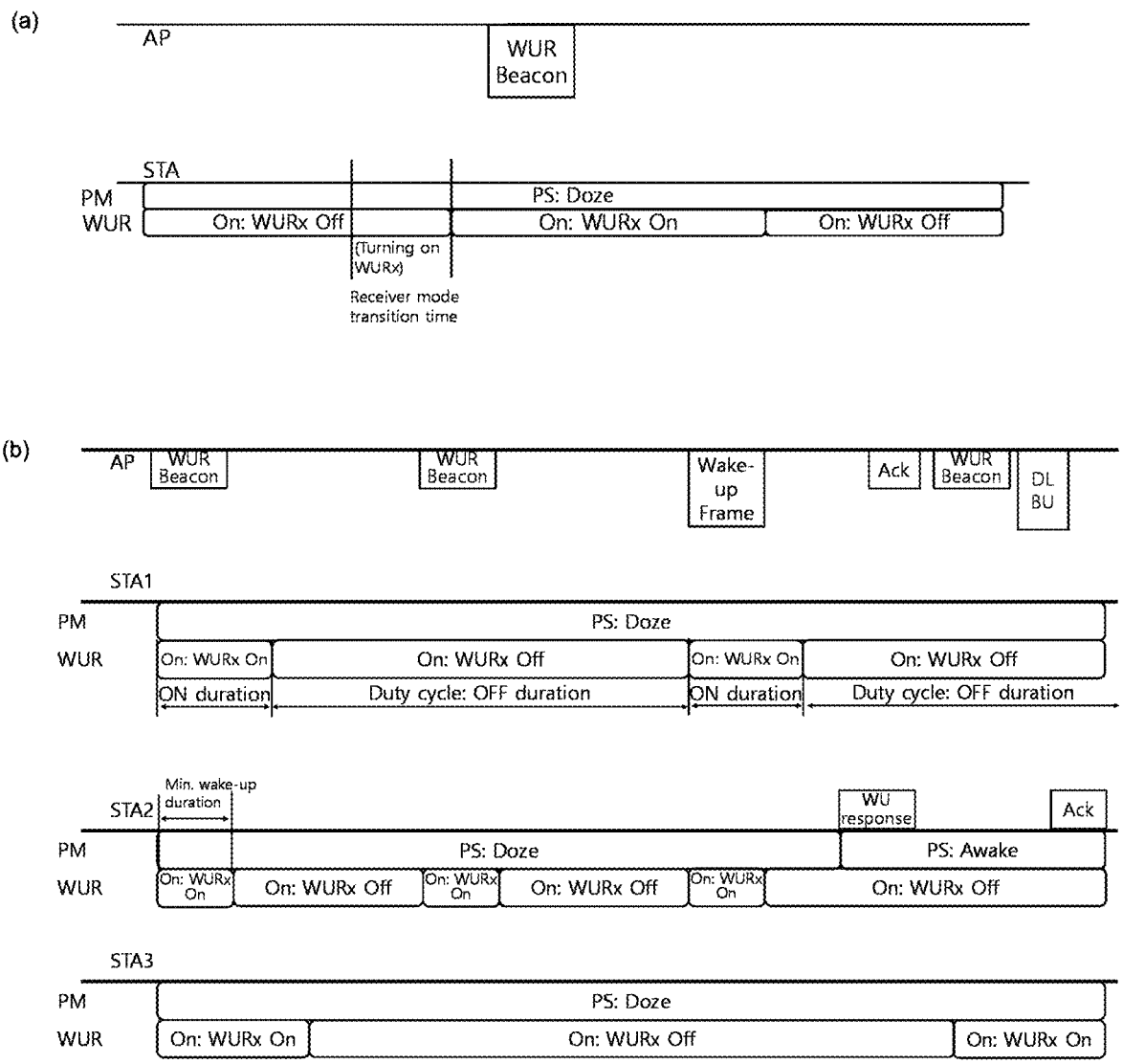
FIG. 19 is a diagram illustrating WUR duty-cycle operation of a wireless communication terminal according to an embodiment of the present invention.

Hereinafter, a WUR duty-cycle operation of the wireless communication terminal will be described in detail with reference to FIG. 19. FIG. 19 is a diagram illustrating WUR duty-cycle operation of a wireless communication terminal according to an embodiment of the present invention.

As described above, the wireless communication terminal may designate the duty-cycle of the WURx, thereby maintaining the WURx in the turned on state in negotiation with the base wireless communication terminal. In addition, in the off-duration, the wireless communication terminal can maintain both the PCR transceiver and the WURx in a turn-off state. The wireless communication terminal may maintain the duty-cycle in the WUR-based power save mode. In the embodiment of FIG. 19(*a*), the station performs a WUR duty-cycle operation. When the AP transmits the WUR beacon-frame, the station maintains on duration to receive the WUR beacon frame. Since it takes some time for the station to turn on WURx, the station may transmit a turn-on command to the WURx before starting the on duration in consideration of the time when the WURx is turned on.

In addition, the base wireless communication terminal and the wireless communication terminal may exchange information on duty-cycle parameters. This is because the base wireless communication terminal can transmit the WUR frame to the wireless communication terminal in the on duration. Specifically, the wireless communication terminal and the base wireless communication terminal may exchange information on duty-cycle parameters using the WUR mode element. Information on duty-cycle parameters may include at least one of the above-described duty-cycle basic unit information, minimum wake time information, duty-cycle on duration information, duty-cycle interval information, and duty-cycle start time information. The duty-cycle on duration may be greater than or equal to the minimum wake time.

The period of the duty-cycle may be different for each wireless communication terminal. The duty-cycle period can be configured in multiples of the basic unit. In this case, the basic unit may be determined by the base wireless communication terminal. In another specific embodiment, the basic unit may be a predetermined value. In addition, the basic unit may be configured based on the transmission period of the WUR beacon frame. Since the wireless communication terminal receives the WUR beacon frame according to the duty-cycle period, it may not receive all the WUR beacon frames transmitted by the base wireless communication terminal. In addition, since the period of the duty-cycle may be different for each wireless communication terminal, in order to receive the corresponding WUR beacon frame each time a WUR beacon frame is transmitted, the set of wireless communication terminals maintaining on duration may vary.

In the on duration that the wireless communication terminal is expected to receive the WUR beacon frame, when a WUR frame transmitted to another wireless communication terminal or a corresponding wireless communication terminal is received, the wireless communication terminal may regard the reception of the corresponding WUR frame as the reception of the WUR beacon frame.

In the embodiment of FIG. 19(b), the first station STA1, the second station STA2, and the third station STA3 operate in the WUR duty-cycle mode. The duty-cycle periods of the first station STA1, the second station STA2, and the third station STA3 are all different. When the AP transmits the first WUR beacon frame, the first station STA1, the second station STA2, and the third station STA3 receive the WUR beacon frame. When transmitting the second WUR beacon frame, the second station STA2 receives the WUR beacon frame. When transmitting the third WUR beacon frame, the third station STA3 receives the WUR beacon frame. Further, when the AP transmits a wake-up frame to the second station STA2, the first station STA1 maintains on duration. The first station STA2 regards the wake-up frame transmitted to the second station STA2 as a WUR beacon frame.

Figure 20:
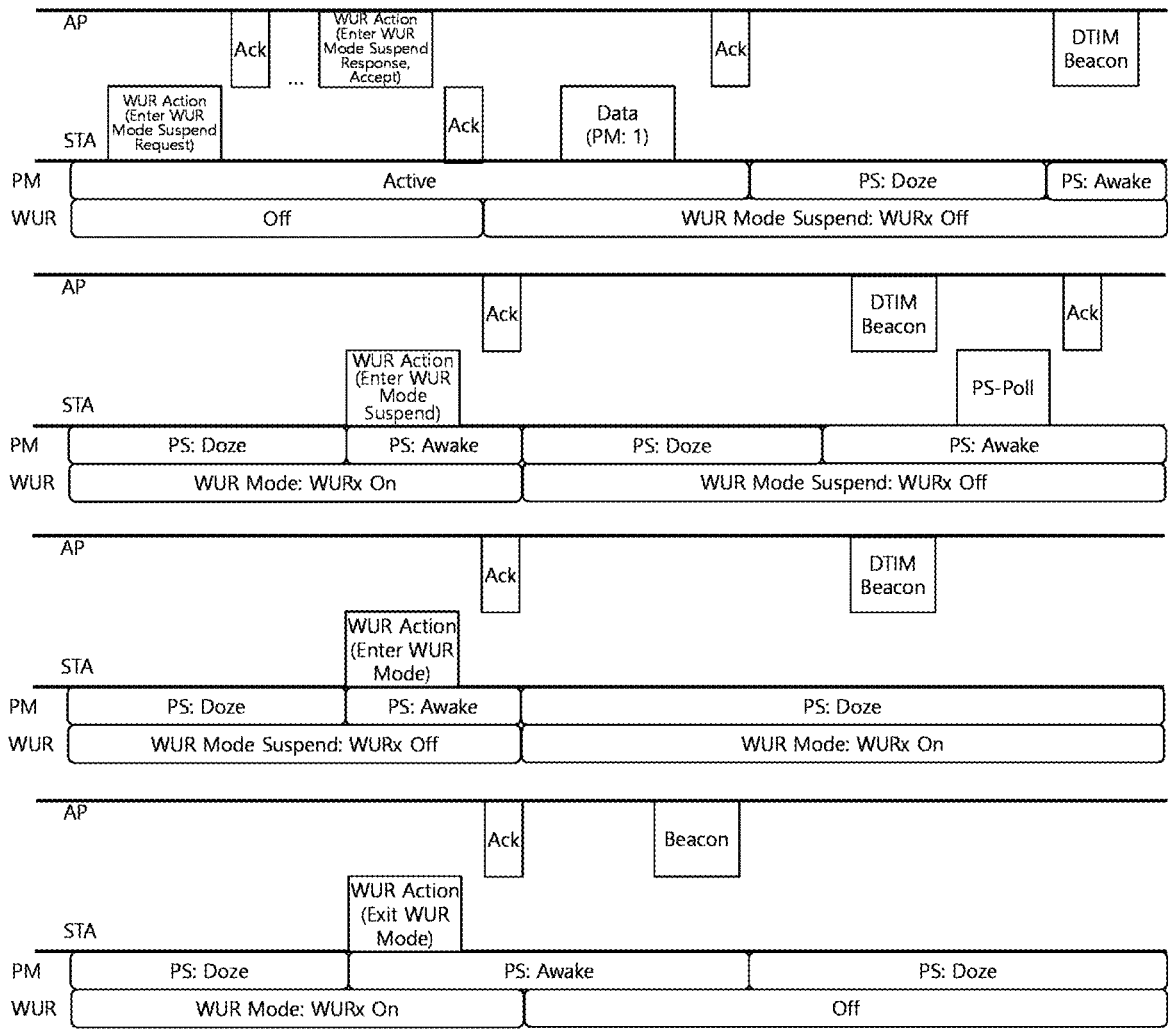
FIG. 20 is a diagram illustrating an operation in which a wireless communication terminal interworking a WUR-based power save mode and a general power save mode according to an embodiment of the present invention.

FIG. 20 is a diagram illustrating an operation in which a wireless communication terminal interworking a WUR-based power save mode and a general power save mode according to an embodiment of the present invention.

According to an embodiment, the wireless communication terminal operating in the WUR mode may transmit a first action frame requesting a WUR mode suspend to the base wireless communication terminal. The base wireless communication terminal receiving the first action frame may transmit a second action frame that accepts the WUR mode suspend of the wireless communication terminal to the wireless communication terminal. In this case, the wireless communication terminal may perform a WUR mode suspend operation. For example, the wireless communication terminal may not follow the WUR duty-cycle schedule. However, the wireless communication terminal may maintain WUR mode related parameters.

Meanwhile, the base wireless communication terminal may be difficult to determine whether the wireless communication terminal entering the WUR mode suspension is in the WURx awake state. Accordingly, even when downlink data to be transmitted to the wireless communication terminal is buffered in the base wireless communication terminal, the base wireless communication terminal may wait for an awake frame of the wireless communication terminal. In addition, the base wireless communication terminal may not be able to transmit a wake-up frame to the wireless communication terminal. When the base wireless communication terminal receives the awake frame from the wireless communication terminal, the buffered downlink data may be transmitted to the wireless communication terminal. In this case, the awake frame may be a frame that induces downlink data transmission, such as a PS-poll frame.

The wireless communication terminal, which enters the WUR mode suspension, may maintain the PCR-related schedule until the wireless communication terminal transmits an action frame requesting entry from the WUR mode suspend to the WUR mode. In addition, the wireless communication terminal may receive a beacon frame transmitted through PCR before entering the WUR mode. In this case, the beacon frame may include a DTIM beacon frame. The wireless communication terminal may maintain the PCR awake state at least at a target beacon transmission time (TBTT) time point of the DTIM beacon. In this case, the beacon frame may include information indicating whether there is buffered downlink data to be transmitted to the wireless communication terminal that receives the beacon frame. Specifically, information indicating that downlink data exists may be expressed in the form of a bitmap. The bitmap information may include an identification bit indicating whether there is downlink data to be transmitted to a group to which the wireless communication terminal belongs. In addition, the bitmap information may include an identification bit indicating whether there is downlink data to be transmitted to each station. The bitmap information may be TIM bitmap information.

In addition, when the wireless communication terminal enters the WUR mode suspend in the WUR mode, the wireless communication terminal may immediately resume the PCR-related schedule suspended due to the entry into the WUR mode. Conversely, when the wireless communication terminal enters the WUR mode from the WUR mode suspend, the wireless communication terminal may delay the PCR-related schedule and operate the WURx according to the duty-cycle schedule.

In the WUR mode, the wireless communication terminal may maintain time synchronization through a WUR beacon frame. The WUR beacon frame may use a TSF value having a relatively small amount of information compared to a PCR beacon. In addition, the period in which the WUR beacon frame is transmitted may be longer than the period in which the PCR beacon frame is transmitted. Accordingly, the accuracy of time synchronization can be reduced. Therefore, when the wireless communication terminal operating for a preconfigured time or more in the WUR mode stops the WUR mode, an error may occur in time synchronization of the wireless communication terminal. For example, it may be difficult for the wireless communication terminal to normally utilize the resumed PCR-related schedule as the WUR mode is stopped. According to an embodiment of the present invention, when the wireless communication terminal stops the WUR mode in the WUR mode, the wireless communication terminal may maintain the PCR awake state until a time point at which at least one PCR beacon frame is received. When the wireless communication terminal receives at least one PCR beacon frame, the wireless communication terminal may receive TSF information having a larger information amount than the WUR beacon frame. Accordingly, the time synchronization accuracy of the wireless communication terminal can be increased.

Meanwhile, according to an embodiment of the present invention, when the wireless communication terminal operates in the WUR mode, a service period for a PCR schedule for the wireless communication terminal may be suspended. In a wireless LAN, a service period may be a time period in which one or more downlink data is transmitted to a wireless communication terminal. Also, the service period may be a time period in which one or more Transmit Opportunities (TXOPs) are assigned to the wireless communication terminal. The service period may be divided into an unscheduled service period and a scheduled service period according to predefined rules.

For example, when the wireless communication terminal operates in the WUR mode, the negotiated service period between the wireless communication terminal and the base wireless communication terminal may be suspended. Here, the negotiated service period may be a periodic or non-periodic time period for the wireless communication terminal operating in the PS mode to perform uplink and/or downlink transmission with the base wireless communication terminal. In the present disclosure, the suspension of the service period is related to the service period, and may be to stop the negotiated operation between the base wireless communication terminal and the wireless communication terminal. The operation related to the service period may be an operation negotiated to be performed by the wireless communication terminal and the base wireless communication terminal during the service period. For example, in the PS mode, the wireless communication terminal may negotiate with the base wireless communication terminal by maintaining the PCR awake state during the service period.

According to an embodiment, the negotiated service period may be a target wake time (TWT) service period configured based on a TWT negotiation procedure. Here, the TWT service period may be a time period during which the base wireless communication terminal manages the operation of the wireless communication terminal operating in the PS mode. The TWT service period may be a time period for performing uplink and/or downlink configured through TWT negotiation between the wireless communication terminal and the base wireless communication terminal. For example, in the TWT service period negotiated between the base wireless communication terminal and the wireless communication terminal, the wireless communication terminal may maintain a state in which transmission and reception are possible through the base wireless communication terminal and the PCR transceiver. Specifically, the wireless communication terminal may perform uplink data transmission or downlink data reception with the base wireless communication terminal using a TWT service period configured based on the TWT negotiation procedure. Meanwhile, when the wireless communication terminal operates in the WUR mode, the wireless communication terminal may not perform the negotiated operation during the negotiated TWT service period.

The TWT negotiation procedure may be performed through PCR frame exchange between wireless communication terminals. Among the wireless communication terminals operating in the unlicensed band of the Sub 1 GHz or 2.4 GHz and 5 GHz bands, the wireless communication terminal following 802.11ax and its subsequent standard may perform a TWT negotiation procedure with the base wireless communication terminal. The TWT service period of the wireless communication terminal may be scheduled through the TWT negotiation procedure. The operation according to the TWT service period may be one of the power save operations defined in the wireless LAN. Hereinafter, the TWT operation of the wireless communication terminal will be described in detail with reference to FIG. 21.

Figure 21:
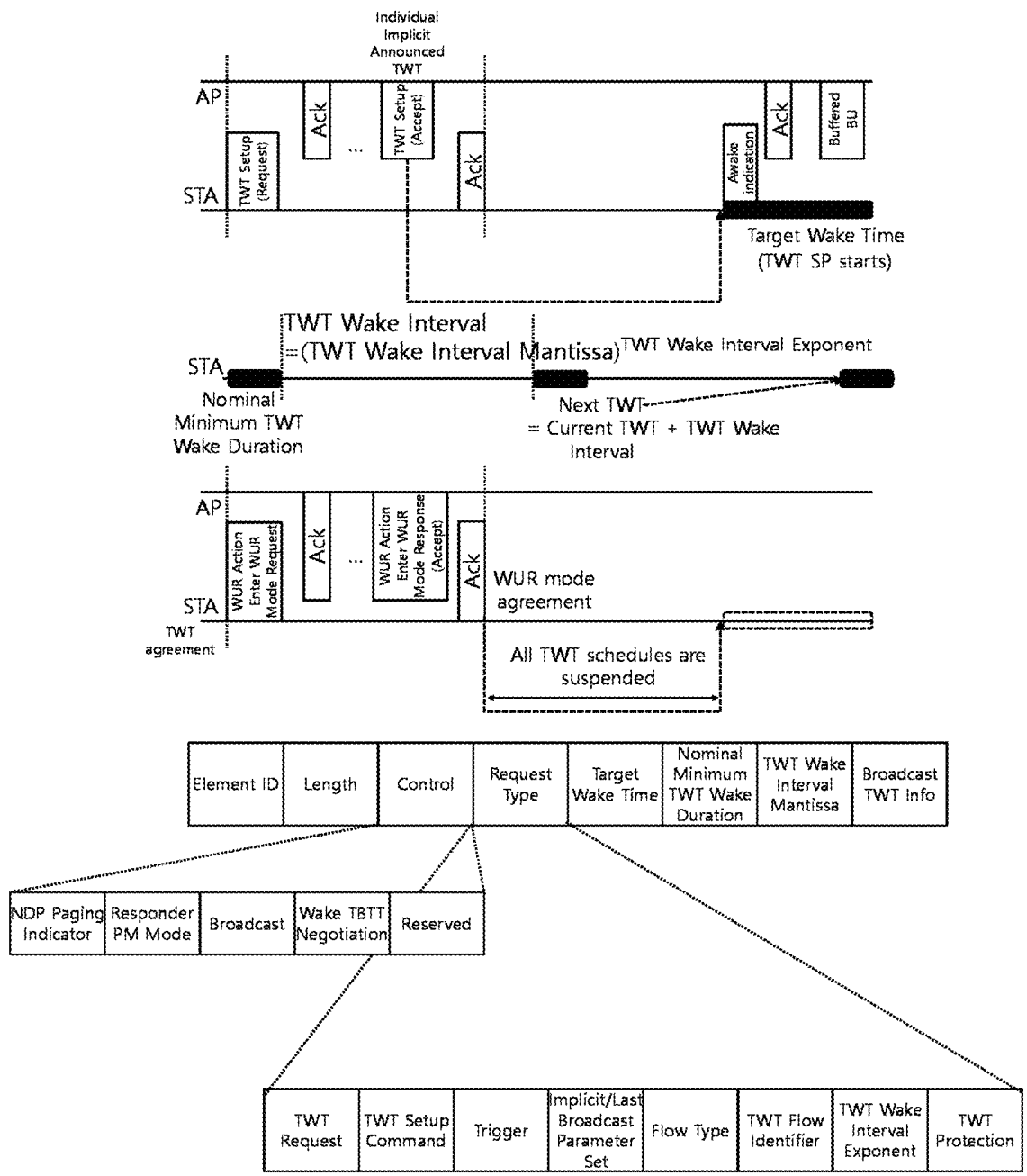
FIG. 21 illustrates an embodiment of a method of operating a target wake time (TWT) of a wireless communication terminal.

FIG. 21 illustrates an embodiment of a method of operating a target wake time (TWT) of a wireless communication terminal. According to an embodiment of the present invention, a wireless communication terminal may transmit and receive a TWT configuration frame including a TWT element. The TWT element may include TWT parameter information to be used by the wireless communication terminal. The base wireless communication terminal may receive a TWT configuration frame including a TWT element from the wireless communication terminal. In addition, the base wireless communication terminal may transmit the TWT configuration frame to the wireless communication terminal in response to the TWT configuration frame. In this case, the TWT configuration frame transmitted by the base wireless communication terminal may include TWT parameter information to be used by the base wireless communication terminal. The TWT configuration frame may be repeatedly exchanged between the wireless communication terminal and the base wireless communication terminal. Finally, the base wireless communication terminal may transmit a TWT configuration frame configured with Accept TWT in the TWT Setup command field to the wireless communication terminal. In addition, the wireless communication terminal may receive a TWT configuration frame configured with Accept TWT in the TWT Setup command field, and transmit a response frame in response thereto. The TWT Setup command field may be a field indicating the type of command related to TWT. When the response frame of the wireless communication terminal is successfully transmitted to the base wireless communication terminal, the TWT negotiation procedure may be completed.

The wireless communication terminal can reduce unnecessary power consumption by using the TWT operation. For example, when the wireless communication terminal configured with at least one TWT service period operates in the PS mode, the wireless communication terminal may be in a PCR doze state in a period other than the TWT service period. In addition, the wireless communication terminal may operate in the PCR awake state in the TWT service period to transmit and receive data with the base wireless communication terminal. In this case, the base wireless communication terminal may store traffic generated during a period other than the TWT service period in a buffer. In addition, when the base cousin communication terminal is in a TWT service period and the wireless communication terminal is in the PCR awake state, buffered traffic may be transmitted. Hereinafter, the TWT element will be described.

According to an embodiment, the TWT element may include a TWT flow identification field corresponding to the TWT negotiated between the base wireless communication terminal and the wireless communication terminal. The base wireless communication terminal may configure an individual TWT through a separate negotiation procedure with the wireless communication terminal. The wireless communication terminal may configure a base wireless communication terminal and up to 8 independent individual TWTs. In this case, independent individual TWTs may be identified using different TWT flow identifications. In addition, the base wireless communication terminal may configure a broadcast TWT shared by a plurality of wireless communication terminals. In this case, the TWT element may include a Broadcast TWT Info field. The Broadcast TWT Info field may include identification information on the broadcast TWT.

According to an embodiment, the TWT element may include a Target Wake Time field. The TWT service period may be determined based on the TSF time point indicated by the Target Wake Time field. For example, when the wireless communication terminal that completes the TWT negotiation procedure is operating in the PS mode, the wireless communication terminal may operate in the PCR doze state until the TSF time point indicated by the Target Wake Time field value. In addition, the wireless communication terminal may maintain the PCR awake state for a preconfigured period from at least the TSF time point indicated by the Target Wake Time field value. In this case, a period preconfigured from the TSF time point indicated by the Target Wake Time field value may be referred to as a TWT service period. Also, the preconfigured period may be a period indicated by the Nominal TWT Wake duration field included in the TWT element. The wireless communication terminal and the base wireless communication terminal may exchange data with each other during the TWT service period.

According to an embodiment of the present invention, the TWT element may include a Flow Type field. In the TWT service period, operations of the wireless communication terminal and the base wireless communication terminal may vary according to the flow type of the TWT indicated by the Flow Type field. According to an embodiment, when the flow type of the TWT element indicates Announced, the TWT service period may or may not be used depending on whether the PCR awake indication is performed by the wireless communication terminal. The TWT service period corresponding to this flow type may be referred to as an announce TWT service period. Specifically, when the negotiated TWT is an Announced TWT, the TWT service period may be used only when the wireless communication terminal transmits an announce frame to the base wireless communication terminal within a preconfigured time. Here, the announce frame may be a frame indicating that the wireless communication terminal is in the PCR awake state. Also, the preconfigured time may be from a time point at which the immediately preceding service period ends until the TWT service period ends. In the present disclosure, the format of the announce frame may not be limited. For example, the announce frame may include a PS-poll frame and a U-APSD trigger frame.

For example, the wireless communication terminal may transmit an announce frame to the base wireless communication terminal. In this case, frame exchange may be performed in the TWT service period corresponding to the negotiated TWT. Further, the wireless communication terminal may receive a response frame for an announce frame from the base wireless communication terminal. The wireless communication terminal may maintain the PCR awake state from at least the time when the announce frame is transmitted until the time point at which the corresponding TWT service period ends. In this case, the time point at which the TWT service period ends may be determined based on either the end time preconfigured from the time point at which the service period starts or a signal indicating that the corresponding service period ends early. On the other hand, if the wireless communication terminal does not transmit the announce frame within the preconfigured time, the wireless communication terminal and the base wireless communication terminal may not perform data exchange in a corresponding TWT service period. In addition, the wireless communication terminal may not maintain the PCR awake state during the corresponding TWT service period.

According to another embodiment, when the flow type field of the TWT element indicates Unannounced, the base wireless communication terminal may exchange data with the wireless communication terminal during the TWT service period regardless of the awake indication of the wireless communication terminal. In this case, the base wireless communication terminal may not wait for an awake indication. In addition, the base wireless communication terminal may transmit downlink data to the wireless communication terminal during the TWT service period regardless of receiving an announce frame from the wireless communication terminal. The wireless communication terminal may receive downlink data from the base wireless communication terminal regardless of whether an announce frame is transmitted.

According to an embodiment of the present invention, the TWT element may include a Trigger field. In the TWT service period, operations of the wireless communication terminal and the base wireless communication terminal may vary depending on whether a trigger field is activated. According to an embodiment, when the Trigger field of the TWT element is activated, the TWT service period may be referred to as a trigger-enabled TWT service period. When the negotiated TWT is a trigger-enabled TWT, the wireless communication terminal may receive at least one trigger frame from the base wireless communication terminal during the trigger-enabled TWT service period. Also, the wireless communication terminal may perform uplink transmission in the form of a response to the received trigger frame. For example, if the wireless communication terminal does not receive the trigger frame during the triggered TWT service period from the base wireless communication terminal, the wireless communication terminal may not perform uplink transmission to the base wireless communication terminal. Conversely, when the wireless communication terminal receives the trigger frame during the triggered TWT service period from the base wireless communication terminal, the wireless communication terminal may transmit awake indication and/or uplink data in response to the received trigger frame. In this case, the response to the trigger frame may be in the form of a HE TB high efficiency trigger based (HE TB) PPDU. According to another embodiment, when the Trigger field of the TWT element is not activated, the wireless communication terminal may perform uplink transmission during a corresponding TWT service period based on other conditions described above, regardless of the trigger frame of the base wireless communication terminal.

On the other hand, the wireless communication terminal and the base wireless communication terminal may configure a Next TWT value indicating a time point at which the next TWT service period that arrives fastest after the current TWT service period ends. According to an embodiment of the present invention, the TWT element may include a TWT Wake Interval Mantissa field and a TWT Wake Interval Exponent field. The TWT Wake Interval Exponent field may be a subfield of the Request type field included in the TWT element. The wireless communication terminal and the base wireless communication terminal may determine the Next TWT value based on the TWT Wake Interval Mantissa field and the TWT Wake Interval Exponent field.

For example, the wireless communication terminal may determine the Next TWT value by combining the TWT Wake Interval Mantissa field value and the TWT Wake Interval Exponent field value of the TWT element finally received from the base wireless communication terminal. The wireless communication terminal may determine the TWT wake Interval that the TWT service period arrives based on the TWT Wake Interval Mantissa field value and the TWT Wake Interval Exponent field value. In FIG. 21, the TWT Wake Interval may be an exponentially calculated value of the TWT Wake Interval Mantissa field as the TWT Wake Interval Exponent field value.

In addition, the wireless communication terminal may determine the Next TWT value based on the period when the TWT service period arrives. The TWT whose Next TWT value is determined in this way may be referred to as an implicit TWT. According to another embodiment, the TWT negotiated between the wireless communication terminal and the base wireless communication terminal may be an explicit TWT. In this case, the wireless communication terminal and the base wireless communication terminal may configure the Next TWT value at least until the current TWT service period ends. For example, the Next TWT value may be configured through a frame including at least some of the TWT elements of the TWT configuration frame. The operations after completion of TWT negotiation of the above-mentioned wireless communication terminal may be referred to as TWT-based operations.

According to an additional embodiment, the wireless communication terminal and the base wireless communication terminal may perform individual TWT negotiations. In this case, the wireless communication terminal may be referred to as a TWT requesting station STA. In addition, the base wireless communication terminal may be referred to as a TWT response station AP.

In addition, the base wireless communication terminal may configure broadcast TWT for a plurality of wireless communication terminals. In this case, the base wireless communication terminal may be referred to as a TWT scheduling AP. In addition, a plurality of wireless communication terminals may be referred to as a TWT scheduled station STA. The wireless communication terminal may receive a frame including a broadcast TWT element from the base wireless communication terminal. Also, the wireless communication terminal may transmit a frame requesting TWT scheduling corresponding to the received broadcast TWT identifier to the base wireless communication terminal. For example, the wireless communication terminal may transmit a TWT element including the identifier of the received broadcast TWT to the base wireless terminal. The wireless communication terminal may receive a response to a frame requesting TWT scheduling from the base wireless communication terminal. The broadcast TWT operation of the wireless communication terminal according to an embodiment of the present invention will be described later with reference to FIGS. 31 and 32.

According to an embodiment of the present invention, a wireless communication terminal configuring at least one TWT service period with a base wireless communication terminal may enter the WUR mode. In the WUR mode, the wireless communication terminal may operate in PCR doze state. In this case, it may be inefficient for the wireless communication terminal to wake-up the PCR of the wireless communication terminal during the preconfigured service period and operate in the PCR awake state. This is because the wireless communication terminal may check whether there is data to be received through the WUR frame. Accordingly, when the wireless communication terminal enters the WUR mode, the wireless communication terminal may postpone or suspend the operation of the wireless communication terminal related to the configured service period before entering the WUR mode.

Figure 22:
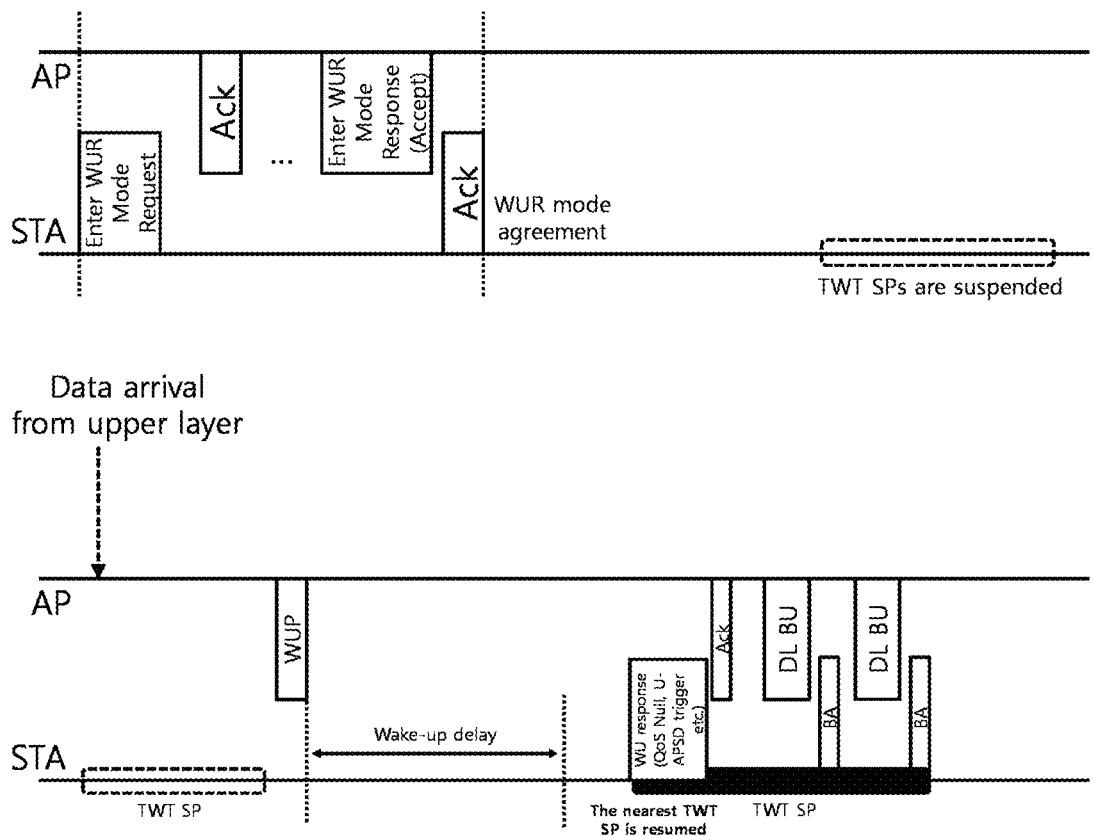
FIG. 22 illustrates an embodiment of a method of operating TWT in WUR mode of a wireless communication terminal.

FIG. 22 illustrates an embodiment of a method of operating TWT in WUR mode of a wireless communication terminal. As described above, scheduling-based power save operations operating in the existing PS mode in the WUR mode may be suspended until a time point at which the wireless communication terminal stops the WUR mode. In the present disclosure, the suspension of the WUR mode may include at least one of suspension of the WUR mode or exit of the WUR mode.

For example, the wireless communication terminal entering the WUR mode may not maintain the PCR awake state during the TWT service period included in the PCR schedule configured before entering the WUR mode. In addition, the base wireless communication terminal may determine that the wireless communication terminal enters the WUR mode based on the exchange of the WUR action frame with the wireless communication terminal. In this case, the base wireless communication terminal may determine that the PCR schedule configured with the wireless communication terminal will be stopped before the wireless communication terminal enters the WUR mode. The base wireless communication terminal may expect that the wireless communication terminal will operate in a PCR doze state during the TWT service period included in the PCR schedule with the corresponding wireless communication terminal.

However, when the wireless communication terminal wakes up the PCR and is in the PCR awake state, the wireless communication terminal may use the suspended service period. For example, when the wireless communication terminal operating in the WUR mode receives a wake-up frame, the wireless communication terminal may transmit and receive data using a suspended service period. In particular, the wireless communication terminal may use a TWT service period that arrives after wake-up in a wake-up state. In this case, the wireless communication terminal may perform uplink transmission or downlink reception in an environment in which competition among a plurality of wireless communication terminals is reduced. This is because when the base wireless communication terminal configures a TWT service period separately from a plurality of wireless communication terminals belonging to the BSS, traffic between the plurality of wireless communication terminals may be distributed. In addition, in a TWT service period allocated to each of a plurality of wireless communication terminals, a collision probability with other wireless communication terminals may be reduced. Therefore, during the time when the wireless communication terminal operating in the WUR mode is expected to operate in the PCR awake state, the TWT service period may be temporarily resumed.

According to an embodiment of the present invention, when the wireless communication terminal wakes up, the suspended TWT service period may be resumed. The wireless communication terminal may perform a TWT-based operation corresponding to a first service period, which is a TWT service period that arrives after wake-up. For example, the wireless communication terminal may operate based on TWT flow identification information of the first service period. In this case, the TWT service period may be a time period scheduled through the TWT negotiation process with the base wireless communication terminal before the wireless communication terminal enters the WUR mode. In addition, the methods described with reference to FIG. 21 may be applied to the TWT negotiation process. For example, the wireless communication terminal may maintain the PCR awake state for at least one TWT service period that arrives after wake-up. The wireless communication terminal may maintain the PCR awake state during the TWT service period, which is the fastest arriving after wake-up.

According to an embodiment, the wireless communication terminal may wake-up based on the wake-up frame. The base wireless communication terminal may transmit a wake-up frame that triggers a wake-up of the PCR transceiver of the wireless communication terminal. In this case, the wake-up frame may include at least one of a wake-up frame that is individually transmitted to the wireless communication terminal, a wake-up frame including the WUR ID of the terminal, a wake-up frame including the group ID to which the terminal belongs, or a broadcast wake-up frame transmitted to all wireless communication terminal(s) belonging to the corresponding BSS.

According to an embodiment, a time point at which the wireless communication terminal wakes-up may be within a TWT service period. For example, the wireless communication terminal may wake-up while a part of the TWT service period already elapses. In this case, the wireless communication terminal may maintain the PCR awake state from a wake-up time to an end time point of a TWT service period in which some already elapses.

According to an embodiment of the present invention, when the wireless communication terminal receives the wake-up frame, the wireless communication terminal may perform a TWT-based operation corresponding to the TWT service period that arrives after the PCR transition delay elapses from the time point at which the wake-up frame is received. Here, the PCR transition delay may indicate a time required from the PCR doze state to the PCR awake state. The PCR transition delay of the wireless communication terminal may be a parameter specified by the wireless communication terminal. The PCR transition delay may be specified between the base wireless communication terminal and the wireless communication terminal through the WUR capability element of the wireless communication terminal.

Specifically, the wireless communication terminal may perform uplink transmission or downlink reception by using the TWT service period (hereinafter referred to as the 'first service period') that arrives fastest after the PCR transition delay elapses from the time point at which the wake-up frame is received. The wireless communication terminal may maintain the PCR awake state for at least the first service period.

According to a specific embodiment, the time point at which the PCR transition delay elapses from the time point at which the wireless communication terminal receives the wake-up frame from the base wireless communication terminal may be within the TWT service period. For example, a time point at which a PCR transition delay elapses from a time point of receiving a wake-up frame may be a Wake time point at which a part of the TWT service period already elapses. In this case, the wireless communication terminal may perform a TWT-based operation corresponding to the corresponding TWT service period during the remaining TWT service period. The remaining TWT service period may be a time period from a time point at which the PCR transition delay elapses to a time point at which the TWT service period ends, among the entire TWT service period. The wireless communication terminal may maintain the PCR awake state from a time point of waking-up the wireless communication terminal to a time point at which the remaining TWT service period ends.

According to a further embodiment, the base wireless communication terminal may transmit downlink data during the TWT service period of the wireless communication terminal. In this case, when the base wireless communication terminal does not receive a response frame for downlink data from the wireless communication terminal, the next TWT service period of the corresponding TWT service period may be additionally resumed. For example, the base wireless communication terminal may transmit downlink data to the wireless communication terminal using the next TWT service period of the wireless communication terminal. On the other hand, if the timer configured based on the PCR transition delay of the wireless communication terminal from the time point of transmitting the wake-up frame expires, the base wireless communication terminal may determine that the wireless communication terminal fails to receive the wake-up frame. In this case, the base wireless communication terminal may transmit a new wake-up frame to the wireless communication terminal.

According to an embodiment, the first service period may be the above-described announce TWT service period through FIG. 21. Referring to FIG. 22, the station STA may transmit an awake frame to the AP before the first service period ends, which arrives fastest after the PCR transition delay elapses from the time point of receiving the wake-up frame. Here, the awake frame may represent a frame that is first transmitted through the PCR transceiver after the wireless communication terminal (or station) wakes up the PCR transceiver in WUR mode. In this case, the AP may recognize the awake frame transmitted from the STA as an awake indication transmitted by the STA in an announce TWT-based operation.

In FIG. 22, it is shown that the STA transmits the awake frame within the first service period, but the present disclosure is not limited thereto. For example, if the STA wakes up before the first service period starts, the STA may transmit an awake frame before the first service period starts. The STA may receive a response frame for the awake frame from the AP. In this case, the STA may perform uplink transmission during the first service period or receive downlink data from the AP. Meanwhile, the AP may not receive an awake frame from the STA before the first service period ends. In this case, after the first service period ends, the second service period that arrives fastest may be additionally resumed. For example, the AP may transmit downlink data to the wireless communication terminal using the second service period. In addition, as described above, when the timer configured by the AP to determine whether the wake-up frame transmission is successful expires, the AP may transmit a new wake-up frame to the STA.

According to an embodiment, the wireless communication terminal may maintain a PCR awake state from a time point at which the TWT service period is resumed to a time point at which at least one TWT service period ends. In addition, the TWT service period may be terminated early. For example, the wireless communication terminal may maintain the PCR awake state until a time point at which the first service period expires or the base wireless communication terminal signals an early termination of the first service period.

According to an embodiment, there may be another third service period overlapping with the first service period. This is because the base wireless communication terminal and the wireless communication terminal may configure a plurality of TWT flows having different TWT flow identification information. Here, the TWT flow may be composed of a plurality of service periods corresponding to a single flow identification information. Also, a period in which a service period arrives may vary according to flow identification information. For example, the second period that the third service period arrives may be different from the first period that the first service period arrives. In the third service period, a start time point of the service period may be later than that of the first service period. In this case, the wireless communication terminal may maintain the PCR awake state from a time point at which the first service period starts to a later time of a time point at which the first service period ends and a time point at which the third service period ends. In FIG. 22, the first service period, not the trigger-enabled TWT service period, is described as an example. Hereinafter, the operation of the wireless communication terminal when the first service period is the TWT service period will be described with reference to FIG. 23.

Figure 23:
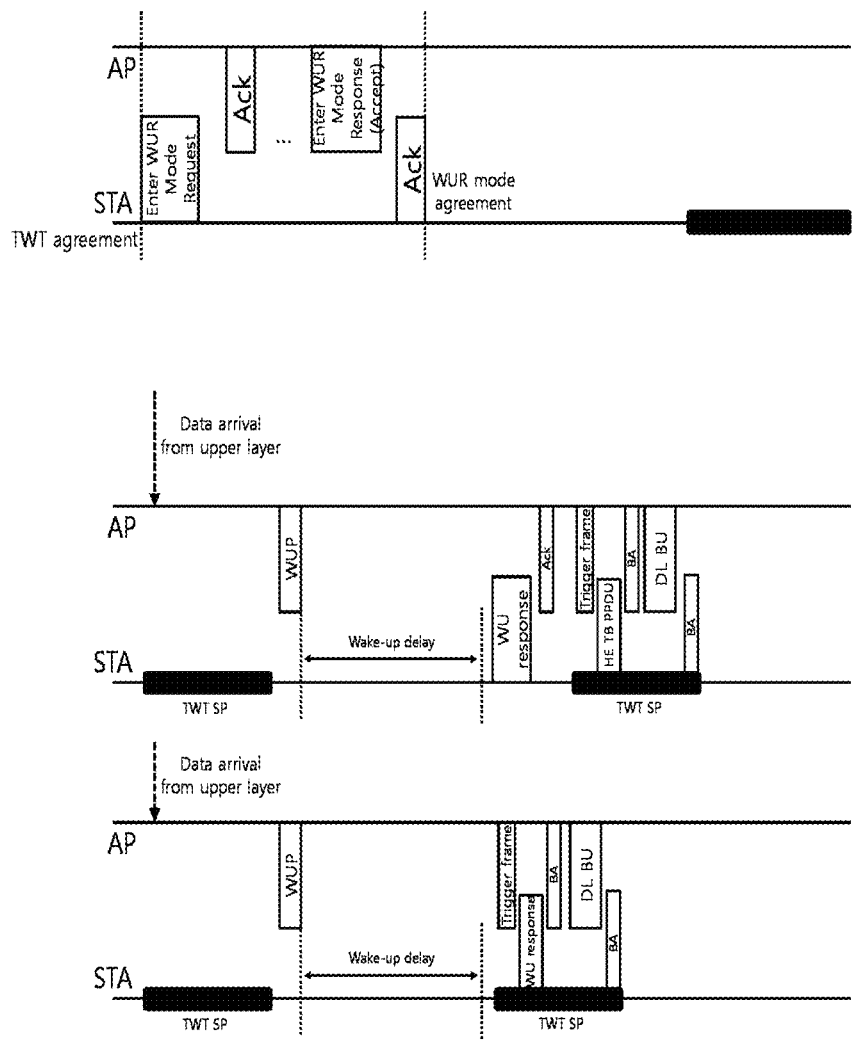
FIG. 23 illustrates an embodiment of a method of operating a wireless communication terminal when TWT-based operation is resumed in WUR mode.

FIG. 23 illustrates an embodiment of a method of operating a wireless communication terminal when TWT-based operation is resumed in WUR mode. As described above, when the TWT negotiated between the wireless communication terminal and the base wireless communication terminal is a trigger-enabled TWT, the wireless communication terminal may perform uplink transmission or downlink reception based on the trigger frame reception. When the wireless communication terminal uses a trigger-enabled TWT, the wireless communication terminal may benefit from channel management and power consumption. This is because the wireless communication terminal may not perform a channel contention procedure for data transmission during the service period.

According to an embodiment of the present invention, the first service period that arrives fastest after the PCR transition delay elapses from the time point at which the wireless communication terminal receives the wake-up frame may be a trigger-enabled TWT service period. In this case, the wireless communication terminal may receive at least one trigger frame within the first service period from the base wireless communication terminal. In this case, the trigger frame may be a frame that induces uplink transmission of the wireless communication terminal. The wireless communication terminal may perform uplink transmission based on the trigger frame. For example, the wireless communication terminal may transmit uplink data to the base wireless communication terminal through a trigger-based PPDU (HE TB PPDU). Also, the wireless communication terminal may receive downlink data from the base wireless communication terminal during the first service period based on the trigger frame. The wireless communication terminal may maintain the PCR awake state for at least the first service period.

Referring to FIG. 23, when downlink data to be transmitted to the AP is buffered, the AP may transmit a trigger frame within a TWT service period TWT SP regardless of whether an awake frame is received. For example, the AP may transmit a wake-up frame to an STA operating in WUR mode. The STA may wake-up based on the wake-up frame to transmit an awake frame (WU response) to the AP. The AP may transmit a response frame Ack for the awake frame. In this case, the awake frame and the response frame therefor may be exchanged before the time point at which the TWT SP starts. However, the present disclosure is not limited thereto. Also, the STA and the AP may not exchange the awake frame and the response frame. When the downlink data to be transmitted to the AP is buffered, the AP may transmit at least one trigger frame in the TWT SP to the STA. Also, the STA may receive downlink data from the AP during the TWT SP.

According to a further embodiment, the base wireless communication terminal may extend the timer expiration time point for determining that the wireless communication terminal fails to receive the wake-up frame to a time point at which at least one TWT service period ends. Here, the at least one TWT service period may include the first service period described above. For example, the base wireless communication terminal may wait for the response of the wireless communication terminal to the wake-up frame from the time point when the wake-up frame is transmitted to the time point when the first service period ends. If the base wireless communication terminal does not receive an awake frame from the wireless communication terminal until the end time point of the first service period, it may be determined that the wireless communication terminal fails to receive the wake-up frame. In addition, if the base wireless communication terminal does not receive an awake frame from the wireless communication terminal until the end time point of the first service period, a new wake-up frame can be transmitted to the wireless communication terminal.

According to another embodiment of the present invention, in the WUR mode, when the wireless communication terminal is to perform uplink transmission to the base wireless communication terminal, the wireless communication terminal may wake-up the PCR transceiver of the wireless communication terminal. In this case, the wireless communication terminal may wake-up the PCR transceiver regardless of whether the wake-up frame is received from the base wireless communication terminal. As described above, when the wireless communication terminal wakes up, the wireless communication terminal may resume the negotiated TWT-based operation before entering the WUR mode during the first service period described above. The wireless communication terminal may perform uplink transmission using the first service period. This is because channel access contention may be low in the TWT service period.

For example, the wireless communication terminal may maintain the PCR awake state for at least a first service period that arrives after the wireless communication terminal transmits the awake frame. Specifically, the TWT individually negotiated between the wireless communication terminal and the base wireless communication terminal may be an unannounced TWT. In this case, the base wireless communication terminal may determine that the wireless communication terminal will maintain the PCR awake state for at least a first service period.

In addition, the wireless communication terminal may transmit the awake frame to the base wireless communication terminal. The wireless communication terminal may transmit an awake frame from a time point at which the wireless communication terminal wakes-up until the first service period ends. The TWT individually negotiated between the wireless communication terminal and the base wireless communication terminal may be an announced TWT. In this case, the TWT-based operation of the wireless communication terminal may be resumed during the first service period that arrives after the wireless communication terminal transmits the awake frame.

Meanwhile, when operating in the WUR mode, the wireless communication terminal may operate differently from the TWT-based operation corresponding to the TWT flow identification information. For example, if the negotiated TWT is an Unannounced TWT, and the wireless communication terminal does not enter the WUR mode, the wireless communication terminal may maintain the PCR awake state during the TWT service period regardless of the announce frame transmission. On the other hand, in the WUR mode, the wireless communication terminal may maintain the PCR awake state only when the wireless communication terminal transmits an announce frame to the base wireless communication terminal.

Similarly, the base wireless communication terminal may operate differently from the TWT-based operation corresponding to the TWT flow identification information. For example, if the negotiated TWT is a trigger-enabled TWT, and the wireless communication terminal does not operate in the WUR mode, the base wireless communication terminal may transmit a trigger frame to the wireless communication terminal within the TWT service period. On the other hand, when the wireless communication terminal operates in the WUR mode, the base wireless communication terminal may not transmit a trigger frame within the TWT service period.

For example, even when the negotiated TWT is an unannounced TWT, a wireless communication terminal operating in WUR mode may recognize that the negotiated TWT is an Announced TWT. In this case, the wireless communication terminal may transmit an awake frame from a time point at which the wireless communication terminal wakes-up until the first service period ends. In addition, if the base wireless communication terminal does not receive the awake frame during the above-described period, the base wireless communication terminal may not use the first service period.

Meanwhile, according to an embodiment of the present invention, in the WUR mode, the wireless communication terminal and the base wireless communication terminal may use only a specific TWT service period. This is because the use of some TWT service periods may be inefficient in the WUR mode depending on the characteristics of the TWT service period. In addition, when the wireless communication terminal and the base wireless communication terminal configure a plurality of TWT flows having different TWT flow identification information, resuming operation based on all TWTs may increase implementation complexity and reduce the interworking efficiency between the PCR transceiver and WURx. Also, it may be advantageous in terms of memory and processing in which the wireless communication terminal manages the TWT schedule. Therefore, the TWT service period that is resumed when the wireless communication terminal enters the WUR mode may be limited to a part. The wireless communication terminal and the base wireless communication terminal may determine some TWT service periods that resume when the wireless communication terminal enters WUR mode.

FIGS. 24, 25, 26, and 27 are diagrams illustrating an embodiment in which a specific TWT service period is resumed in the WUR mode according to an embodiment of the present invention. According to an embodiment of the present invention, the TWT service period that is resumed when the wireless communication terminal wakes up in the WUR mode may be determined according to TWT flow identification information of the TWT service period. As described above, TWT-based operations of the wireless communication terminal and the base wireless communication terminal may be changed according to the TWT flow identification information. According to an embodiment, the wireless communication terminal and the base wireless communication terminal may configure a plurality of TWT flows identified by different TWT flow identification information. In this case, the wireless communication terminal and the base wireless communication terminal may determine an available TWT flow when the wireless communication terminal wakes up in WUR mode among a plurality of TWT flows. Hereinafter, the TWT flow identification information of the TWT service period usable when the wireless communication terminal wakes up in the WUR mode may be referred to as resumable TWT flow identification information.

According to one embodiment, resumable TWT flow identification information may be determined based on TWT related parameters. For example, the wireless communication terminal may determine a TWT in which a Flow type field value of a TWT element described through FIG. 21 is Announced as the resumable TWT. Further, the wireless communication terminal may determine the TWT in which a trigger field value of the TWT element is not trigger-enabled as a resumable TWT. The wireless communication terminal may determine a TWT satisfying a combination of the above-described conditions as a resumable TWT. The wireless communication terminal and the base wireless communication terminal may determine a resumable TWT based on the above-described conditions. Alternatively, the wireless communication terminal and the base wireless communication terminal may exchange the determined resumable TWT flow identification information.

Figure 24:
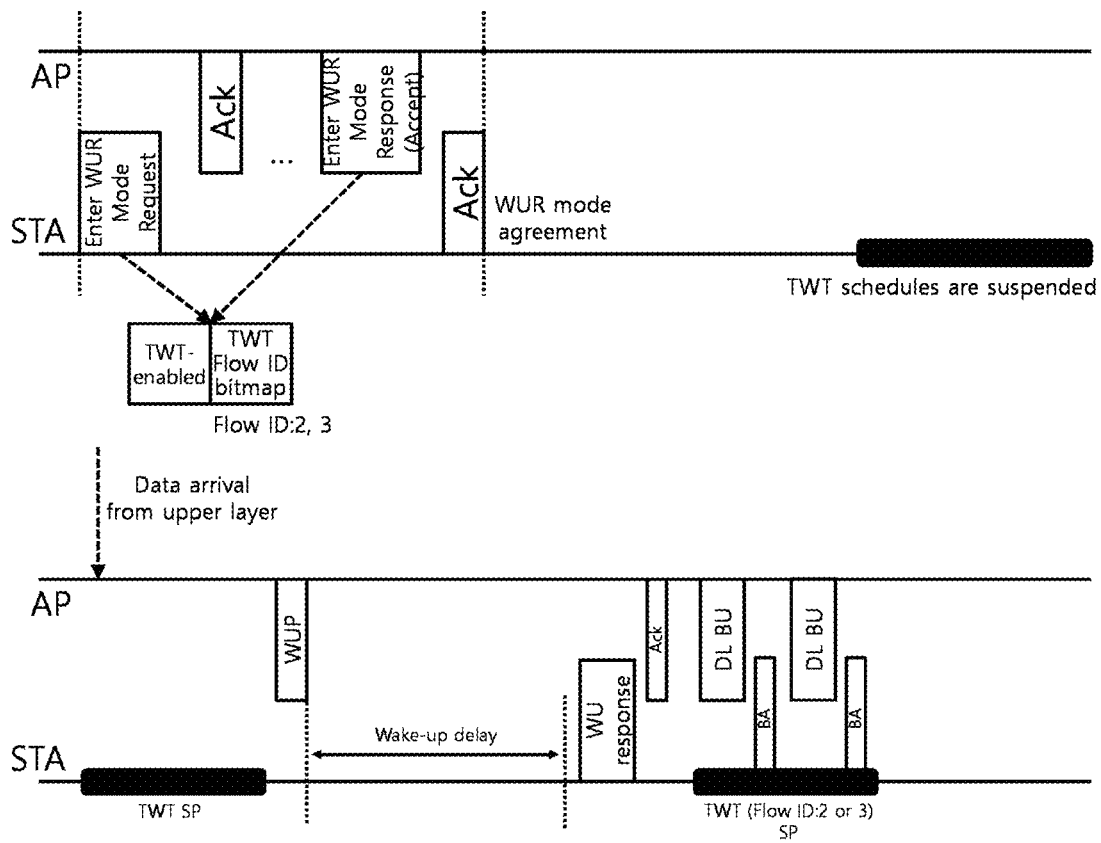
FIGS. 24, 25, 26, and 27 are diagrams illustrating an embodiment in which a specific TWT service period is resumed in the WUR mode according to an embodiment of the present invention.

Referring to FIG. 24, the AP and the STA may exchange resumable TWT flow identification information in the process of the STA entering the WUR mode. For example, the above-mentioned WUR mode element may include a TWT-enabled field indicating whether the TWT service period can be resumed in WUR mode. When exchanging WUR mode elements in which the TWT-enabled field is activated, the wireless communication terminal and the base wireless communication terminal may use the TWT service period in the WUR mode according to the method described in other parts of the present disclosure. On the other hand, if the TWT-enabled field of the exchanged WUR mode element is not activated, all TWT service periods configured between the wireless communication terminal and the base wireless communication terminal may be suspended until a time point at which the wireless communication terminal stops WUR mode.

In addition, the WUR mode element may include resumable TWT flow identification information. For example, the WUR mode element may include bitmap information (TWT Flow ID bitmap) indicating whether specific TWT flow identification information is resumable TWT identification information. For example, the bitmap information may be composed of bits of the maximum number of TWT flows that can be allocated to the wireless communication terminal. The bitmap information may include an identification bit indicating whether the specific TWT flow identification information is resumable TWT identification information. In this case, each of the identification bits may include at least one bit. According to a further embodiment, the WUR mode element may include bitmap information only when the TWT-enable field is activated.

In a specific embodiment, the resumable TWT flow identification information may be identification information '2' and '3'. In this case, the STA may resume the TWT service period that arrives fastest after the PCR transition delay elapses from the time point of receiving the wake-up frame among TWT service periods in which the TWT flow identification information is 2 or 3. In addition, the STA may maintain the PCR awake state during the corresponding TWT service period.

According to an embodiment of the present invention, the wireless communication terminal may induce the resumption of the TWT service period using a TWT action frame. Here, the TWT action frame may include one or more fields indicating TWT parameter information. The TWT action frame may be transmitted through a PCR transceiver of a wireless communication terminal. According to one embodiment, the TWT action frame may include one or more TWT information fields. Further, each TWT information field may include a TWT Flow identifier subfield indicating specific TWT flow identification information. Also, the TWT information field may include an All TWT subfield. The All TWT subfield may be a subfield indicating that all TWT flows configured in relation to the wireless communication terminal are resumable TWT flows. In this case, all TWT flows may include individual TWTs and broadcast TWTs.

Figure 25:
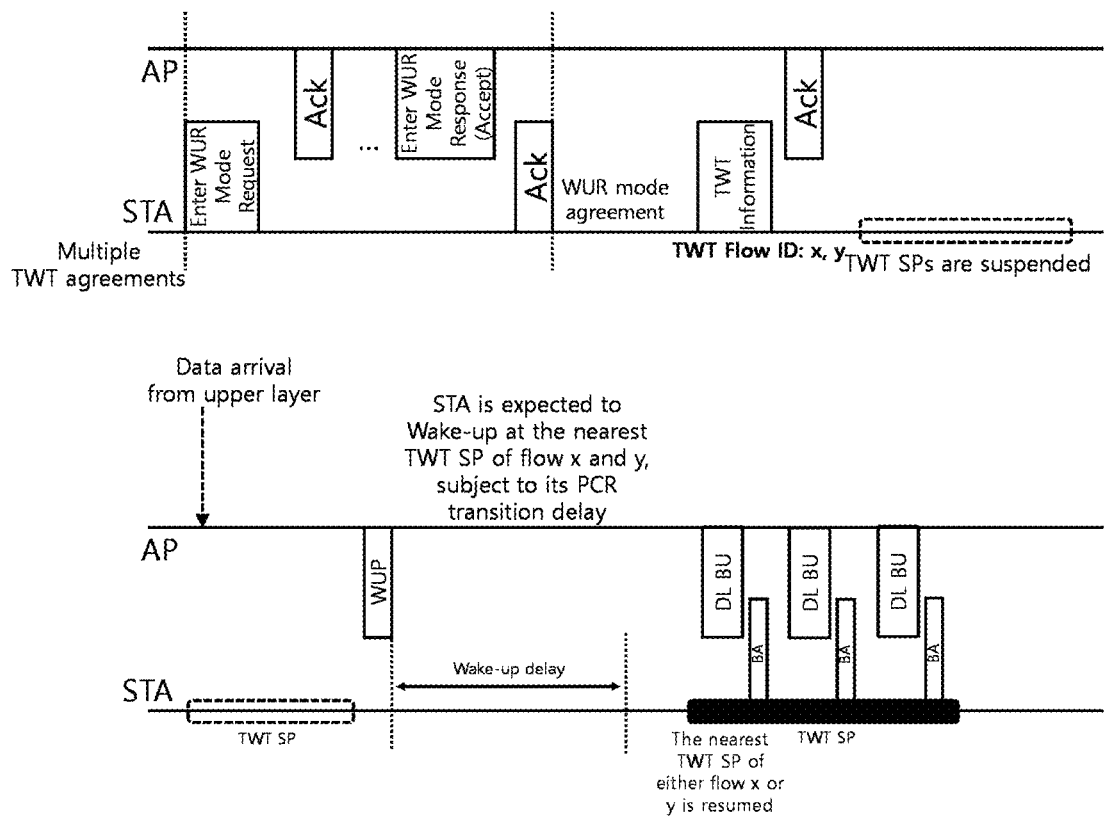

Referring to FIG. 25, the STA may transmit resumable TWT flow identification information to the AP after the STA enters the WUR mode. For example, after entering the WUR mode, the wireless communication terminal may transmit a TWT action frame including resumable TWT flow identification information. The wireless communication terminal may request the resumption of the TWT service period by transmitting a TWT action frame indicating the resumable TWT flow identification information to the base wireless communication terminal.

According to a specific embodiment, the STA may transmit to the AP a TWT action frame including a first TWT information field indicating TWT flow identification information 'x' and a second TWT information field indicating TWT flow identification information 'y'. Further, the STA may receive a response frame for the TWT action frame from the AP. In this case, the STA may resume the TWT service period that arrives fastest after the PCR transition delay elapses from the time point of receiving the wake-up frame among TWT service periods in which the TWT flow identification information is x or y. The STA may maintain the PCR awake state during the corresponding TWT service period.

Further, when the wireless communication terminal stops the WUR mode and then enters the WUR mode again, the wireless communication terminal may signal resumable TWT flow identification information. In this case, the wireless communication terminal may signal resumable TWT flow identification information through a new TWT action frame. This is because when the wireless communication terminal stops the WUR mode, the wireless communication terminal may discard parameter information related to the entered WUR mode.

Figure 26:
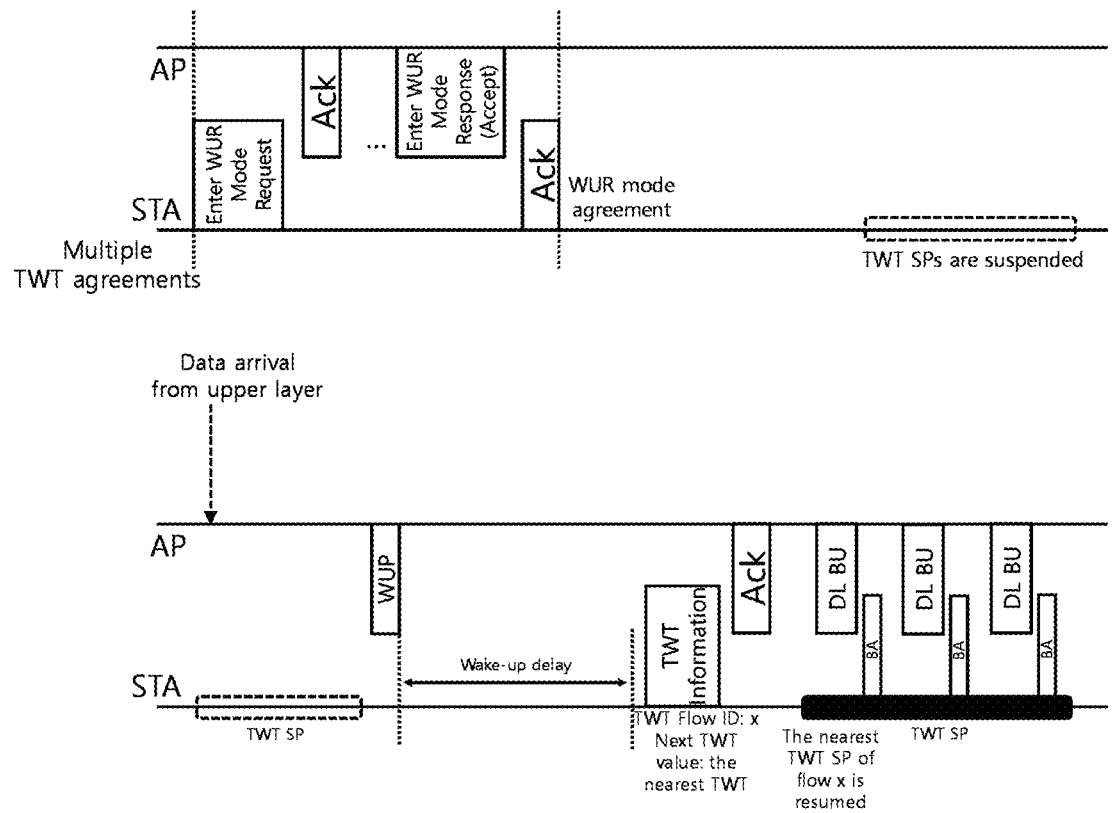

Referring to FIG. 26, the STA may transmit to the AP using a TWT action frame after wake-up. According to an embodiment, the wireless communication terminal may request the resumption of the TWT service period by transmitting a TWT action frame to the base wireless communication terminal after wake-up. In this case, the TWT action frame may include TWT flow identification information to be used by the wireless communication terminal.

According to a specific embodiment, the STA may receive a wake-up frame from the AP. In addition, the STA may transmit the TWT action frame to the AP after the PCR transition delay elapses from the time point of receiving the wake-up frame. In this case, the AP may determine that the STA is in the PCR awake state based on the TWT action frame. That is, in this embodiment, the TWT action frame may be used as an Awake Indication. The AP may obtain resumable TWT flow identification information based on the TWT action frame. In addition, the AP may determine that the TWT service period corresponding to the resumable TWT flow identification information is resumed. The STA may maintain the PCR awake state during a service period that arrives fastest after a PCR transition delay elapses from a time point at which the wake-up frame is received among the TWT service periods corresponding to the resumable TWT flow identification information. In this case, the Next TWT field value of the TWT action frame may be a predetermined value. Alternatively, when the Next TWT field value of the TWT action frame does not exist, it may be determined to correspond to the flow and indicate the TWT service period closest to the corresponding service period. This will be described later with reference to FIG. 27.

In addition, according to an embodiment, there may be an overlapping TWT service period overlapped with the TWT service period resumed by the TWT action frame. After the TWT service period ends, when the overlapping TWT service period does not end, the wireless communication terminal may not maintain the PCR awake state during the overlapping TWT service period. This is because the TWT service period resumed by the TWT action frame may be limited to a specific TWT service period indicated by the TWT action frame.

Figure 27:
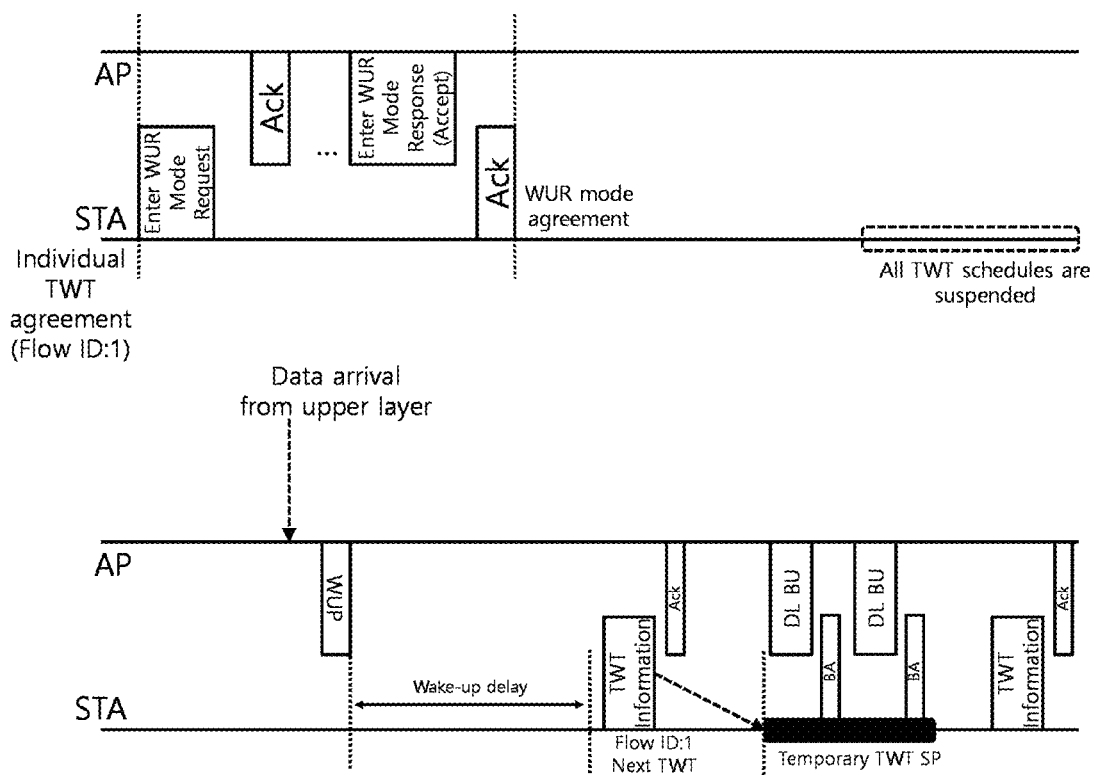

Referring to FIG. 27, the STA may transmit resumable TWT flow identification information to the AP using the TWT action frame. According to an embodiment, the TWT action frame may include a Next TWT field indicating a Next TWT value. In this case, the wireless communication terminal entering the WUR mode may signal whether the TWT service period can be resumed in the WUR mode through the Next TWT field of the TWT action frame. The next TWT field value may indicate that the TWT service period can be resumed from any time point after the current time point. Alternatively, in the WUR mode, the Next TWT field value may indicate a time point at which the TWT service period is resumed. In this case, the wireless communication terminal may determine the Next TWT value. For example, when the TWT corresponding to the TWT flow identification information is an implicit TWT, the wireless communication terminal may configure the Next TWT value based on the preconfigured period. In addition, the wireless communication terminal may configure Next TWT after the preconfigured period of the corresponding TWT elapses from the time point at which the current service period (temporary TWT SP) ends.

According to an embodiment, when the used TWT flow is an implicit TWT, the wireless communication terminal may use the next service period that arrives fastest after the end of the current service period (temporary TWT SP). According to another embodiment, when the used TWT flow is an explicit TWT or temporarily uses a TWT service period, the wireless communication terminal may transmit an additional TWT action frame. The wireless communication terminal may resume the TWT service period following the current service period by transmitting an additional TWT action frame.

Figure 28:
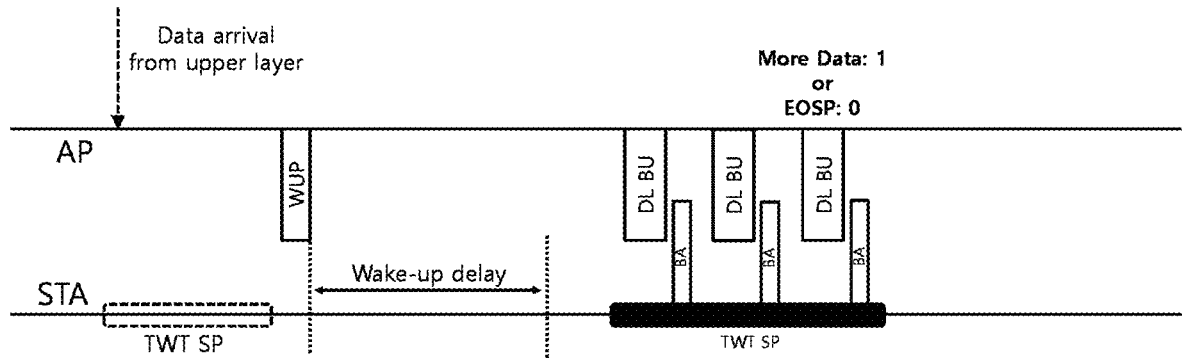
FIG. 28 illustrates an embodiment of a TWT-based operating method of a wireless communication terminal in WUR mode.

FIG. 28 illustrates an embodiment of a TWT-based operating method of a wireless communication terminal in WUR mode. According to an embodiment, the base wireless communication terminal may not transmit all of the buffered downlink data to the wireless communication terminal during the resumed TWT service period. In this case, the base wireless communication terminal may transmit an additional wake-up frame to the wireless communication terminal to transmit the remaining downlink data. In addition, the wireless communication terminal may switch back to the PCR awake state based on the additional wake-up frame from the PCR doze state. These series of processes can be inefficient. According to an embodiment of the present invention, when a specific condition is satisfied, the wireless communication terminal and the base wireless communication terminal may use at least one subsequent TWT service period following the resumed TWT service period without additional wake-up procedures.

According to an embodiment, the data frame may include an additional data field indicating whether there is additional data to be transmitted after the corresponding frame. For example, the additional data field may be a More data field or an End Of Service Period (EOSP) field. When the additional data field of the frame last transmitted by the base wireless communication terminal within the first service period is activated, the wireless communication terminal may maintain the PCR awake state during the second service period that arrives fastest after at least the first service period ends. In addition, when the EOSP field of the last frame transmitted by the base wireless communication terminal within the first service period is deactivated, the wireless communication terminal may maintain the PCR awake state for at least a second service period.

The above-described embodiment may be applied to the response frame for the uplink data transmitted by the wireless communication terminal in the same or corresponding way. For example, the wireless communication terminal may receive a response frame including an additional data field from the base wireless communication terminal. In this case, the additional data field may indicate whether there is data to be transmitted to the wireless communication terminal by the base wireless communication terminal receiving the uplink data. When the additional data field of the response frame last transmitted by the base wireless communication terminal within the first service period is activated, the wireless communication terminal may maintain the PCR awake state for at least a second service period. In addition, when the base wireless communication terminal receives an Ack frame for a response frame in which an additional data field is activated from the wireless communication terminal, it may be determined that the wireless communication terminal will maintain the PCR awake state during the second service period.

According to another embodiment, the wireless communication terminal may use a third service period that is a TWT service period that starts at a specific time point after the first service period ends. For example, the third service period may not be the TWT service period that arrives fastest after the first service period ends. In this case, the base wireless communication terminal may not resume the TWT service period that arrives before an awake frame or a TWT action frame is received from a wireless communication terminal. In addition, the base wireless communication terminal may transmit downlink data using a third service period that arrives after receiving the awake frame or the TWT action frame from the wireless communication terminal. In addition, the wireless communication terminal may maintain the PCR awake state during the third service period that arrives after the awake frame or the TWT action frame is transmitted to the base wireless communication terminal. In this embodiment, the base wireless communication terminal may use the TWT service period following the first service period without transmitting an additional wake-up frame.

Meanwhile, when the wireless communication terminal that enters the WUR mode stops the WUR mode, the suspended service periods may be resumed. For example, the wireless communication terminal may resume the TWT service period suspended in WUR mode. Hereinafter, a TWT service period that is resumed when the wireless communication terminal that enters the WUR mode stops the WUR mode will be described with reference to FIGS. 29 to 31.

Figure 29:
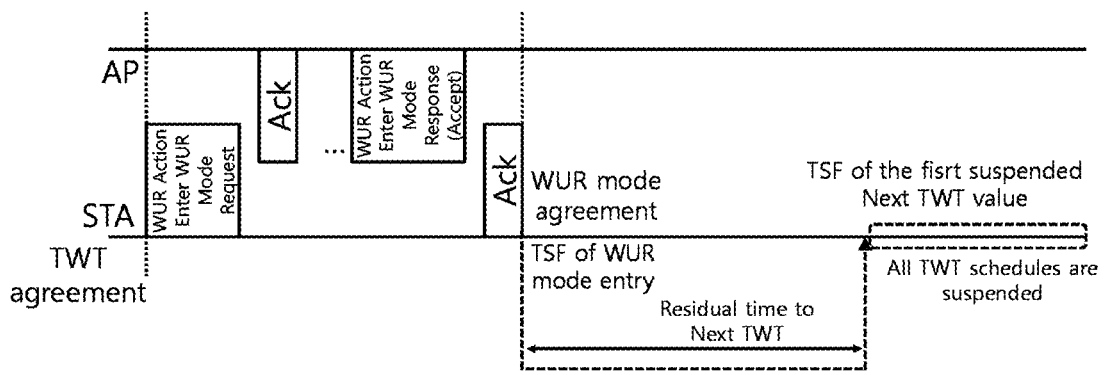
FIG. 29 illustrates an embodiment of a method for a wireless communication terminal to configure a Next TWT value when the wireless communication terminal stops the WUR mode.
Figure 29:
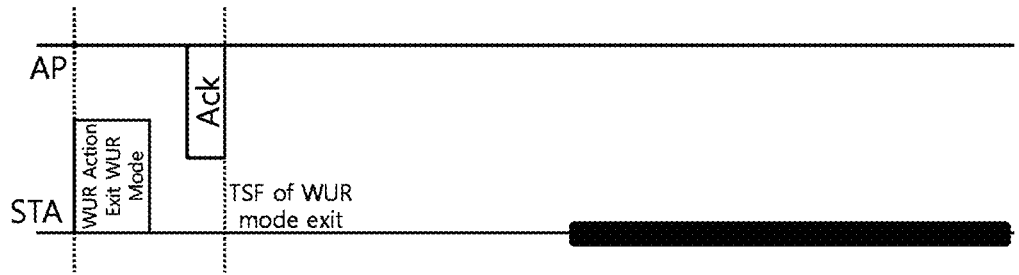

FIG. 29 illustrates an embodiment of a method for a wireless communication terminal to configure a Next TWT value when the wireless communication terminal stops the WUR mode. Specifically, the wireless communication terminal may transmit a WUR action frame (Exit WUR Mode) indicating that the WUR mode is stopped. In addition, the wireless communication terminal may stop the WUR mode by receiving a response frame for the WUR action frame (Exit WUR Mode). In this case, the wireless communication terminal may resume the scheduled service period. In this case, the wireless communication terminal may determine a start time point of a service period corresponding to TWT flow identification information. Specifically, the wireless communication terminal may configure the Next TWT value corresponding to the TWT flow identification information.

According to an embodiment, the wireless communication terminal may determine a Next TWT value using the difference between the first TSF value (TSF of WUR mode exit) of the time point of stopping the WUR mode and the second TSF value (TSF of WUR mode entry) of the time point of entering the WUR mode. In addition, the wireless communication terminal may determine the Next TWT value based on the first TSF value, the second TSF value, and the third TSF value as shown in Equation 1 below. In this case, the third TSF value may be a TSF value of a time point at which the first TWT service period suspended in the corresponding WUR mode starts.

$$\text{Next TWT}=(\text{TSF of WUR mode exit})-(\text{TSF of WUR mode entry})+(\text{TSF of the first suspended Next TWT value}) \quad \text{[Equation 1]}$$

For example, the time point of entering the WUR mode may indicate a time point at which the wireless communication terminal receives a WUR action frame (WUR Mode Response: Accept) accepting entry into the WUR mode from the base wireless communication terminal. Alternatively, the time point entering the WUR mode may be a time point at which the wireless communication terminal transmits a WUR action frame Ack frame accepting entry into the WUR mode. Alternatively, the time point of entering the WUR mode may be a time point at which the wireless communication terminal transmits a WUR action frame (Enter WUR Mode Request) requesting entry into the WUR mode, and receives an Ack frame for this from the base wireless communication terminal.

Further, the time point of stopping the WUR mode may be a time point at which the wireless communication terminal transmits a WUR action frame (Exit WUR Mode) indicating the suspension of the WUR mode and receives an Ack frame for this from the base wireless communication terminal. Or, the time point at which the wireless communication terminal stops the WUR mode may be a time point at which the wireless communication terminal transmits a WUR action frame (Enter WUR Mode Suspend) indicating the WUR mode suspension, and the wireless communication terminal receives an Ack frame for this from the base wireless communication terminal.

In this embodiment, each of the base wireless communication terminal and the wireless communication terminal may store the above-mentioned first to third TSF values until the TWT service period is resumed. Through this, the base wireless communication terminal and the wireless communication terminal may calculate the same Next TWT value. According to another embodiment, the base wireless communication terminal and the wireless communication terminal may store a difference value between the first TSF value and the third TSF value. In addition, the base wireless communication terminal and the wireless communication terminal may determine a Next TWT value by adding a difference value stored at a time point of stopping the WUR mode.

According to another embodiment, the wireless communication terminal may determine the Next TWT value using the old Next TWT value (existing Next TWT) stored at the time point of entering the WUR mode. For example, the wireless communication terminal may configure a minimum TSF value greater than a third TSF value, which is a time point at which the WUR mode is stopped, as a Next TWT value among values obtained by adding multiples of pre-configured TWT Wake Interval values to the old Next TWT. This is expressed by the following equation.

Next TWT=(existing Next TWT)+$n$*(TWT Wake Interval), [Equation 1]

n is an integer.

Figure 30:
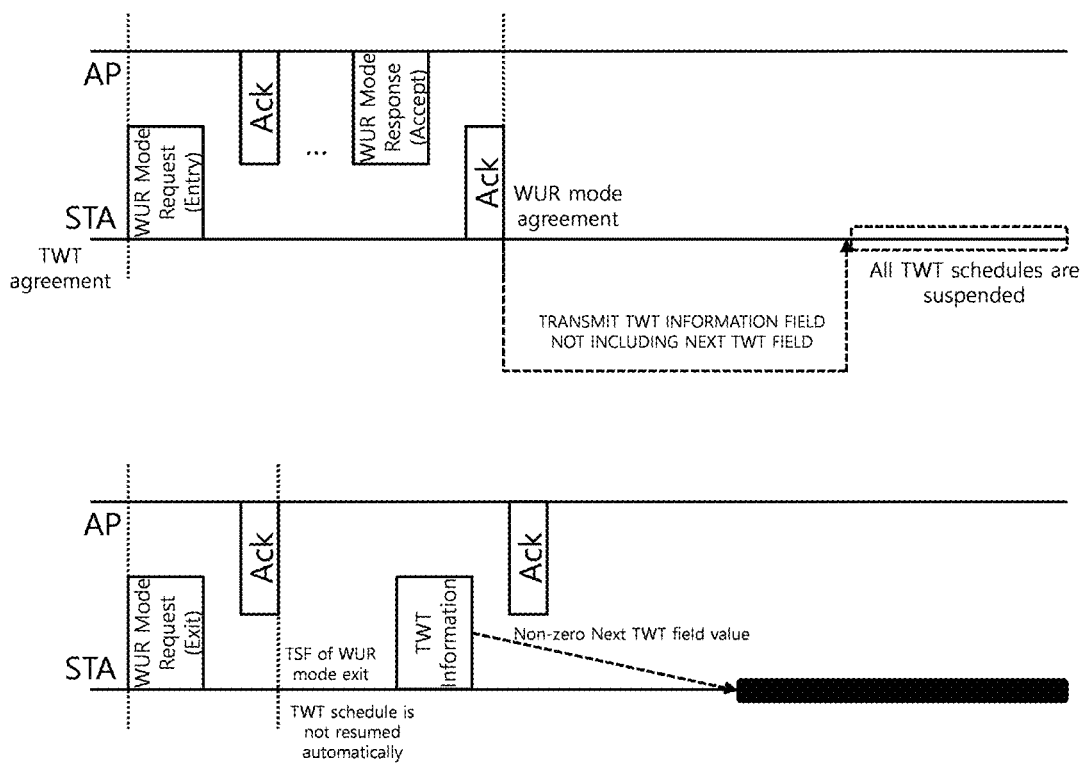
FIG. 30 illustrates an embodiment of a method of resuming a negotiated TWT schedule after a wireless communication terminal stops WUR mode and before entering WUR mode.

FIG. 30 illustrates an embodiment of a method of resuming a negotiated TWT schedule after a wireless communication terminal stops WUR mode and before entering WUR mode. After the wireless communication terminal stops the WUR mode, the negotiated TWT service period may be resumed before entering the WUR mode. In this case, the wireless communication terminal may resume the negotiated TWT service period before entering the WUR mode using the above-described TWT information field.

According to an embodiment of the present invention, the wireless communication terminal may transmit a TWT action frame including the TWT information field to the base wireless communication terminal after entering the WUR mode. If the TWT information field transmitted by the wireless communication terminal does not include the Next TWT subfield value, the TWT service period may be suspended until a time point at which the wireless communication terminal transmits a TWT information field specifying the Next TWT value. In this case, the suspended TWT service period may be a service period corresponding to all TWT flow identification information. For example, after stopping the WUR mode, the wireless communication terminal may resume the TWT service period by transmitting a TWT action frame including the Next TWT subfield value to the base wireless communication terminal.

In addition, when a broadcast TWT is negotiated between a base wireless communication terminal and a plurality of wireless communication terminals, the base wireless communication terminal may maintain a TWT service period for the remaining wireless communication terminals except for the wireless communication terminal operating in the WUR mode among the plurality of wireless communication terminals. In addition, the base wireless communication terminal may suspend the TWT service period of the wireless communication terminal until a time point at which the wireless communication terminal operating in the WUR mode resumes a TWT-based operation. In this case, the time point for resuming the TWT-based operation may be a time point at which the wireless communication terminal satisfies a specific condition in the WUR mode or the wireless communication terminal stops the WUR mode.

According to an embodiment, even when the wireless communication terminal stops the WUR mode, the base wireless communication terminal may determine that the wireless communication terminal does not resume the TWT service period. For example, the base wireless communication terminal receiving the TWT action frame for suspending the TWT service period may suspend the TWT service period until a time point of receiving a TWT information field including a Next TWT value from the wireless communication terminal. In this case, the base wireless communication terminal may suspend the TWT service period regardless of the WUR mode stop of the wireless communication terminal.

In this case, the wireless communication terminal may determine the next TWT value for each TWT flow identification information and broadcast TWT identification information. Further, the wireless communication terminal may generate separate TWT information fields for each TWT flow identification information and broadcast TWT identification information. In this case, the wireless communication terminal may include a plurality of TWT information fields in one TWT action frame and transmit it. The wireless communication terminal may transmit a TWT information field for resuming the broadcast TWT by activating the Broadcast reschedule field indicating that the broadcast TWT is resumed. After stopping the WUR mode, the wireless communication terminal may transmit a TWT action frame including a TWT information field to the base wireless communication terminal through a PCR transceiver.

Figure 31:
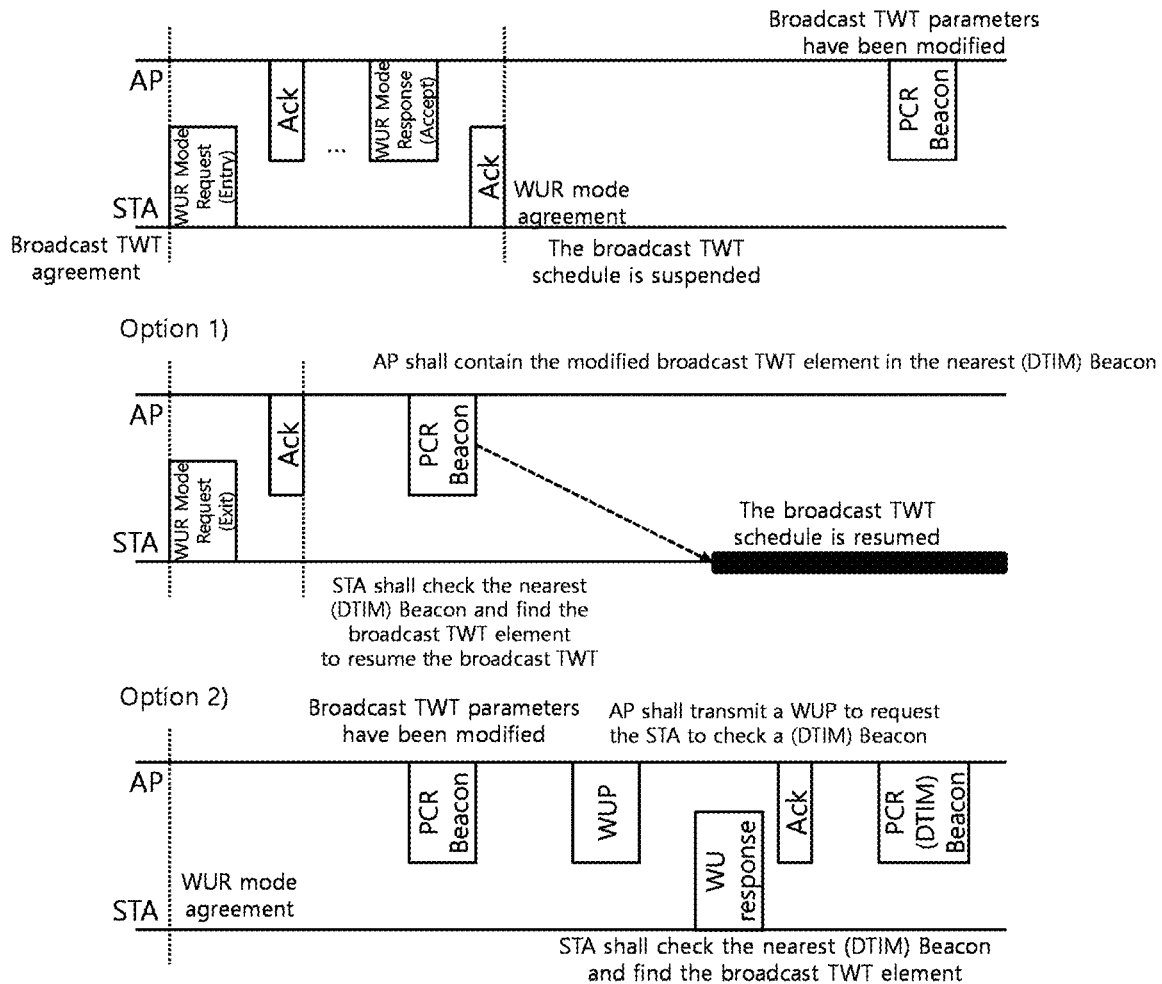
FIG. 31 illustrates an embodiment of a method of operating a broadcast TWT based on a wireless communication terminal.

FIG. 31 illustrates an embodiment of a method of operating a broadcast TWT based on a wireless communication terminal. The base wireless communication terminal may manage a TWT service period with a plurality of wireless communication terminals using one broadcast TWT flow identification information. Therefore, even when some of the managed wireless communication terminals enter the WUR mode, the broadcast TWT service period may not be suspended. When any one of the plurality of wireless communication terminals configured with the broadcast TWT service period enters the WUR mode, the base wireless communication terminal may suspend the broadcast TWT service period for the user equipment entering the WUR mode.

In addition, the base wireless communication terminal may change parameters used for the broadcast TWT according to changes in the wireless environment. In this case, the base wireless communication terminal may generate a broadcast TWT information field corresponding to the broadcast TWT identification information. The base wireless communication terminal may use the broadcast TWT information field to signal the changed TWT parameter to a plurality of wireless communication terminals.

Meanwhile, the wireless communication terminal operating in the WUR mode may not receive the changed TWT parameter information. If the TWT parameter is used before the wireless communication terminal is changed, normal operation may be difficult. According to an embodiment, the wireless communication terminal may obtain changed TWT parameter information through a beacon frame received through a PCR transceiver. For example, the wireless communication terminal may receive a TWT information field including TWT parameter information changed in a beacon frame reception period that arrives after stopping the WUR mode. The base wireless communication terminal may insert a TWT information field including changed TWT parameter information into a beacon frame that is first transmitted after the wireless communication terminal stops the WUR mode. The beacon frame may be a DTIM beacon frame. In addition, the base wireless communication terminal may transmit the changed TWT parameter information to the wireless communication terminal by further using a following beacon frame subsequent to the first beacon frame transmitted after the wireless communication terminal stops the WUR mode. Also, the base wireless communication terminal may transmit a beacon frame including changed TWT parameter information to a wireless communication terminal not configured with broadcast TWT. This is because a wireless communication terminal not configured with broadcast TWT may use a broadcast service period through UL-OFDMA random access.

According to an embodiment, while the wireless communication terminal is operating in the WUR mode, the broadcast TWT configured in the wireless communication terminal may expire. In this case, the base wireless communication terminal may signal the TWT information field indicating that the broadcast TWT expires. The base wireless communication terminal may transmit a beacon frame including a TWT information field indicating that the broadcast TWT expires to the wireless communication terminal.

In addition, the wireless communication terminal may check whether the parameter used for the broadcast TWT is changed based on the beacon frame transmitted first after stopping the WUR mode. In this case, when the wireless communication terminal receives a beacon frame that does not include the TWT information field, the wireless communication terminal may operate based on pre-stored TWT parameter information. According to a further embodiment, the wireless communication terminal that stops the WUR mode may not perform a broadcast TWT-based operation until the beacon frame is first transmitted. Through this, it is possible to reduce the possibility of malfunction of the wireless communication terminal. According to another embodiment, the above-described TWT information field may be transmitted through a TWT action frame that is individually transmitted to a wireless communication terminal.

According to another embodiment, the base wireless communication terminal may wake-up the wireless communication terminal operating in the PCR doze state to receive a beacon frame including TWT parameter information. For example, the base wireless communication terminal may transmit a first wake-up frame that induces reception of a beacon frame including changed TWT parameter information to the wireless communication terminal. The wireless communication terminal may receive a beacon frame by waking up based on the first wake-up frame. In this case, the beacon frame may include changed TWT parameter information.

According to another embodiment, the base wireless communication terminal may cancel the broadcast TWT of the wireless communication terminal entering the WUR mode among the plurality of wireless communication terminals configured with the broadcast TWT. In this case, the wireless communication terminal may maintain pre-stored parameters used for broadcast TWT. However, the base wireless communication terminal may not schedule transmission for the wireless communication terminal during the broadcast TWT service period. When the wireless communication terminal intends to resume the service period based on the broadcast TWT, the wireless communication terminal may perform an additional TWT negotiation procedure with the base wireless communication terminal.

Figure 32:
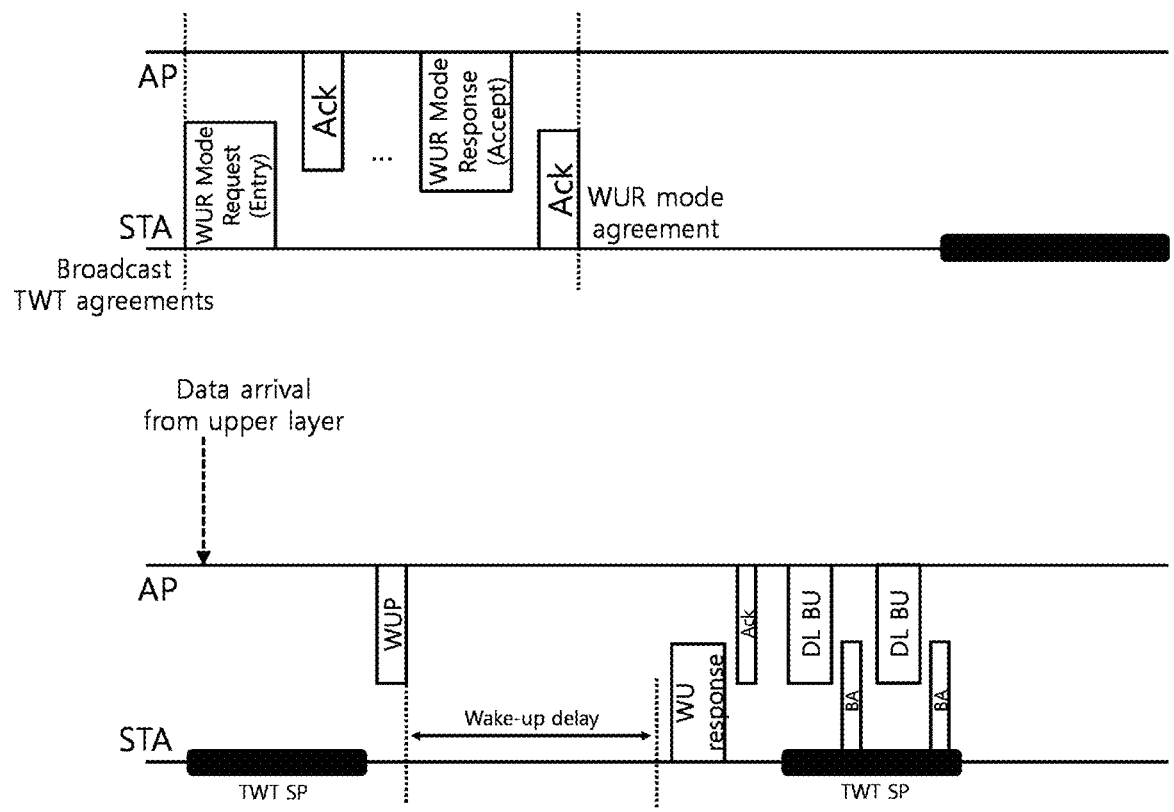
FIG. 32 illustrates an embodiment of a method of operating a broadcast TWT based on a wireless communication terminal.

FIG. 32 illustrates an embodiment of a method of operating a broadcast TWT based on a wireless communication terminal. According to an embodiment of the present invention, the base wireless communication terminal may perform an announce TWT based operation regardless of broadcast TWT parameter information for a wireless communication terminal operating in a WUR mode. For example, when the broadcast TWT parameter information indicates Unannounced TWT, the base wireless communication terminal may wait for the reception of the announce frame during the TWT service period for the wireless communication terminal operating in the WUR mode. In addition, when the broadcast TWT parameter information indicates a trigger-enabled TWT, the base wireless communication terminal may not transmit the trigger frame until the wireless communication terminal operating in the WUR mode transmits an announce frame. However, when the base wireless communication terminal receives the announce frame from the wireless communication terminal, the base wireless communication terminal may perform an operation according to broadcast TWT parameter information during the TWT service period.

Figure 33:
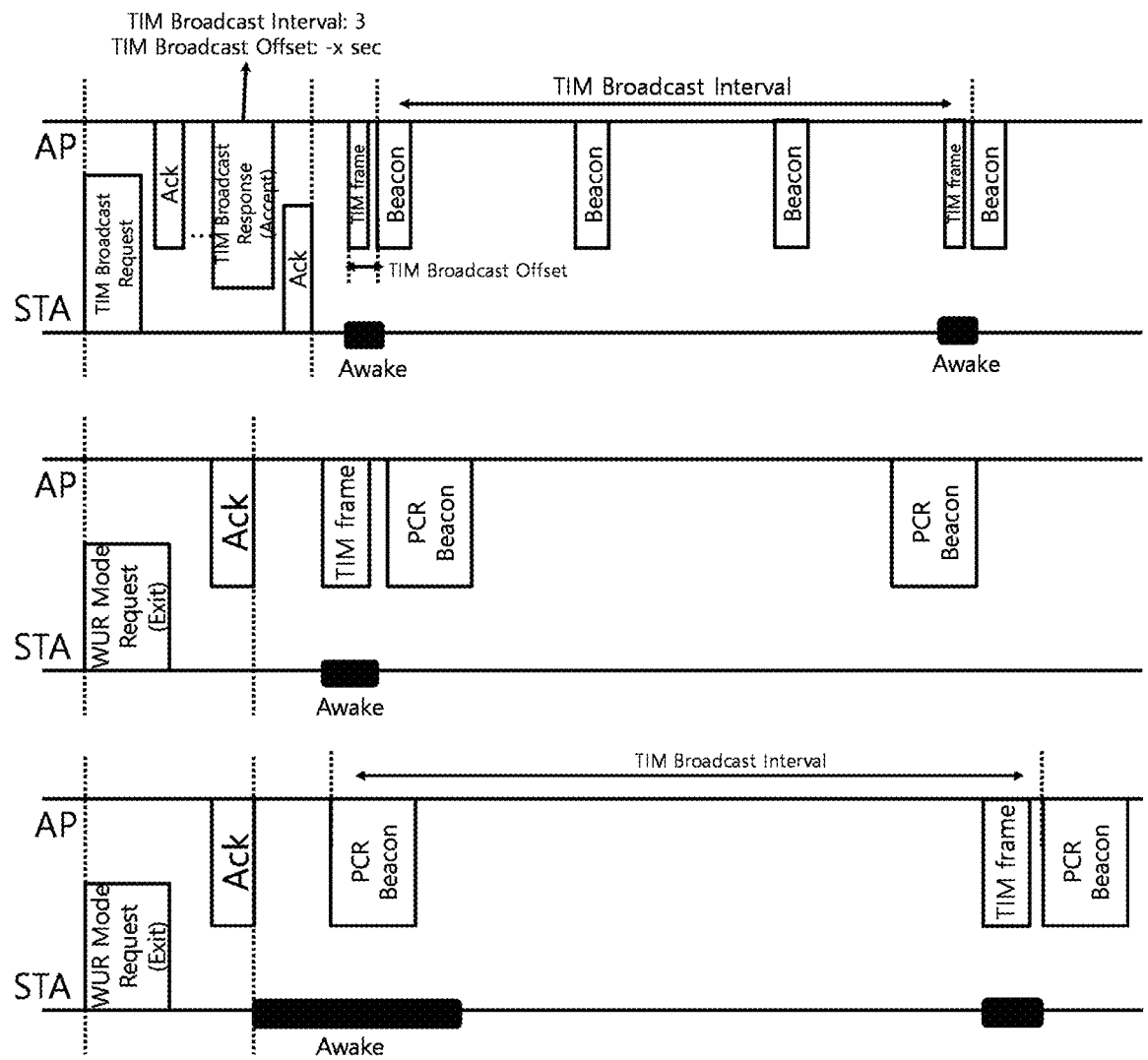
FIG. 33 illustrates an embodiment of a TIM broadcast operation of a wireless communication terminal in WUR mode.

FIG. 33 illustrates an embodiment of a TIM broadcast operation of a wireless communication terminal in WUR mode. In a wireless LAN, instead of a beacon frame transmitted at a relatively large data size and low transmission rate, the base wireless communication terminal and the wireless communication terminal may use a TIM broadcast that transmits a traffic indication map (TIM) frame including a TIM element at a preconfigured time point. Here, the TIM frame may be smaller in size than the beacon frame and may be transmitted at a relatively high transmission rate. The TIM broadcast may be configured through a TIM broadcast request frame and a TIM broadcast response frame between the wireless communication terminal and the base wireless communication terminal. In addition, the TIM broadcast response frame may include a TIM frame transmission period in a Beacon Interval (BI) unit. In addition, the TIM broadcast response frame may include TIM broadcast offset information indicating a difference between time points at which a TIM frame is transmitted based on a time point at which a beacon is transmitted according to a beacon interval. A TIM broadcast interval indicating a time point at which a TIM frame is transmitted may be determined based on at least one of a beacon interval, a TIM frame transmission period, and TIM broadcast offset information. The wireless communication terminal may receive the TIM frame by maintaining the PCR awake state at the TIM frame transmission time point according to the TIM parameter negotiated with the base wireless communication terminal.

Meanwhile, in the WUR mode, the wireless communication terminal may not receive the TIM frame. The wireless communication terminal may not maintain the PCR awake state at a time point at which TIM frame reception is expected. This is because the wireless communication terminal may receive the wake-up frame from the base wireless communication terminal and identify the existence of the buffered downlink data. Therefore, the base wireless communication terminal may not transmit the negotiated TIM frame for the wireless communication terminal operating in the WUR mode. Also, the wireless communication terminal may not maintain the PCR awake state at a time point at which TIM frame reception is expected while operating in the WUR mode. According to an embodiment, when the wireless communication terminal stops the WUR mode, the wireless communication terminal may resume operation according to the negotiated TIM broadcast. In addition, the base wireless communication terminal may transmit the TIM frame according to the TIM parameters negotiated with the wireless communication terminal.

According to an embodiment, a wireless communication terminal configured with a TIM broadcast schedule before entering the WUR mode may receive a TIM frame based on a beacon interval that arrives fastest after stopping the WUR mode. The wireless communication terminal may maintain the PCR awake state for a preconfigured time from a time point that is obtained by adding a TIM broadcast offset to an expected time point of beacon reception, which arrives fastest after stopping the WUR mode.

According to another embodiment, the wireless communication terminal may receive the PCR beacon frame after stopping the WUR mode. This is because information for time synchronization may be received as described above through FIG. 20. In this case, the PCR beacon frame may include a TIM element. When the wireless communication terminal receives the PCR beacon frame, it may be inefficient for the base wireless communication terminal to additionally transmit the TIM frame. Therefore, the base wireless communication terminal may transmit the TIM frame after the TIM broadcast interval elapses based on the expected time point of the beacon reception that arrives fastest after the wireless communication terminal stops the WUR mode. In addition, the wireless communication terminal may receive a TIM frame based on an expected time point of the beacon reception and a TIM broadcast interval.

According to another embodiment, the wireless communication terminal entering the WUR mode may maintain TIM broadcast related parameters. In addition, the wireless communication terminal that stops the WUR mode may receive a TIM frame using the maintained TIM broadcast related parameters. The wireless communication terminal may maintain the PCR awake state at a time point at which TIM frame reception is expected. A base wireless communication terminal may request the TIM broadcast interval from a plurality of wireless communication terminals. In addition, the TIM broadcast interval may be shared among a plurality of wireless communication terminals.

According to another embodiment, when the wireless communication terminal stops the WUR mode, the base wireless communication terminal may transmit a TIM broadcast response frame to the wireless communication terminal. In this case, the TIM broadcast response frame may be an unsolicited response frame transmitted without a request frame. In addition, the TIM broadcast response frame may include TIM broadcast period information and start time point information.

According to another embodiment, when the wireless communication terminal enters the WUR mode, the wireless communication terminal may not maintain the TIM broadcast configuration. For example, the wireless communication terminal may maycel the configured TIM broadcast. In this case, the base wireless communication terminal may discard the TIM broadcast parameter related to the wireless communication terminal from a time point at which the wireless communication terminal enters WUR mode. When the wireless communication terminal stops the WUR mode, the wireless communication terminal and the base wireless communication terminal may perform a TIM broadcast negotiation procedure again.

Figure 34:
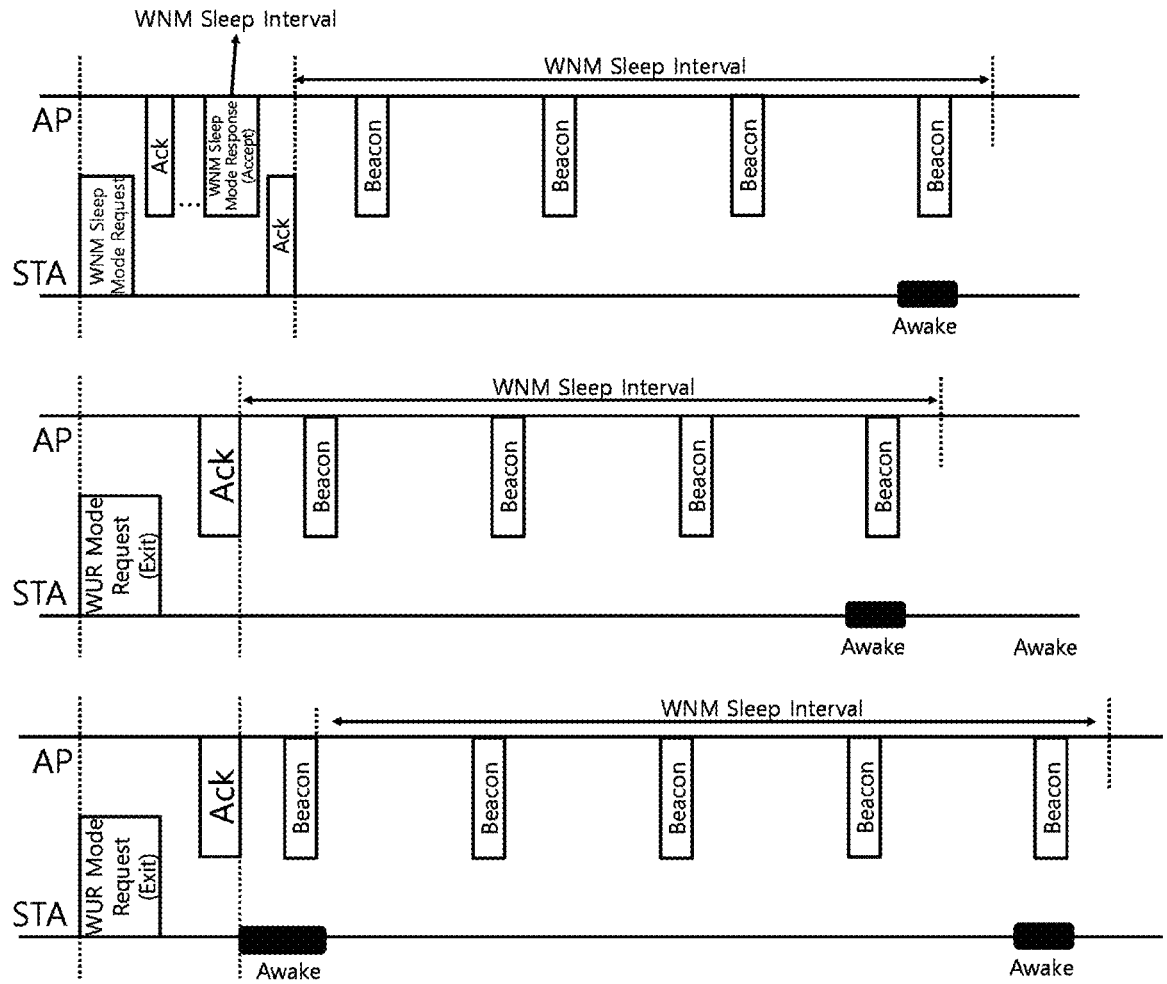
FIG. 34 illustrates an embodiment of WNM-based operation of a wireless communication terminal in WUR mode.

On the other hand, like the wireless network management (WNM) sleep mode, the wireless communication terminal may perform a power save operation using a negotiated service period. FIG. 34 illustrates an embodiment of WNM-based operation of a wireless communication terminal in WUR mode.

In a wireless LAN, a base wireless communication terminal defines a wireless network management (WNM) sleep mode that provides traffic filtering to the wireless communication terminal so that the wireless communication terminal may perform a power save operation for an additional time. In addition, through the WNM Sleep mode, the wireless communication terminal and the base wireless communication terminal may simplify operations in a security aspect such as updating a group temporary key (GTK).

The WNM Sleep mode may be configured through a WNM Sleep mode request frame and a WNM Sleep mode response frame between the wireless communication terminal and the base wireless communication terminal. In this case, the WNM Sleep mode response frame may include WNM Sleep interval information, which is a time period during which the wireless communication terminal may not receive the PCR beacon frame. In this case, the PCR beacon frame may include a DTIM beacon frame. The wireless communication terminal may check one or more PCR beacon frames by operating in the PCR awake state before the WNM Sleep interval expires. Through this, the wireless communication terminal may check whether there is data to be transmitted from the base wireless communication terminal to the wireless communication terminal. In addition, when there is no data to be transmitted to the wireless communication terminal according to a result of the verification, the wireless communication terminal may initialize the WNM Sleep interval from the time point at which the PCR beacon frame is identified.

Meanwhile, in the WUR mode, the wireless communication terminal may be excluded from the PCR awake maintenance conditions defined by WNM Sleep. The wireless communication terminal may stop the timer operation related to the WNM Sleep mode from the time the WUR mode is entered. The wireless communication terminal may resume WNM sleep interval management from a time point at which the WUR mode is stopped. When the wireless communication terminal stops the WUR mode, the WNM Sleep interval may be resumed. When the wireless communication terminal receives at least one PCR beacon frame after the WUR mode is stopped, the time point at which the WNM Sleep interval starts may be the time point at which the PCR beacon frame is received.

The base wireless communication terminal may perform traffic filtering on the wireless communication terminal operating in the WNM Sleep mode. In addition, the base wireless communication terminal may not transmit a frame for GTK update to the wireless communication terminal. According to an embodiment, when the wireless communication terminal enters the WUR mode, the base wireless communication terminal may transmit a frame for GTK update without performing traffic filtering for the corresponding terminal. In this case, the base wireless communication terminal may transmit a wake-up frame for GTK update to the wireless communication terminal. In addition, when the wireless communication terminal operates in the WUR mode, the wireless communication terminal may maintain a coupling relationship with the base wireless communication terminal. This is because when the wireless communication terminal operates in the WUR mode, the GTK management operation may be normally received.

Moreover, according to an embodiment, the data may be categorized based on an access category (hereinafter refereed to as 'AC'). The wireless communication terminal may access the channel in a different manner depending on the access category of the data. For example, the access category of the data may be any one of AC_BE, AC_BK, AC_VI, and AC_VO. In addition, the wireless communication terminal and the base wireless communication terminal may configure different channel access methods applied for each AC through the link setup procedure described above. For example, the base wireless communication terminal may determine a downlink data transmission sequence for each AC through a wireless communication terminal and a link setup procedure. Specifically, when the station is operating in the PS mode, the use of unscheduled-automatic power save delivery (U-APSD) may be set differently for each AC of data to be transmitted. Here, the U-APSD may mean a method of transmitting and receiving data using the unscheduled service period in the PS mode.

Whether to use U-APSD may be configured for each AC. For example, the wireless communication terminal operating in the PS mode may use a normal PS mode when transmitting data corresponding to AC_BE and AC_BK. In addition, the wireless communication terminal operating in the PS mode may use the PS mode using the U-APSD when transmitting data corresponding to AC_VI and AC_VO. If the AC of the downlink data waiting for transmission in the AP and the frame type of the awake frame transmitted by the station are not matched, the downlink data transmission of the AP may be unnecessarily delayed.

For example, according to the first embodiment, if the AP is buffered with the first downlink data corresponding to the first AC, the AP may transmit the first wake-up frame to the station to transmit the first downlink data. In this case, the first AC may be a trigger-enabled AC. The station may wake up based on the first wake-up frame. Also, the wake-up station may transmit the first frame through the PCR transceiver. In this case, the first frame may be a frame other than the QoS frame used for the downlink data request corresponding to the trigger-enabled AC. For example, the first frame may be a PS-poll frame. This is because the station may not recognize the AC of the downlink data that is waiting to be transmitted to the AP when the awake frame is transmitted after the wake-up. The AP may transmit a first response frame Ack for the first frame. In this case, the first response frame may be an Ack frame. Also, the AP may not be able to transmit the buffered first downlink data in response to the first frame. The AP may configure the service period only when it receives a request for downlink data corresponding to the first AC using U-APSD. Accordingly, after transmitting the first response frame Ack, the AP may not transmit the first downlink data until it receives a request for the downlink data corresponding to the first AC from the station.

According to the second embodiment, if the AP is buffered with the second downlink data corresponding to the second AC, the AP may transmit the second wake-up frame to the station to transmit the second downlink data. In this case, the second AC may be an AC using normal PS mode. The station receiving the second wake-up frame may transmit the second frame through the PCR transceiver. In this case, the second frame may be a frame other than the PS-poll frame used in the downlink data request in the PS mode not using the U-APSD. For example, the second frame may be a QoS Data or QoS Null frame. In this case, the AP may not transmit the buffered second downlink data in response to the second frame. This is because the AP may transmit the buffered second downlink data only when it receives the PS-poll frame. The AP may transmit a second response frame Ack to the station in response to the second frame.

Further, downlink data corresponding to the first AC described above may not be buffered, and the QoS frame may be a frame requesting downlink data corresponding to the first AC. In this case, when the AP receives the QoS frame as the second frame, the AP may identify that the station requests the downlink data corresponding to the first AC. In this case, the AP may transmit to the station a QoS Null frame (EOSP: 1) indicating that there is no downlink data corresponding to the first AC among the downlink data buffered in the AP. The station may transmit a QoS Null frame (EOSP: 1) to the AP. In addition, the station may transmit a third response frame for the QoS Null frame (EOSP: 1) received from the AP. In this case, the station may early terminate the service period at the time point at which the third response frame is transmitted. For example, the station may maintain the PCR awake state from the time point at which the QoS data or QoS null frame is transmitted to the AP to the time point at which the third response frame is transmitted. Accordingly, the AP may not transmit the second downlink data until the station ends the service period and the station transmits the PS-poll frame.

Figure 35:
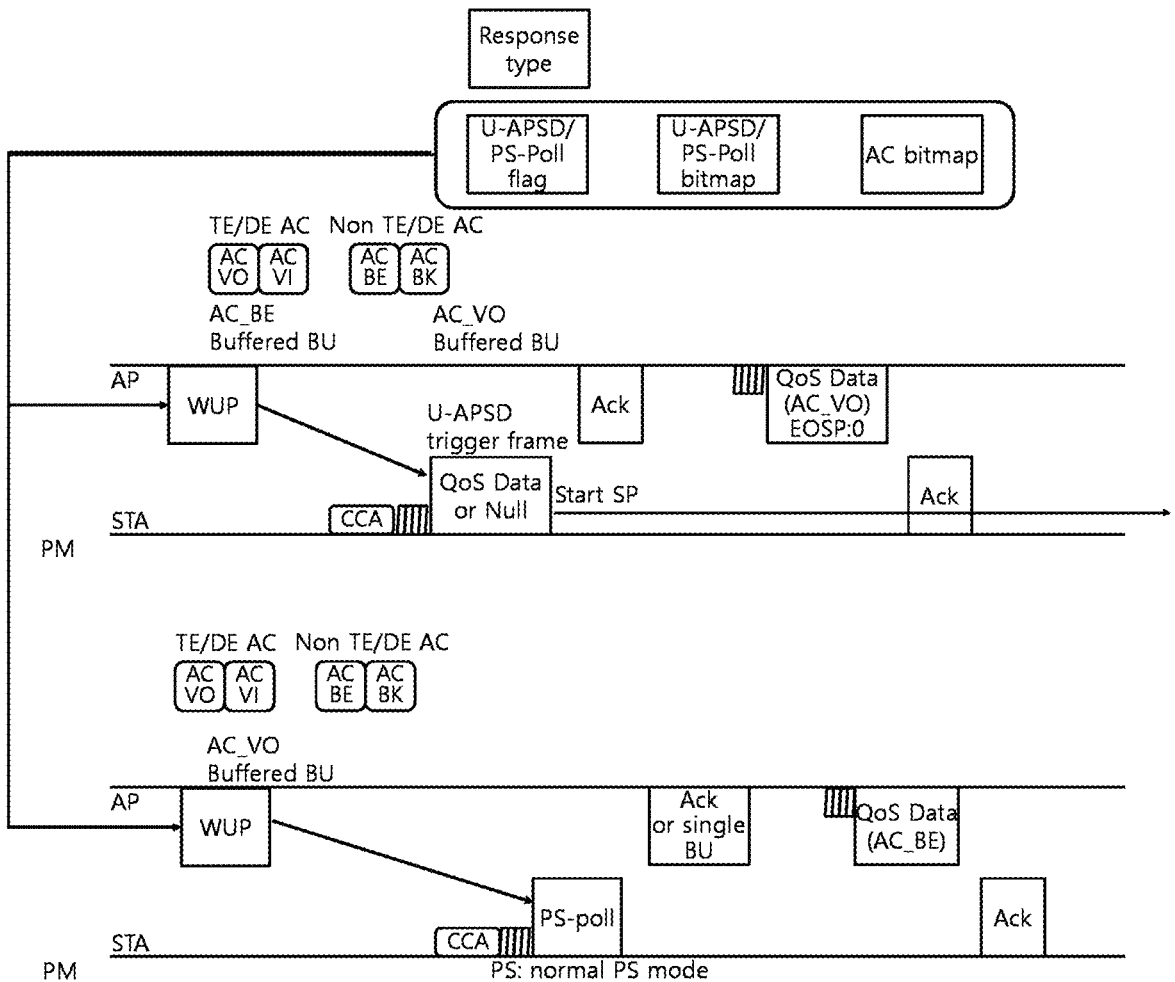
FIG. 35 illustrates an embodiment of a method for a wireless communication terminal to receive downlink data.

FIG. 35 illustrates an embodiment of a method for a wireless communication terminal to receive downlink data. According to an embodiment of the present invention, the wake-up frame includes awake type information (Response Type) indicating how to transmit the awake frame after the wake-up of the wireless communication terminal receiving the wake-up frame. In the present disclosure, the awake type information may be referred to as AC information indicating AC of downlink data buffered in the base wireless communication terminal. The awake type information may be inserted in a type dependent (TD) Control field included in the MAC header of the wake-up frame. Also, the awake type information may consist of one or more bits. Specifically, the base wireless communication terminal may transmit downlink data using information indicating AC of buffered downlink data. Through this, the base wireless communication terminal may efficiently transmit the buffered downlink data to the wireless communication terminal operating in the PS mode and the WUR mode.

According to an embodiment, when the awake type information consists of one bit, the awake type information may indicate a PS-poll/U-APSD flag. 0 or 1 may indicate whether the wireless communication terminal should transmit a QoS frame requesting downlink data transmitted using U-APSD or a PS-poll frame after wake-up, respectively. When the wireless communication terminal transmits the PS-poll frame, the wireless communication terminal may transmit the PS-poll frame using AC having the highest priority among ACs using the PS-poll frame. In addition, when the wireless communication terminal transmits the QoS frame, the wireless communication terminal may transmit the AC having the highest priority among ACs using U-APSD by using the QoS frame.

According to an embodiment, when the awake type information is composed of two or more bits, it may be expressed as bitmap information. In this case, the awake type information may be referred to as AC bitmap information. For example, the bitmap information may include one bit corresponding to each AC. In this case, each value of the bit may indicate whether there is downlink data corresponding to the AC indicated by each bit among the downlink data buffered in the AP. For example, the base wireless communication terminal may activate a bit allocated to AC corresponding to downlink data buffered in the base wireless communication terminal. Specifically, when downlink data corresponding to AC_VO is buffered, the base wireless communication terminal may display a bit corresponding to AC_VO as '1'. The wireless communication terminal may transmit the awake frame based on the AC bitmap information. After the wake-up, the wireless communication terminal may transmit either a PS-poll frame or a U-APSD trigger frame based on AC bitmap information.

According to an embodiment, the AC bitmap information may be composed of two bits. In this case, the AC bitmap information may consist of a first bit indicating whether to buffer the first downlink data requestable through the PS-poll frame and a second bit indicating whether to buffer the second downlink data corresponding to AC using U-APSD. When the first downlink data and the second downlink data are buffered in the base wireless communication terminal, the base wireless communication terminal may activate two bits constituting the AC bitmap information. In addition, the base wireless communication terminal may transmit a wake-up frame including corresponding AC bitmap information to the wireless communication terminal. In this case, the wireless communication terminal may transmit either the PS-poll frame or the QoS frame through the PCR transceiver in response to the wake-up frame.

According to an embodiment, when the user equipment transmits the PS-poll frame, the base wireless communication terminal may transmit the first downlink data. In this case, the wireless communication terminal may maintain the PCR awake state even after receiving the first downlink data. This is because the wireless communication terminal may be expected to have second downlink data according to AC bitmap information. Further, the wireless communication terminal may transmit a QoS frame requesting the second downlink data. In this case, the base wireless communication terminal may not transmit an additional wake-up frame to the wireless communication terminal. According to another embodiment, when the terminal transmits the QoS frame, the base wireless communication terminal may transmit the second downlink data. In this case, after receiving the second downlink data, the wireless communication terminal may transmit a QoS frame requesting the first downlink data.

According to a further embodiment, the AC bitmap information may further include information indicating a subsequent operation of the received wireless communication terminal of the wake-up frame. For example, AC bitmap information in which all bits are disabled may indicate other information in addition to the presence or absence of buffered downlink data. The base wireless communication terminal may insert AC bitmap information in which all bits are disabled into a wake-up frame to signal information indicating a subsequent operation of the wireless communication terminal. The wireless communication terminal may determine a subsequent operation after receiving a wake-up frame using AC bitmap information in which all bits are disabled.

For example, the AC bitmap information may include information indicating whether to wait for the PCR frame transmitted from the base wireless communication terminal after the wireless communication terminal wakes up the PCR transceiver. The wireless communication terminal may wait for the reception of the PCR frame transmitted from the base wireless communication terminal without transmitting the frame immediately after wake-up of the PCR transceiver based on the AC bitmap information. For example, the wireless communication terminal may transmit an awake frame according to induction of the base wireless communication terminal after wake-up of the PCR transceiver. The wireless communication terminal may not perform the EDCA channel access procedure for a predetermined time after wake-up based on the AC bitmap information. If the frame is not received from the base wireless communication terminal within a predetermined time, the wireless communication terminal may transmit an awake frame. According to another embodiment, AC bitmap information may be used when the base wireless communication terminal intends to transmit an MMPDU to the wireless communication terminal.

According to an embodiment, the AC bitmap information may be composed of 4 bits. In this case, each value of the bit may indicate whether there is downlink data corresponding to the AC indicated by each bit among the downlink data buffered in the base wireless communication terminal. The wireless communication terminal may transmit the awake frame based on the AC bitmap information.

Figure 36:
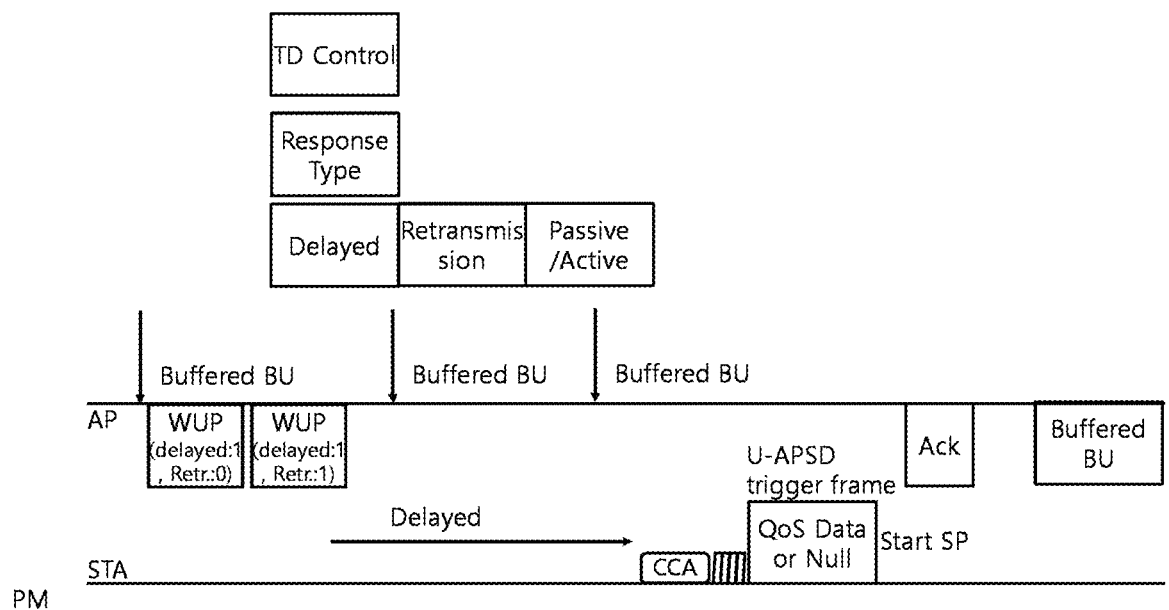
FIG. 36 illustrates another embodiment of a method for a wireless communication terminal to receive downlink data.

FIG. 36 illustrates another embodiment of a method for a wireless communication terminal to receive downlink data. According to an embodiment, for each time point at which downlink data is buffered in the base wireless communication terminal, it may be inefficient for the base wireless communication terminal to induce a wake-up of the wireless communication terminal by transmitting a wake-up frame. For example, when the base wireless communication terminal periodically buffers downlink data for a specific wireless communication terminal, it may be inefficient for the corresponding wireless communication terminal to wake-up every period. In this case, the wireless communication terminal may wake up at a desired time point of the wireless communication terminal and efficiently receive downlink data buffered in the base wireless communication terminal.

According to an embodiment of the present invention, a wireless communication terminal receiving a wake-up frame may not immediately perform wake-up. For example, the wake-up frame may include delay information indicating whether the wireless communication terminal that receives the wake-up frame performs an immediate wakeup or wakes up after a specific time. For example, when the delay information is activated, the wireless communication terminal may wake-up after a specific time. Further, when the delay information is deactivated, the wireless communication terminal may immediately wake-up. The delay information may be inserted into the TD Control field included in the MAC header of the wake-up frame. The base wireless communication terminal may insert delay information into the wake-up frame. In addition, the wireless communication terminal receiving the wake-up frame including the delay information may perform wake-up after a specific time determined by the wireless communication terminal from when the wake-up frame is received.

If the base wireless communication terminal transmits a wake-up frame with delay information activated, it may not configure the timeout used to determine whether transmission of the wake-up frame is failed. The base wireless communication terminal may increase a transmission success rate by transmitting a wake-up frame in which delay information is activated to the wireless communication terminal a plurality of times. In this case, the base wireless communication terminal may insert and transmit retransmission information indicating that the wake-up frames transmitted a plurality of times are retransmission wake-up frames. This is because the wireless communication terminal may misunderstand that the wake-up frames transmitted a plurality of times are wake-up frames for different data. In this case, among the wake-up frames transmitted a plurality of times, the wake-up frame transmitted first may not insert retransmission information. The retransmission information may be equally applied even when a wake-up frame indicating an immediate wake-up is retransmitted.

According to a further embodiment, when the retransmission information of the first received wake-up frame is activated after the wireless communication terminal wakes up and completes the PCR operation, the wireless communication terminal may immediately wake-up regardless of whether the delay information is activated. This is because the first wake-up frame may not be a retransmission wake-up frame. According to an embodiment, the retransmission information may be implemented in the form of a counter that increases each time a wake-up frame including the same information is retransmitted. In this case, based on the size of the counter value indicated by the retransmission information of the first wake-up frame, the wireless communication terminal may determine whether the wireless communication terminal immediately wakes up.

According to a further embodiment, when the base wireless communication terminal transmits a wake-up frame with activated delay information to the wireless communication terminal, the base wireless communication terminal may not transmit a new wake-up frame until a wake frame is received from the wireless communication terminal. The new wake-up frame may indicate a wake-up frame of which counter value indicated by retransmission information is '0'. For example, after the base wireless communication terminal transmits a wake-up frame with activated delay information, new downlink data for the corresponding wireless communication terminal may be additionally buffered in the base wireless communication terminal. Even in this case, the base wireless communication terminal may not transmit a new wake-up frame until it receives an awake frame from the wireless communication terminal.

However, if the base wireless communication terminal does not receive an awake frame from the wireless communication terminal from the time point at which the new downlink data for the wireless communication terminal is additionally buffered to the time point at which the preconfigured time arrives, the base wireless communication terminal may transmit a new wake-up frame. After receiving the wake-up frame in which the delay information is activated, the wireless communication terminal may receive a wake-up frame having a counter value of '0' indicated by retransmission information before performing wake-up. In this case, the wireless communication terminal may determine that the downlink data to be transmitted to the wireless communication terminal is added to the base wireless communication terminal.

According to an embodiment, the base wireless communication terminal may determine whether to activate delay information according to AC corresponding to downlink data. For example, when downlink data related to U-APSD is buffered, the base wireless communication terminal may transmit a wake-up frame with activated delay information. Alternatively, when downlink data related to U-APSD is buffered, the base wireless communication terminal may not transmit a wake-up frame to the wireless communication terminal. In this case, the wireless communication terminal may wake-up itself and induce downlink data transmission of the base wireless communication terminal. This is because U-APSD is a power save operation designed for environments with similar data traffic and periods in both directions. Further, according to the AC bitmap information described above, delay information may be signaled implicitly. For example, when the AC bitmap information indicates that the downlink data related to U-APSD is buffered in the base wireless communication terminal, the base wireless communication terminal and the wireless communication terminal may be configured to determine that the delay information is activated. For example, when the AC bitmap information received by the wireless communication terminal indicates that the downlink data related to the U-APSD is buffered in the base wireless communication terminal, the wireless communication terminal may determine that the delay information is activated.

According to a further embodiment, the wake-up frame may include waiting information indicating whether to wait for the PCR frame transmitted from the base wireless communication terminal after the wireless communication terminal wakes up the PCR transceiver. For example, the wireless communication terminal may transmit an awake frame according to induction of the base wireless communication terminal after wake-up of the PCR transceiver. In this case, the standby information of the wake-up frame in which the above-described delay information is activated may be in an activated state. This is because the wireless communication terminal receiving the wake-up frame with activated delay information cannot determine the wake-up time point of the base wireless communication terminal. In addition, the wireless communication terminal may transmit the awake frame by considering retransmission information in preference to standby information. For example, when receiving a wake-up frame in which retransmission information is activated, the wireless communication terminal may immediately transmit an awake frame regardless of the standby information of the wake-up frame.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

The invention claimed is:

1. A wireless communication terminal communicating wirelessly, the terminal comprising:
   a first wireless transceiver configured to transmit and receive signals through a first waveform;
   a second wireless receiver configured to receive a signal through a second waveform which uses On-Off Keying and is different from the first waveform; and
   a processor,
   wherein the processor is configured to:
   receive, from a base wireless communication terminal, through the first wireless transceiver, an acceptance frame for accepting a request for wake-up radio (WUR) mode entry in which the wireless communication terminal operates based on a signal transmitted through the second waveform,
   stop an operation of the wireless communication terminal related to a service period based on the acceptance frame, wherein the service period is a target wake time (TWT) service period which is a time period that arrives in a period negotiated between the base wireless communication terminal and the wireless communication terminal before the wireless communication terminal enters the WUR mode, and is a time period which is configured for the wireless communication terminal to transmit data to and receive data from the base wireless communication terminal through the first wireless transceiver in a power save (PS) mode,
   after stopping the operation of the wireless communication terminal related to the service period, when receiving, from the base wireless communication terminal through the second wireless receiver, a wake-up frame that triggers a wake-up of the first wireless transceiver, wake-up the first wireless transceiver based on the wake-up frame, and
   maintain a state in which transmission and reception are possible through the first wireless transceiver during at least a first service period that arrives after receiving the wake-up frame, wherein the first service period is a period in which buffered data is transmitted from the base wireless communication terminal to the wireless communication terminal and a service period that arrives first after a primary connectivity radio (PCR) transition delay elapses from the time point at which the wake-up frame is received, and wherein the PCR transition delay represents a time taken from a state in which a frame cannot be transmitted and received through the first wireless transceiver to a state in which transmission and reception are possible.

2. The wireless communication terminal of claim 1, wherein the first service period is a service period that arrives according to a first period, wherein the processor is configured to maintain a state in which transmission and reception are possible through the first wireless transceiver during the first service period and a second service period, wherein the second service period is a service period that arrives according to a second period different from the first period, wherein the second service period overlaps at least a portion of the first service period in a time domain, wherein an end time point of the second service period is later than an end time point of the first service period.

3. The wireless communication terminal of claim 1, wherein the first service period is a service period including any one of a plurality of service flows configured between the wireless communication terminal and the base wireless communication terminal, wherein the plurality of service flows are identified through different flow identification information, wherein each of the plurality of service flows is composed of service periods corresponding to the same flow identification information, wherein a service flow including the first service period is a service flow preconfigured to be available when the wireless communication terminal wakes up in the WUR mode among the plurality of service flows.

4. The wireless communication terminal of claim 1, wherein when exchanging additional data information indicating the existence of data to be additionally transmitted with the base wireless communication terminal during the first service period, the processor is configured to maintain a state in which transmission and reception are possible through the first wireless transceiver during a third service period that arrives after an end time point of the first service period based on the additional data information.

5. The wireless communication terminal of claim 4, wherein the third service period is a service period that arrives first after the end time point of the first service period.

6. The wireless communication terminal of claim 4, wherein the processor is configured to:

transmit indication information specifying the third service period among service periods arriving after the first service period through the first wireless transceiver, and maintain a state in which transmission and reception are possible through the first wireless transceiver during the third service period based on the indication information.

7. The wireless communication terminal of claim 1, wherein the processor is configured to, through the first wireless transceiver, transmit an awake frame between a time point at which the first wireless transceiver wakes up to a time point at which the first service period ends, to the base wireless communication terminal, and transmit and receive data to and from the base wireless communication terminal during at least the first service period based on the awake frame, wherein the awake frame represents a frame that is first transmitted through the first wireless transceiver after the first wireless transceiver wakes up.

8. The wireless communication terminal of claim 7, wherein the processor is configured to receive a trigger frame triggering transmission of the awake frame within the first service period from the base wireless communication terminal through the first wireless transceiver, and transmit the awake frame based on the trigger frame.

9. The wireless communication terminal of claim 7, wherein the awake frame comprises flow identification information of the first service period, wherein the flow identification information of the first service period indicates a service flow preconfigured to be available when the wireless communication terminal wakes up in the WUR mode, wherein the service flow is composed of a plurality of service periods corresponding to the same flow identification information.

10. The wireless communication terminal of claim 1, wherein when waking up the first wireless transceiver regardless of whether the wake-up frame is received after entering the WUR mode, the processor is configured to, through the first wireless transceiver, transmit an awake frame between a time point at which the first wireless transceiver wakes up to an end time point of the first service period to the base wireless communication terminal, and maintain a state in which transmission and reception are possible through the first wireless transceiver during at least the first service period, wherein the awake frame represents a frame that is first transmitted through the first wireless transceiver after the first wireless transceiver wakes up.

11. An operation method of a wireless communication terminal for transmitting and receiving a signal through a first waveform, and receiving a signal through a second waveform which uses On-Off Keying and is different from the first waveform, the method comprising:

receiving, from a base wireless communication terminal, an acceptance frame for accepting a request for wake-up radio (WUR) mode entry in which the wireless communication terminal operates based on a signal transmitted through the second waveform;

stopping an operation of the wireless communication terminal related to a service period based on the acceptance frame, wherein the service period is a target wake time (TWT) service period which is a time period that arrives in a period negotiated between the base wireless communication terminal and the wireless communication terminal before the wireless communication terminal enters the WUR mode, and a time period which is configured for the wireless communication terminal to transmit data to and receive data from the base wireless communication terminal through the first waveform in a power save (PS) mode;

after stopping the operation of the wireless communication terminal related to the service period, when receiving, from the base wireless communication terminal, a wake-up frame that triggers a wake-up of a wireless transceiver of the wireless communication terminal, waking-up the wireless transceiver based on the wake-up frame; and maintaining a state in which transmission and reception are possible through the wireless transceiver during at least a first service period that arrives after receiving the wake-up frame, wherein the wireless transceiver is a transceiver that receives a signal through the first waveform, the acceptance frame is received through the first waveform, and the wake-up frame is received through the second waveform, wherein the first service period is a period in which buffered data is transmitted from the base wireless communication terminal to the wireless communication terminal and a service period that arrives first after a primary connectivity radio (PCR) transition delay elapses from the time point at which the wake-up frame is received, and wherein the PCR transition delay represents a time taken from a state in which a frame cannot be transmitted and received through the first wireless transceiver to a state in which transmission and reception are possible.

12. The method of claim 11, wherein the first service period is a service period that arrives according to a first period, wherein the maintaining of the state in which transmission and reception are possible through the wireless transceiver comprises maintaining a state in which transmission and reception are possible through the wireless transceiver during the first service period and a second service period, wherein the second service period is a service period that arrives according to a second period different from the first period, wherein the second service period overlaps at least a portion of the first service period in a time domain, wherein an end time point of the second service period is later than an end time point of the first service period.

13. The method of claim 11, wherein the first service period is a service period including any one of a plurality of service flows configured between the wireless communication terminal and the base wireless communication terminal, wherein the plurality of service flows are identified through different flow identification information, wherein each of the plurality of service flows is composed of service periods corresponding to the same flow identification information, wherein a service flow including the first service period is a service flow preconfigured to be available when the wireless communication terminal wakes up in the WUR mode among the plurality of service flows.

14. The method of claim 11, wherein the maintaining of the state in which transmission and reception are possible through the wireless transceiver comprises, when exchanging additional data information indicating the existence of data to be additionally transmitted with the base wireless communication terminal during the first service period, maintaining a state in which transmission and reception are possible through the first wireless transceiver during a third service period that arrives after an end time point of the first service period based on the additional data information.

15. The method of claim 14, wherein the third service period is a service period that arrives first after the end time point of the first service period.

16. The method of claim 14, further comprising:
transmitting indication information specifying the third service period among service periods arriving after the first service period through the wireless transceiver; and
maintaining a state in which transmission and reception are possible through the wireless transceiver during the third service period based on the indication information.

* * * * *